(12) United States Patent
Ying et al.

(10) Patent No.: US 12,082,039 B2
(45) Date of Patent: Sep. 3, 2024

(54) COMMUNICATION METHOD AND COMMUNICATIONS APPARATUS

(71) Applicant: Huawei Technologies Co., Ltd., Shenzhen (CN)

(72) Inventors: Jiangwei Ying, Beijing (CN); Meng Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/520,104

(22) Filed: Nov. 5, 2021

(65) Prior Publication Data

US 2022/0060934 A1 Feb. 24, 2022

Related U.S. Application Data

(63) Continuation of application No. PCT/CN2020/085199, filed on Apr. 16, 2020.

(30) Foreign Application Priority Data

May 7, 2019 (CN) .......................... 201910376986.5

(51) Int. Cl.
*H04W 28/02* (2009.01)
*H04W 4/40* (2018.01)
(Continued)

(52) U.S. Cl.
CPC ......... *H04W 28/0268* (2013.01); *H04W 4/40* (2018.02); *H04W 28/0875* (2020.05); *H04W 92/18* (2013.01)

(58) Field of Classification Search
None
See application file for complete search history.

(56) References Cited

U.S. PATENT DOCUMENTS 9,357,545 B2 5/2016 Maeda et al.
11,856,445 B2 * 12/2023 Lee .................... H04W 28/0268
(Continued)

FOREIGN PATENT DOCUMENTS

CN 104797011 A 7/2015
CN 106899971 A 6/2017
(Continued)

OTHER PUBLICATIONS

Rohde and Schwarz, Qualcomm Incorporated, Correction to V2V TC 24.1.2. 3GPP TSG-RAN5 Meeting #80, Gothenburg, Sweden, Aug. 20, 2018-Aug. 24, 2018, R5-184986r1, 6 pages.
3GPP TS 23.285 V16.0.0 (Mar. 2019), 3rd Generation Partnership Project; Technical Specification Group Services and System Aspects; Architecture enhancements for V2X services(Release 16), 37 pages.
3GPP TS 23.502 V16.0.2 (Apr. 2019);3rd Generation Partnership Project;Technical Specification Group Services and System Aspects;Procedures for the 5G System;Stage 2(Release 16);total 419 pages.
(Continued)

*Primary Examiner* — Anh Vu H Ly
(74) *Attorney, Agent, or Firm* — Conley Rose, P.C.

(57) ABSTRACT

A communication method and a communications apparatus to transmit data of V2X services on appropriate frequency bands, where the method includes: A transmit end determining a layer-2 address pair of a first V2X service based on a frequency band of the first V2X service, where the layer-2 address pair of the first V2X service includes a source layer-2 address of the first V2X service and a destination layer-2 address of the first V2X service, and where the layer-2 address pair of the first V2X service corresponds to the frequency band of the first V2X service; and the transmit end sending data of the first V2X service to a receive end on the frequency band of the first V2X service based on the layer-2 address pair of the first V2X service.

20 Claims, 15 Drawing Sheets

(51) Int. Cl.
*H04W 28/08* (2023.01)
*H04W 92/18* (2009.01)

(56) References Cited

U.S. PATENT DOCUMENTS

| | | | |
|---|---|---|---|
| 2015/0004969 A1 | 1/2015 | Han et al. | |
| 2018/0213540 A1 | 7/2018 | Chiu et al. | |
| 2018/0270895 A1 | 9/2018 | Park et al. | |
| 2019/0313359 A1* | 10/2019 | Lee | H04W 4/40 |
| 2020/0187043 A1 | 6/2020 | Xin et al. | |
| 2020/0314613 A1* | 10/2020 | Lee | H04W 4/44 |
| 2021/0084542 A1* | 3/2021 | Ahmad | H04W 4/40 |
| 2021/0144529 A1 | 5/2021 | Yang | |
| 2021/0176610 A1* | 6/2021 | You | H04W 72/23 |
| 2022/0095260 A1* | 3/2022 | Shan | H04W 60/04 |
| 2022/0124466 A1* | 4/2022 | Ali | H04W 4/40 |
| 2022/0191733 A1* | 6/2022 | Ali | H04W 4/46 |
| 2022/0225156 A1* | 7/2022 | Lee | H04W 28/02 |

FOREIGN PATENT DOCUMENTS

| | | |
|---|---|---|
| CN | 107027126 A | 8/2017 |
| CN | 107734661 A | 2/2018 |
| CN | 107846434 A | 3/2018 |
| CN | 108260163 A | 7/2018 |
| CN | 108282808 A | 7/2018 |
| CN | 108770041 A | 11/2018 |
| CN | 108833065 A | 11/2018 |
| CN | 109379784 A | 2/2019 |
| CN | 109392042 A | 2/2019 |
| CN | 109587732 A | 4/2019 |
| WO | 2018050121 A1 | 3/2018 |
| WO | 2019033416 A1 | 2/2019 |

OTHER PUBLICATIONS

3GPP TS 23.287 V0.3.0 (Apr. 2019), 3rd Generation Partnership Project; Technical Specification Group Services and System Aspects; Architecture enhancements for 5G System (5GS) to support Vehicle-to-Everything (V2X) services (Release 16), 39 pages.
3GPP TS 23.503 V16.0.0 (Mar. 2019), 3rd Generation Partnership Project; Technical Specification Group Services and System Aspects; Policy and Charging Control Framework for the 5G System; Stage 2(Release 16), 84 pages.
3GPP TR 23.786 V16.0.0, 3rd Generation Partnership Project; Technical Specification Group Services and System Aspects; Study on architecture enhancements for the Evolved Packet System (EPS) and the 5G System (5GS) to support advanced V2X services (Release 16) Mar. 2019 total 118 pages.
SA WG2 Meeting #132,S2-1904426,Discussion on PC5 QoS model. Ericsson, Convida Wireless, Intel,Apr. 8 12, 2019, Xi An, China, total 5 pages.
SA WG2 Meeting #132,S2-1904439,Update to V2X Policy and parameters,Intel, Apr. 8-12, 2019, Xi an, China, total 2 pages.
SA WG2 Meeting #132,S2-1904441, PC5 unicast ,Samsung, Apr. 8-12, 2019, Xi''an, China,total 3 pages.
SA WG2 Meeting #132,S2-1904443,TS 23.287 Procedure for PC5 unicast,LG Electronics, Motorola Mobility, Lenovo, Convida Wireless, InterDigital, OPPO, vivo Mobile Communications Co. Ltd, Apr. 8-12, 2019, Xi'an, China,total 5 pages.
SA WG2 Meeting #132,S2-1904448,PC5 QoS parameters and standardized PQI definitions for eV2X,Qualcomm Incorporated, Intel,Xi''an, People''s Republic of China, Apr. 8-12, 2019 ( was S2-190440 was S2-1904429 was S2-1903394),total 9 pages.
Interdigital Inc, "QoS Management for NR V2X," 3GPP Draft; R2-1901575, Feb. 15, 2019, XP051602930, 4 pages.

* cited by examiner

COMMUNICATION METHOD AND COMMUNICATIONS APPARATUS

CROSS-REFERENCE TO RELATED APPLICATIONS

This is a continuation of International Patent Application No. PCT/CN2020/085199, filed on Apr. 16, 2020, which claims priority to Chinese Patent Application No. 201910376986.5, filed on May 7, 2019. The disclosures of the aforementioned applications are hereby incorporated by reference in their entireties.

TECHNICAL FIELD

Embodiments of this application relate to the communications field, and in particular, to a communication method and a communications apparatus.

BACKGROUND

In a vehicle to everything (V2X) communications system, a V2X service may be transmitted between terminals through a PC5 interface. For example, before a transmit end transmits a V2X service to a receive end, the transmit end may establish a PC5 signaling-plane link (e.g., a PC5 signal (PC5-S) link) to the receive end, and negotiate a pair of layer-2 (L2) addresses (or referred to as a layer-2 address pair) over the PC5 unicast link. The pair of addresses includes a source layer-2 address and a destination layer-2 address. Subsequently, when the transmit end sends the V2X service to the receive end, the transmit end may filter the V2X service into a corresponding quality of service (QOS) flow based on a QoS requirement of the V2X service, and send the QoS flow and the obtained pair of layer-2 addresses to the receive end through the PC5 interface, such that the receive end parses the QoS flow based on the pair of layer-2 addresses, to obtain the V2X service sent by the transmit end.

However, in the V2X communications system, there are a plurality of different types of V2X services, for example, a vehicle to vehicle safety and awareness service, a cruise-assist-highway-system service, an automatic-vehicle-identification service, and a non-safety application service. Different types of V2X services may be allocated to different frequency bands (or referred to as PC5 frequency bands). If different types of V2X services are allocated to different frequency bands, and the V2X services are sent to the receive end in the foregoing manner, the V2X services on different frequency bands are filtered into a same QoS flow and sent to the receive end. After receiving the QoS flow, the receive end may not distinguish a frequency band corresponding to each V2X service in the QoS flow. Consequently, some V2X services are sent on incorrect frequency bands, affecting normal transmission of the V2X services.

SUMMARY

Embodiments of this application provide a communication method and a communications apparatus, to resolve a problem caused when V2X services on different frequency bands are transmitted using a same QoS flow.

To achieve the foregoing objective, the following technical solutions are used in the embodiments of this application.

According to a first aspect of the embodiments of this application, a communication method is provided. The method includes: A transmit end determines, based on a frequency band of a first V2X service, a layer-2 address pair that is of the first V2X service and that includes a source layer-2 address of the first V2X service and a destination layer-2 address of the first V2X service, where the layer-2 address pair of the first V2X service corresponds to the frequency band of the first V2X service. The transmit end sends data of the first V2X service to a receive end on the frequency band of the first V2X service based on the layer-2 address pair of the first V2X service.

Based on the first aspect, a layer-2 address pair of a V2X service may be determined based on a frequency band of the V2X service, to ensure that data of the V2X service is sent on the frequency band of the V2X service based on the layer-2 address pair of the V2X service. This avoids a problem that a V2X service fails to be received or is incorrectly received because V2X services on different frequency bands are put together and sent to the receive end.

In a possible design, with reference to the first aspect, the frequency band of the first V2X service is a first frequency band, and the layer-2 address pair of the first V2X service is different from a layer-2 address pair of a V2X service other than a V2X service corresponding to the first frequency band.

Based on the possible design, different layer-2 address pairs may be determined for V2X services on different frequency bands, such that data of a V2X service is sent, based on a layer-2 address pair of the V2X service, on a frequency band corresponding to the V2X service. This prevents data of the V2X services on different frequency bands from being mixed and sent together, and improves transmission reliability of the data of the V2X service.

In a possible design, with reference to either the first aspect or the possible design of the first aspect, the method further includes: The transmit end determines a layer-2 address pair of a second V2X service based on a frequency band of the second V2X service, where the frequency band of the first V2X service is different from the frequency band of the second V2X service, and where the layer-2 address pair of the first V2X service is different from the layer-2 address pair of the second V2X service. If the frequency band of the first V2X service is the same as the frequency band of the second V2X service, the layer-2 address pair of the first V2X service may be the same as or different from the layer-2 address pair of the second V2X service.

Based on the possible design, the transmit end may determine layer-2 address pairs of a plurality of V2X services, and layer-2 address pairs of V2X services on different frequency bands are different. This avoids a problem that a V2X service fails to be received or is incorrectly received because the V2X services on different frequency bands are put together and sent to the receive end.

In a possible design, with reference to any one of the first aspect or the possible designs of the first aspect, that a transmit end determines, based on a frequency band of a first V2X service, a layer-2 address pair of the first V2X service includes: The transmit end sends a first correspondence to an access stratum (AS) of the transmit end using a V2X layer of the transmit end, where the first correspondence includes a correspondence between a layer-2 address pair of a V2X service and a frequency band of the V2X service. The method further includes: The transmit end stores the first correspondence at the AS.

Based on the possible design, the correspondence between a layer-2 address pair of a V2X service and a frequency band of the V2X service may be stored at the AS of the transmit end, such that the AS of the transmit end determines a frequency band of a V2X service based on a layer-2 address pair of the V2X service and the correspondence, and sends data of the V2X service to the receive end on the frequency band of the V2X service. This ensures that the data of the V2X service is sent on the configured frequency band of the V2X service, and improves transmission reliability of the data of the V2X service.

In a possible design, with reference to any one of the first aspect or the possible designs of the first aspect, that the transmit end sends data of the first V2X service to a receive end on the frequency band of the V2X service based on the layer-2 address pair of the first V2X service includes: When the transmit end receives a first data packet at the AS and the first data packet carries the data of the first V2X service and the layer-2 address pair of the first V2X service, the transmit end obtains the frequency band of the first V2X service based on the first correspondence and the layer-2 address pair of the first V2X service. The transmit end sends, at the AS, the data of the first V2X service to the receive end on the frequency band of the first V2X service based on the destination layer-2 address in the layer-2 address pair of the first V2X service.

Based on the possible design, the transmit end may obtain a frequency band of a V2X service based on the first correspondence and a layer-2 address pair of the V2X service, and send data of the V2X service to the receive end on the frequency band of the V2X service. This is simple and easy to implement.

In a possible design, with reference to any one of the first aspect or the possible designs of the first aspect, that a transmit end determines, based on a frequency band of a first V2X service, a layer-2 address pair of the first V2X service includes: If a PC5 unicast link corresponding to the frequency band of the first V2X service exists between the transmit end and the receive end, the transmit end uses a layer-2 address pair of the PC5 unicast link as the layer-2 address pair of the first V2X service. Alternatively, if no PC5 unicast link corresponding to the frequency band of the first V2X service exists between the transmit end and the receive end, the transmit end sends a first request and the source layer-2 address of the first V2X service to the receive end, where the first request is used to request the destination layer-2 address of the first V2X service; and the transmit end receives a response to the first request and the destination layer-2 address of the first V2X service from the receive end. Alternatively, if no PC5 unicast link corresponding to the frequency band of the first V2X service exists between the transmit end and the receive end, the transmit end sends a first request and the source layer-2 address of the first V2X service to the receive end, where the first request is used to request the destination layer-2 address of the first V2X service, and where the first request includes the source layer-2 address of the first V2X service; and the transmit end receives a response to the first request and the destination layer-2 address of the first V2X service from the receive end, where the response to the first request includes the destination layer-2 address of the first V2X service.

Based on the possible design, a layer-2 address pair of a V2X service may be obtained over a PC5 unicast link. An established PC5 unicast link is associated with a frequency band, and a layer-2 address pair of the PC5 unicast link corresponding to the frequency band of the V2X service is used as the layer-2 address pair of the V2X service. In this way, a plurality of V2X services on a same frequency band can use a layer-2 address pair of a same PC5 unicast link. This reduces complexity of obtaining the layer-2 address pair of the V2X service, and reduces signaling overheads.

In a possible design, with reference to any one of the first aspect or the possible designs of the first aspect, the method further includes: The transmit end determines, based on the frequency band of the first V2X service and a second correspondence, whether the PC5 unicast link corresponding to the frequency band of the first V2X service exists between the transmit end and the receive end, where the second correspondence is a correspondence between an identifier of a PC5 unicast link and a frequency band.

Based on the possible design, whether a PC5 unicast link corresponding to a frequency band of a V2X service exists may be determined based on the correspondence between an identifier of a PC5 unicast link and a frequency band. This is simple and easy to implement.

In a possible design, with reference to any one of the first aspect or the possible designs of the first aspect, the method includes: The transmit end sends a common layer-2 address to the receive end, where the common layer-2 address is used by the receive end to identify the frequency band of the first V2X service.

Based on the possible design, when negotiating with the receive end to establish a PC5 unicast link, the transmit end may send a common layer-2 address to the receive end. As such, the receive end: identifies a frequency band based on the common layer-2 address, where the PC5 unicast link is established for a V2X service on this frequency band; and allocates a proper destination layer-2 address to the V2X service on the frequency band.

In a possible design, with reference to any one of the first aspect or the possible designs of the first aspect, that a transmit end determines, based on a frequency band of a first V2X service, a layer-2 address pair of the first V2X service includes: If a PC5 unicast link exists between the transmit end and the receive end, the transmit end negotiates the layer-2 address pair of the first V2X service with the receive end over the PC5 unicast link. Alternatively, if no PC5 unicast link exists between the transmit end and the receive end, the transmit end sends a second request and a source layer-2 address of a PC5 unicast link to the receive end, where the second request is used to request the destination layer-2 address of the first V2X service, and where the second request includes the source layer-2 address of the first V2X service; and the transmit end receives a response to the second request and a destination layer-2 address of the PC5 unicast link from the receive end, where the response to the second request includes the destination layer-2 address of the first V2X service. Alternatively, if no PC5 unicast link exists between the transmit end and the receive end, the transmit end sends a second request and a source layer-2 address of a PC5 unicast link to the receive end, where the second request is used to request the destination layer-2 address of the first V2X service, and where the second request includes the source layer-2 address of the PC5 unicast link and the source layer-2 address of the first V2X service; and the transmit end receives a response to the second request and a destination layer-2 address of the PC5 unicast link from the receive end, where the response to the second request includes the destination layer-2 address of the PC5 unicast link and the destination layer-2 address of the first V2X service.

Based on the possible design, a PC5 unicast link may be established between the transmit end and the receive end, and layer-2 address pairs of a plurality of V2X services may be negotiated over the established PC5 unicast link. In this way, the layer-2 address pairs of the plurality of V2X services can be obtained over only one signaling-plane link, and signaling overheads are reduced.

In another possible design, with reference to any one of the first aspect or the possible designs of the first aspect, that the transmit end negotiates the layer-2 address pair of the first V2X service with the receive end over the PC5 unicast link includes: The transmit end sends a third request and a layer-2 address pair of the PC5 unicast link to the receive end, where the third request is used to request the destination layer-2 address of the first V2X service, and where the third request includes the source layer-2 address of the first V2X service; and the transmit end receives a response to the third request from the receive end, where the response to the third request includes the destination layer-2 address of the first V2X service.

In another possible design, with reference to any one of the first aspect or the possible designs of the first aspect, the method further includes: The transmit end determines the frequency band of the first V2X service based on an identifier of the first V2X service and a third correspondence, where the third correspondence is a correspondence between an identifier of a V2X service and a frequency band of the V2X service.

The third correspondence may be configured by a policy control network element for the transmit end. For example, the method further includes: The transmit end receives the third correspondence from the policy control network element.

Based on the possible design, a frequency band of a V2X service may be determined based on a configuration of the policy control network element. This is simple and easy to implement.

In another possible design, with reference to any one of the first aspect or the possible designs of the first aspect, that a transmit end determines, based on a frequency band of a first V2X service, a layer-2 address pair of the first V2X service includes: If the frequency band of the first V2X service is an available frequency band between the transmit end and the receive end, the transmit end determines the layer-2 address pair of the first V2X service based on the frequency band of the first V2X service.

Based on the possible design, data of a V2X service can be sent to the receive end on an available frequency band. This ensures transmission reliability of the data of the V2X service.

According to a second aspect, this application provides a communications apparatus. The communications apparatus may be a transmit end, or a chip or a system-on-a-chip in a transmit end. The communications apparatus may implement functions performed by the transmit end in the foregoing aspect or the possible designs, and the functions may be implemented by hardware, or may be implemented by hardware executing corresponding software. The hardware or the software includes one or more modules corresponding to the foregoing functions. For example, the communications apparatus may include a determining unit and a sending unit.

The determining unit is configured to determine, based on a frequency band of a first V2X service, a layer-2 address pair that is of the first V2X service and that includes a source layer-2 address of the first V2X service and a destination layer-2 address of the first V2X service, where the layer-2 address pair of the first V2X service corresponds to the frequency band of the first V2X service. Additionally, the sending unit is configured to send data of the first V2X service to a receive end on the frequency band of the first V2X service based on the layer-2 address pair of the first V2X service.

Based on the second aspect, the communications apparatus may determine a layer-2 address pair of a V2X service based on a frequency band of the V2X service, to ensure that data of the V2X service is sent on the frequency band of the V2X service based on the layer-2 address pair of the V2X service. This avoids a problem that a V2X service fails to be received or is incorrectly received because V2X services on different frequency bands are put together and sent to the receive end.

For an implementation of the communications apparatus, refer to behavior functions of the transmit end in the communication method provided in any one of the first aspect or the possible designs of the first aspect. Examples are as follows.

In a possible design, with reference to the second aspect, the frequency band of the first V2X service is a first frequency band, and the layer-2 address pair of the first V2X service is different from a layer-2 address pair of a V2X service other than a V2X service corresponding to the first frequency band.

Based on the possible design, different layer-2 address pairs may be determined for V2X services on different frequency bands, such that data of a V2X service is sent, based on a layer-2 address pair of the V2X service, on a frequency band corresponding to the V2X service. This prevents data of the V2X services on different frequency bands from being mixed and sent together, and improves transmission reliability of the data of the V2X service.

In a possible design, with reference to either the second aspect or the possible design of the second aspect, the determining unit is further configured to determine a layer-2 address pair of a second V2X service based on a frequency band of the second V2X service, where the frequency band of the first V2X service is different from the frequency band of the second V2X service, and where the layer-2 address pair of the first V2X service is different from the layer-2 address pair of the second V2X service. If the frequency band of the first V2X service is the same as the frequency band of the second V2X service, the layer-2 address pair of the first V2X service may be the same as or different from the layer-2 address pair of the second V2X service.

Based on the possible design, layer-2 address pairs of a plurality of V2X services may be determined, and layer-2 address pairs of V2X services on different frequency bands are different. This avoids a problem that a V2X service fails to be received or is incorrectly received because the V2X services on different frequency bands are put together and sent to the receive end.

In a possible design, with reference to any one of the second aspect or the possible designs of the second aspect, the determining unit is configured to send a first correspondence to an AS of the transmit end using a V2X layer of the transmit end, where the first correspondence includes a correspondence between a layer-2 address pair of a V2X service and a frequency band of the V2X service. The communications apparatus further includes a storage unit configured to store the first correspondence at the AS.

Based on the possible design, the correspondence between a layer-2 address pair of a V2X service and a frequency band of the V2X service may be stored at the AS of the transmit end, such that the AS of the transmit end determines a frequency band of a V2X service based on a layer-2 address pair of the V2X service and the correspondence, and sends data of the V2X service to the receive end on the frequency band of the V2X service. This ensures that the data of the V2X service is sent on the configured frequency band of the V2X service, and improves transmission reliability of the data of the V2X service.

In a possible design, with reference to any one of the second aspect or the possible designs of the second aspect, the sending unit is configured to: when a first data packet is received and the first data packet carries the data of the first V2X service and the layer-2 address pair of the first V2X service, obtain the frequency band of the first V2X service based on the first correspondence and the layer-2 address pair of the first V2X service; and send the data of the first V2X service to the receive end on the frequency band of the first V2X service based on the destination layer-2 address in the layer-2 address pair of the first V2X service.

Based on the possible design, the sending unit may obtain a frequency band of a V2X service based on the first correspondence and a layer-2 address pair of the V2X service, and send data of the V2X service to the receive end on the frequency band of the V2X service. This is simple and easy to implement.

In a possible design, with reference to any one of the second aspect or the possible designs of the second aspect, the determining unit is configured to: if a PC5 unicast link corresponding to the frequency band of the first V2X service exists between the transmit end and the receive end, use a layer-2 address pair of the PC5 unicast link as the layer-2 address pair of the first V2X service; if no PC5 unicast link corresponding to the frequency band of the first V2X service exists between the transmit end and the receive end, send a first request and the source layer-2 address of the first V2X service to the receive end, where the first request is used to request the destination layer-2 address of the first V2X service; and receive a response to the first request and the destination layer-2 address of the first V2X service from the receive end; or if no PC5 unicast link corresponding to the frequency band of the first V2X service exists between the transmit end and the receive end, send a first request and the source layer-2 address of the first V2X service to the receive end, where the first request is used to request the destination layer-2 address of the first V2X service, and where the first request includes the source layer-2 address of the first V2X service; and receive a response to the first request and the destination layer-2 address of the first V2X service from the receive end, where the response to the first request includes the destination layer-2 address of the first V2X service.

Based on the possible design, a layer-2 address pair of a V2X service may be obtained over a PC5 unicast link. An established PC5 unicast link is associated with a frequency band, and a layer-2 address pair of the PC5 unicast link corresponding to the frequency band of the V2X service is used as the layer-2 address pair of the V2X service. In this way, a plurality of V2X services on a same frequency band can use a layer-2 address pair of a same PC5 unicast link. This reduces complexity of obtaining the layer-2 address pair of the V2X service, and reduces signaling overheads.

In a possible design, with reference to any one of the second aspect or the possible designs of the second aspect, the determining unit is configured to determine, based on the frequency band of the first V2X service and a second correspondence, whether the PC5 unicast link corresponding to the frequency band of the first V2X service exists between the transmit end and the receive end, where the second correspondence is a correspondence between an identifier of a PC5 unicast link and a frequency band. Based on the possible design, whether a PC5 unicast link corresponding to a frequency band of a V2X service exists may be determined based on the correspondence between an identifier of a PC5 unicast link and a frequency band. This is simple and easy to implement.

In a possible design, with reference to any one of the second aspect or the possible designs of the second aspect, the sending unit is further configured to send a common layer-2 address to the receive end, where the common layer-2 address is used by the receive end to identify the frequency band of the first V2X service.

Based on the possible design, when negotiating with the receive end to establish a PC5 unicast link, the transmit end may send a common layer-2 address to the receive end, such that the receive end identifies a frequency band based on the common layer-2 address, where the PC5 unicast link is established for a V2X service on this frequency band; and allocates a proper destination layer-2 address to the V2X service on the frequency band.

In a possible design, with reference to any one of the second aspect or the possible designs of the second aspect, the determining unit is configured to: if a PC5 unicast link exists between the transmit end and the receive end, negotiate the layer-2 address pair of the first V2X service with the receive end over the PC5 unicast link; if no PC5 unicast link exists between the transmit end and the receive end, send a second request and a source layer-2 address of a PC5 unicast link to the receive end, where the second request is used to request the destination layer-2 address of the first V2X service, and where the second request includes the source layer-2 address of the first V2X service; and receive a response to the second request and a destination layer-2 address of the PC5 unicast link from the receive end, where the response to the second request includes the destination layer-2 address of the first V2X service; or if no PC5 unicast link exists between the transmit end and the receive end, send a second request and a source layer-2 address of a PC5 unicast link to the receive end, where the second request is used to request the destination layer-2 address of the first V2X service, and where the second request includes the source layer-2 address of the PC5 unicast link and the source layer-2 address of the first V2X service; and receive a response to the second request and a destination layer-2 address of the PC5 unicast link from the receive end, where the response to the second request includes the destination layer-2 address of the PC5 unicast link and the destination layer-2 address of the first V2X service.

Based on the possible design, a PC5 unicast link may be established between the transmit end and the receive end, and layer-2 address pairs of a plurality of V2X services may be negotiated over the established PC5 unicast link. In this way, the layer-2 address pairs of the plurality of V2X services can be obtained over only one signaling-plane link, and signaling overheads are reduced.

In another possible design, with reference to any one of the second aspect or the possible designs of the second aspect, the determining unit is configured to: send a third request and a layer-2 address pair of the PC5 unicast link to the receive end, where the third request is used to request the destination layer-2 address of the first V2X service, and where the third request includes the source layer-2 address of the first V2X service; and receive a response to the third request from the receive end, where the response to the third request includes the destination layer-2 address of the first V2X service.

In another possible design, with reference to any one of the second aspect or the possible designs of the second aspect, the determining unit is further configured to determine the frequency band of the first V2X service based on an identifier of the first V2X service and a third correspondence, where the third correspondence is a correspondence between an identifier of a V2X service and a frequency band of the V2X service. The third correspondence may be configured by a policy control network element for the transmit end. For example, the communications apparatus further includes a receiving unit configured to receive the third correspondence from the policy control network element.

Based on the possible design, a frequency band of a V2X service may be determined based on a configuration of the policy control network element. This is simple and easy to implement.

In another possible design, with reference to any one of the second aspect or the possible designs of the second aspect, the determining unit is configured to: if the frequency band of the first V2X service is an available frequency band between the transmit end and the receive end, determine the layer-2 address pair of the first V2X service based on the frequency band of the first V2X service. Based on the possible design, data of a V2X service can be sent to the receive end on an available frequency band. This ensures transmission reliability of the data of the V2X service.

According to a third aspect, a communications apparatus is provided. The communications apparatus includes a processor and a memory. The memory is configured to store a computer-executable instruction. When the communications apparatus runs, the processor executes the computer-executable instruction stored in the memory, to enable the communications apparatus to perform the communication method according to any one of the first aspect or the possible designs of the first aspect.

According to a fourth aspect, a computer-readable storage medium is provided. The computer-readable storage medium stores an instruction. When the instruction is run on a computer, the computer is enabled to perform the communication method according to any one of the first aspect or the possible designs of the foregoing aspect.

According to a fifth aspect, a computer program product including an instruction is provided. When the computer program product runs on a computer, the computer is enabled to perform the communication method according to any one of the first aspect or the possible designs of the foregoing aspect.

According to a sixth aspect, a chip system is provided. The chip system includes a processor and a communications interface configured to support a communications apparatus in implementing functions in the foregoing aspects. For example, the processor determines, based on a frequency band of a first V2X service, a layer-2 address pair that is of the first V2X service and that includes a source layer-2 address of the first V2X service and a destination layer-2 address of the first V2X service, where the layer-2 address pair of the first V2X service corresponds to the frequency band of the first V2X service; and sends data of the first V2X service to a receive end on the frequency band of the first V2X service based on the layer-2 address pair of the first V2X service. In a possible design, the chip system further includes a memory, and the memory is configured to store a program instruction and data that are necessary for the communications apparatus. The chip system may include a chip, or may include a chip and another discrete device.

For technical effects achieved by any one of the design manners in the third aspect to the sixth aspect, refer to technical effects achieved by any one of the first aspect or the possible designs of the first aspect. Details are not described again.

According to a seventh aspect, a communication method is provided. The method includes: A receive end receives, from a transmit end, a source layer-2 address of a first V2X service and a first request used to request a destination layer-2 address of the first V2X service; allocates a destination layer-2 identifier of the first V2X service based on the first request; and sends the destination layer-2 address of the first V2X service to the transmit end.

Based on the method according to the seventh aspect, the receive end may allocate a destination layer-2 address to a V2X service based on a request of the transmit end, and the transmit end and the receive end determine, through negotiation, a layer-2 address pair used to send data of the V2X service. This is simple and easy to implement.

In a possible design, with reference to the seventh aspect, that the receive end sends the destination layer-2 address of the first V2X service to the transmit end includes: The receive end sends a response to the first request to the transmit end, where the response to the first request includes the destination layer-2 address of the first V2X service. Alternatively, the receive end sends a response to the first request and the destination layer-2 address of the first V2X service to the transmit end, where the response to the first request includes the destination layer-2 address of the first V2X service.

Based on the possible design, the destination layer-2 address of the first V2X service may be carried in the response to the first request and sent to the transmit end. This is simple and easy to implement.

In a possible design, with reference to the seventh aspect or the possible design of the seventh aspect, the first request includes an identifier of the first V2X service. That the receive end allocates the destination layer-2 address of the first V2X service based on the first request includes: The receive end determines a frequency band of the first V2X service based on the identifier of the first V2X service and a correspondence between an identifier of a V2X service and a frequency band of the V2X service; and the receive end allocates the destination layer-2 address of the first V2X service based on the frequency band of the first V2X service.

Based on the possible design, a frequency band of a V2X service may be determined based on an identifier of the V2X service, and a destination layer-2 address is allocated to the V2X service based on the frequency band of the V2X service, such that data of the V2X service is subsequently sent on the frequency band of the V2X service based on the destination layer-2 address of the V2X service. This ensures transmission reliability of the data of the V2X service.

In another possible design, with reference to the seventh aspect, the first request includes a common layer-2 address. That the receive end allocates the destination layer-2 address of the first V2X service based on the first request includes: The receive end determines a frequency band of the first V2X service based on the common layer-2 address; and the receive end allocates the destination layer-2 address of the first V2X service based on the frequency band of the first V2X service.

Based on the possible design, a frequency band of a V2X service may be determined based on a common layer-2 address, and a destination layer-2 address is allocated to the V2X service based on the frequency band of the V2X service, such that data of the V2X service is subsequently sent on the frequency band of the V2X service based on the destination layer-2 address of the V2X service. This ensures transmission reliability of the data of the V2X service.

In another possible design, with reference to the seventh aspect, the method further includes: The receive end receives a common layer-2 address from the transmit end. That the receive end allocates the destination layer-2 address of the first V2X service based on the first request includes: The receive end allocates the destination layer-2 address of the first V2X service based on the first request and the common layer-2 address.

Based on the possible design, a destination layer-2 address may be allocated to a V2X service based on a first request and a common layer-2 address, such that data of the V2X service is subsequently sent on a frequency band of the V2X service based on the destination layer-2 address of the V2X service. This ensures transmission reliability of the data of the V2X service.

According to an eighth aspect, a communications apparatus is provided. The communications apparatus may be a receive end, or a chip or a system-on-a-chip in a receive end. The communications apparatus may implement functions performed by the receive end in the foregoing aspect or the possible designs, and the functions may be implemented by hardware, or may be implemented by hardware executing corresponding software. The hardware or the software includes one or more modules corresponding to the foregoing functions. For example, the communications apparatus may include a receiving unit, an allocation unit, and a sending unit.

The receiving unit is configured to receive, from a transmit end, a source layer-2 address of a first V2X service and a first request used to request a destination layer-2 address of the first V2X service; the allocation unit is configured to allocate a destination layer-2 identifier of the first V2X service based on the first request; and the sending unit is configured to send the destination layer-2 address of the first V2X service to the transmit end.

Based on the communications apparatus according to the eighth aspect, a destination layer-2 address may be allocated to a V2X service based on a request of the transmit end, and the transmit end and the receive end determine, through negotiation, a layer-2 address pair used to send data of the V2X service. This is simple and easy to implement.

In a possible design, with reference to the eighth aspect, the sending unit is configured to: send a response to the first request to the transmit end, where the response to the first request includes the destination layer-2 address of the first V2X service; or send a response to the first request and the destination layer-2 address of the first V2X service to the transmit end, where the response to the first request includes the destination layer-2 address of the first V2X service.

Based on the possible design, the destination layer-2 address of the first V2X service may be carried in the response to the first request and sent to the transmit end. This is simple and easy to implement.

In a possible design, with reference to the eighth aspect or the possible design of the eighth aspect, the first request includes an identifier of the first V2X service; and the allocation unit is configured to: determine a frequency band of the first V2X service based on the identifier of the first V2X service and a correspondence between an identifier of a V2X service and a frequency band of the V2X service; and allocate the destination layer-2 address of the first V2X service based on the frequency band of the first V2X service.

Based on the possible design, a frequency band of a V2X service may be determined based on an identifier of the V2X service, and a destination layer-2 address is allocated to the V2X service based on the frequency band of the V2X service, such that data of the V2X service is subsequently sent on the frequency band of the V2X service based on the destination layer-2 address of the V2X service. This ensures transmission reliability of the data of the V2X service.

In another possible design, with reference to the eighth aspect, the first request includes a common layer-2 address; and the allocation unit is configured to: determine a frequency band of the first V2X service based on the common layer-2 address; and allocate the destination layer-2 address of the first V2X service based on the frequency band of the first V2X service.

Based on the possible design, a frequency band of a V2X service may be determined based on a common layer-2 address, and a destination layer-2 address is allocated to the V2X service based on the frequency band of the V2X service, such that data of the V2X service is subsequently sent on the frequency band of the V2X service based on the destination layer-2 address of the V2X service. This ensures transmission reliability of the data of the V2X service.

In still another possible design, with reference to the eighth aspect, the receiving unit is further configured to receive a common layer-2 address from the transmit end; and the allocation unit is configured to allocate the destination layer-2 address of the first V2X service based on the first request and the common layer-2 address. Based on the possible design, a destination layer-2 address may be allocated to a V2X service based on a first request and a common layer-2 address, such that data of the V2X service is subsequently sent on a frequency band of the V2X service based on the destination layer-2 address of the V2X service. This ensures transmission reliability of the data of the V2X service.

According to a ninth aspect, a communications apparatus is provided. The communications apparatus includes a processor and a memory. The memory is configured to store a computer-executable instruction. When the communications apparatus runs, the processor executes the computer-executable instruction stored in the memory, to enable the communications apparatus to perform the communication method according to any one of the seventh aspect or the possible designs of the seventh aspect.

According to a tenth aspect, a computer-readable storage medium is provided. The computer-readable storage medium stores an instruction. When the instruction is run on a computer, the computer is enabled to perform the communication method according to any one of the seventh aspect or the possible designs of the foregoing aspect.

According to an eleventh aspect, a computer program product including an instruction is provided. When the computer program product runs on a computer, the computer is enabled to perform the communication method according to any one of the seventh aspect or the possible designs of the foregoing aspect.

According to a twelfth aspect, a chip system is provided. The chip system includes a processor and a communications interface configured to support a communications apparatus in implementing functions in the foregoing aspects. For example, the processor receives, from a transmit end through the communications interface, a source layer-2 address of a first V2X service and a first request used to request a destination layer-2 address of the first V2X service; allocates a destination layer-2 identifier of the first V2X service based on the first request; and sends the destination layer-2 address of the first V2X service to the transmit end. In a possible design, the chip system further includes a memory, and the memory is configured to store a program instruction and data that are necessary for the communications apparatus. The chip system may include a chip, or may include a chip and another discrete device.

For technical effects achieved by any one of the design manners in the ninth aspect to the twelfth aspect, refer to technical effects achieved by any one of the seventh aspect or the possible designs of the seventh aspect. Details are not described again.

According to a thirteenth aspect, a communication method is further provided. The method includes: A transmit end determines a QoS flow of a first V2X service based on a frequency band of the first V2X service and a QoS requirement of the first V2X service; and sends data of the first V2X service to a receive end using the QoS flow of the first V2X service.

Based on the method shown in the thirteenth aspect, a QoS flow may be established for a V2X service based on a frequency band of the V2X service and a QoS requirement of the V2X service, such that data of V2X services that are on a same frequency band and that have a same QoS requirement is subsequently filtered into a same QoS flow and sent to the receive end. This avoids a problem that a V2X service fails to be received or is incorrectly received because data of V2X services that are on different frequency bands and that have different QoS requirements is put together and sent to the receive end.

In a possible design, with reference to the thirteenth aspect, the frequency band of the first V2X service is a first frequency band, the QoS requirement of the first V2X service is a first QoS requirement, and the QoS flow of the first V2X service is different from a QoS flow of a V2X service other than a V2X service corresponding to the first frequency band and the first QoS requirement.

Based on the possible design, different QoS flows may be determined for V2X services that are on different frequency bands and that have different QoS requirements. This avoids a problem that a V2X service fails to be received or is incorrectly received because data of the V2X services that are on different frequency bands and that have different QoS requirements is sent to the receive end using a same QoS flow.

In a possible design, with reference to the thirteenth aspect or the possible design of the thirteenth aspect, the method further includes: The transmit end determines a QoS flow of a second V2X service based on a frequency band of the second V2X service and a QoS requirement of the second V2X service. If the frequency band of the first V2X service is different from the frequency band of the second V2X service and/or the QoS requirement of the first V2X service is different from the QoS requirement of the second V2X service, the QOS flow of the first V2X service is different from the QoS flow of the second V2X service. If the frequency band of the first V2X service is the same as the frequency band of the second V2X service, and the QOS requirement of the first V2X service is the same as the QoS requirement of the second V2X service, the QoS flow of the first V2X service may be the same as the QoS flow of the second V2X service.

Based on the possible design, different QoS flows may be determined for V2X services that are on different frequency bands and/or that have different QoS requirements, and a same QoS flow is determined for V2X services that are on a same frequency band and that have a same QoS requirement. This avoids a problem that a V2X service fails to be received or is incorrectly received because data of the V2X services that are on different frequency bands and that have different QoS requirements is sent to the receive end using a same QoS flow.

In a possible design, with reference to any one of the thirteenth aspect or the possible designs of the thirteenth aspect, that the transmit end sends data of the first V2X service to a receive end using the QoS flow of the first V2X service includes: The transmit end sends a fourth correspondence to an AS of the transmit end using a V2X layer of the transmit end, where the fourth correspondence is a correspondence between an identifier of a QoS flow of a V2X service and a frequency band of the V2X service. The method further includes: The transmit end stores the fourth correspondence at the AS.

Based on the possible design, the correspondence between an identifier of a QoS flow of a V2X service and a frequency band of the V2X service may be stored, such that data of a V2X service is subsequently transmitted based on the correspondence between an identifier of a QoS flow of a V2X service and a frequency band of the V2X service. This is simple and easy to implement.

In a possible design, with reference to any one of the thirteenth aspect or the possible designs of the thirteenth aspect, that the transmit end sends data of the first V2X service to a receive end using the QoS flow of the first V2X service includes: When the transmit end receives a first data packet at the V2X layer and the first data packet carries the data of the first V2X service, the transmit end filters, at the V2X layer, the data of the first V2X service into the QOS flow of the first V2X service; the transmit end sends, at the V2X layer, a second data packet to the AS, where the second data packet includes the data of the first V2X service, an identifier of the QoS flow of the first V2X service, and a layer-2 address pair of the first V2X service; the transmit end obtains, at the AS, the frequency band of the first V2X service based on the fourth correspondence and the identifier of the QoS flow of the first V2X service; and the transmit end sends, at the AS, the data of the first V2X service to the receive end on the frequency band of the first V2X service based on a destination layer-2 address in the layer-2 address pair of the first V2X service, where the QoS flow of the first V2X service includes the data of the first V2X service.

Based on the possible design, a frequency band of a V2X service may be obtained based on the correspondence between an identifier of a QoS flow of a V2X service and a frequency band of the V2X service, and data that is of the V2X service and that is in a QoS flow is sent to the receive end on the obtained frequency band of the V2X service. This ensures that the data of the V2X service is sent to the receive end on the frequency band of the V2X service, and improves transmission reliability of the data of the V2X service.

In a possible design, with reference to any one of the thirteenth aspect or the possible designs of the thirteenth aspect, that a transmit end determines a QoS flow of a first V2X service based on a frequency band of the first V2X service and a QoS requirement of the first V2X service includes: If a QoS flow corresponding to the frequency band of the first V2X service and the QoS requirement of the first V2X service exists between the transmit end and the receive end, the transmit end determines the QoS flow corresponding to the frequency band of the first V2X service and the QoS requirement of the first V2X service as the QoS flow of the first V2X service. Alternatively, if no QoS flow corresponding to the frequency band of the first V2X service and the QOS requirement of the first V2X service exists between the transmit end and the receive end, the transmit end establishes the QoS flow of the first V2X service for the first V2X service.

Based on the possible design, a plurality of V2X services that are on a same frequency band and that have a same QoS requirement may share a same QoS flow. This reduces a quantity of times of establishing QoS flows and reduces signaling overheads.

In a possible design, with reference to any one of the thirteenth aspect or the possible designs of the thirteenth aspect, the method further includes: The transmit end determines the frequency band of the first V2X service based on an identifier of the first V2X service and a third correspondence, where the third correspondence is a correspondence between an identifier of a V2X service and a frequency band of the V2X service. The third correspondence may be configured by a policy control network element for the transmit end. For example, the transmit end receives the third correspondence from the policy control network element.

Based on the possible design, a frequency band of a V2X service may be determined based on a configuration of the policy control network element. This is simple and easy to implement.

According to a fourteenth aspect, this application provides a communications apparatus. The communications apparatus may be a transmit end, or a chip or a system-on-a-chip in a transmit end. The communications apparatus may implement functions performed by the transmit end in the foregoing aspect or the possible designs, and the functions may be implemented by hardware, or may be implemented by hardware executing corresponding software. The hardware or the software includes one or more modules corresponding to the foregoing functions. For example, the communications apparatus may include a determining unit and a sending unit.

The determining unit is configured to determine a QoS flow of a first V2X service based on a frequency band of the first V2X service and a QoS requirement of the first V2X service; and the sending unit is configured to send data of the first V2X service to a receive end using the QOS flow of the first V2X service.

Based on the communications apparatus shown in the fourteenth aspect, a QoS flow may be established for a V2X service based on a frequency band of the V2X service and a QoS requirement of the V2X service, such that data of V2X services that are on a same frequency band and that have a same QoS requirement is subsequently filtered into a same QoS flow and sent to the receive end. This avoids a problem that a V2X service fails to be received or is incorrectly received because data of V2X services that are on different frequency bands and that have different QoS requirements is put together and sent to the receive end.

In a possible design, with reference to the fourteenth aspect, the frequency band of the first V2X service is a first frequency band, the QoS requirement of the first V2X service is a first QoS requirement, and the QoS flow of the first V2X service is different from a QOS flow of a V2X service other than a V2X service corresponding to the first frequency band and the first QoS requirement.

Based on the possible design, different QoS flows may be determined for V2X services that are on different frequency bands and that have different QoS requirements. This avoids a problem that a V2X service fails to be received or is incorrectly received because data of the V2X services that are on different frequency bands and that have different QoS requirements is sent to the receive end using a same QoS flow.

In a possible design, with reference to the fourteenth aspect or the possible design of the fourteenth aspect, the determining unit is further configured to determine a QoS flow of a second V2X service based on a frequency band of the second V2X service and a QoS requirement of the second V2X service. If the frequency band of the first V2X service is different from the frequency band of the second V2X service and/or the QOS requirement of the first V2X service is different from the QoS requirement of the second V2X service, the QoS flow of the first V2X service is different from the QOS flow of the second V2X service. If the frequency band of the first V2X service is the same as the frequency band of the second V2X service, and the QoS requirement of the first V2X service is the same as the QoS requirement of the second V2X service, the QoS flow of the first V2X service may be the same as the QoS flow of the second V2X service.

Based on the possible design, different QoS flows may be determined for V2X services that are on different frequency bands and/or that have different QoS requirements, and a same QoS flow is determined for V2X services that are on a same frequency band and that have a same QoS requirement. This avoids a problem that a V2X service fails to be received or is incorrectly received because data of the V2X services that are on different frequency bands and that have different QoS requirements is sent to the receive end using a same QoS flow.

In a possible design, with reference to any one of the fourteenth aspect or the possible designs of the fourteenth aspect, the sending unit is configured to send a fourth correspondence to an AS of the transmit end using a V2X layer of the transmit end, where the fourth correspondence is a correspondence between an identifier of a QoS flow of a V2X service and a frequency band of the V2X service. The communications apparatus further includes a storage unit configured to store the fourth correspondence at the AS.

Based on the possible design, the correspondence between an identifier of a QoS flow of a V2X service and a frequency band of the V2X service may be stored, such that data of a V2X service is subsequently transmitted based on the correspondence between an identifier of a QoS flow of a V2X service and a frequency band of the V2X service. This is simple and easy to implement.

In a possible design, with reference to any one of the fourteenth aspect or the possible designs of the fourteenth aspect, the sending unit is configured to: when a first data packet is received and the first data packet carries the data of the first V2X service, filter the data of the first V2X service into the QOS flow of the first V2X service; send a second data packet to the AS, where the second data packet includes the data of the first V2X service, an identifier of the QoS flow of the first V2X service, and a layer-2 address pair of the first V2X service; obtain the frequency band of the first V2X service based on the fourth correspondence and the identifier of the QoS flow of the first V2X service; and send the data of the first V2X service to the receive end on the frequency band of the first V2X service based on a destination layer-2 address in the layer-2 address pair of the first V2X service, where the QOS flow of the first V2X service includes the data of the first V2X service.

Based on the possible design, a frequency band of a V2X service may be obtained based on the correspondence between an identifier of a QoS flow of a V2X service and a frequency band of the V2X service, and data that is of the V2X service and that is in a QoS flow is sent to the receive end on the obtained frequency band of the V2X service. This ensures that the data of the V2X service is sent to the receive end on the frequency band of the V2X service, and improves transmission reliability of the data of the V2X service.

In a possible design, with reference to any one of the fourteenth aspect or the possible designs of the fourteenth aspect, the determining unit is configured to: if a QoS flow corresponding to the frequency band of the first V2X service and the QOS requirement of the first V2X service exists between the transmit end and the receive end, determine the QoS flow corresponding to the frequency band of the first V2X service and the QOS requirement of the first V2X service as the QoS flow of the first V2X service; or if no QoS flow corresponding to the frequency band of the first V2X service and the QoS requirement of the first V2X service exists between the transmit end and the receive end, establish the QoS flow of the first V2X service for the first V2X service.

Based on the possible design, a plurality of V2X services that are on a same frequency band and that have a same QoS requirement may share a same QoS flow. This reduces a quantity of times of establishing QoS flows and reduces signaling overheads.

In a possible design, with reference to any one of the fourteenth aspect or the possible designs of the fourteenth aspect, the determining unit is further configured to determine the frequency band of the first V2X service based on an identifier of the first V2X service and a third correspondence, where the third correspondence is a correspondence between an identifier of a V2X service and a frequency band of the V2X service. The third correspondence may be configured by a policy control network element for the transmit end. For example, the communications apparatus further includes a receiving unit configured to receive the third correspondence from the policy control network element.

Based on the possible design, a frequency band of a V2X service may be determined based on a configuration of the policy control network element. This is simple and easy to implement.

According to a fifteenth aspect, a communications apparatus is provided. The communications apparatus includes a processor and a memory. The memory is configured to store a computer-executable instruction. When the communications apparatus runs, the processor executes the computer-executable instruction stored in the memory, to enable the communications apparatus to perform the communication method according to any one of the thirteenth aspect or the possible designs of the thirteenth aspect.

According to a sixteenth aspect, a computer-readable storage medium is provided. The computer-readable storage medium stores an instruction. When the instruction is run on a computer, the computer is enabled to perform the communication method according to any one of the thirteenth aspect or the possible designs of the foregoing aspect.

According to a seventeenth aspect, a computer program product including an instruction is provided. When the computer program product runs on a computer, the computer is enabled to perform the communication method according to any one of the thirteenth aspect or the possible designs of the foregoing aspect.

According to an eighteenth aspect, a chip system is provided. The chip system includes a processor and a communications interface configured to support a communications apparatus in implementing functions in the foregoing aspects. For example, the processor determines a QoS flow of a first V2X service based on a frequency band of the first V2X service and a QoS requirement of the first V2X service, and sends data of the first V2X service to a receive end using the QoS flow of the first V2X service. In a possible design, the chip system further includes a memory, and the memory is configured to store a program instruction and data that are necessary for the communications apparatus. The chip system may include a chip, or may include a chip and another discrete device.

For technical effects achieved by any one of the design manners in the fifteenth aspect to the eighteenth aspect, refer to technical effects achieved by any one of the thirteenth aspect or the possible designs of the thirteenth aspect. Details are not described again.

According to a nineteenth aspect, a communications system is provided. The communications system may include the transmit end according to any one of the second aspect to the sixth aspect and the receive end according to any one of the eighth aspect to the twelfth aspect. Alternatively, the communications system includes the transmit end and the receive end according to any one of the fourteenth aspect to the eighteenth aspect.

DESCRIPTION OF EMBODIMENTS

The following describes implementations of the embodiments of this application in detail with reference to the accompanying drawings.

A method provided in the embodiments of this application may be used in a communications system supporting V2X service transmission. The communications system may be a 3rd generation partnership project (3GPP) communications system such as a Long-Term Evolution (LTE) system, a 5th generation (5G) mobile communications system, a new radio (NR) system, or another next generation communications system; or the communications system may be a non-3GPP communications system. This is not limited. A communications system shown in FIG. 1 is only used as an example to describe the communication method provided in the embodiments of this application.

Figure 1:
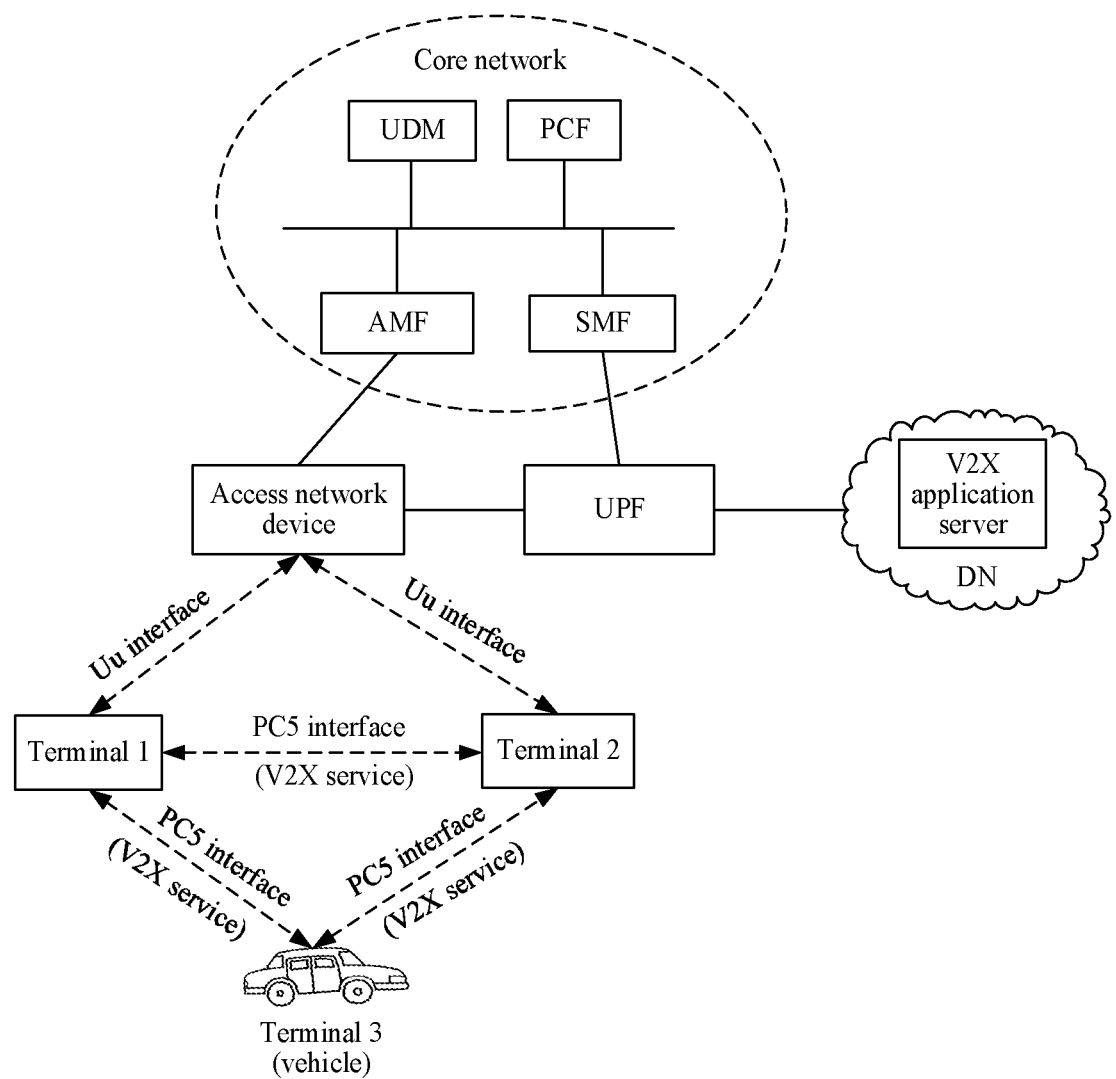
FIG. 1 is a schematic architectural diagram of a communications system according to an embodiment of this application.

As shown in FIG. 1, an architectural diagram of a communications system is provided. The communications system may include a plurality of terminals, an access network device, an access and mobility management function (AMF), a policy control function (PCF), a unified data management (UDM) function, a session management function (SMF), a user plane function (UPF), a data network (DN), and the like. The DN may include a V2X application server (APP server). In FIG. 1, the terminal may interact with the access network device through a Uu interface, and access a network through the access network device. The terminal may further perform direct communication with another terminal through a PC5 interface. For example, the terminal may send a V2X service to the other terminal through the PC5 interface.

The terminal may be referred to as terminal equipment, a user equipment (UE), a mobile station (MS), a mobile terminal (MT), or the like. For example, the terminal in FIG. 1 may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart household, a vehicle-mounted terminal, or the like. In the communications system shown in FIG. 1, the terminal may perform one-to-one communication, namely, unicast communication, with another terminal in the communications system, or may perform groupcast communication with a plurality of other terminals in the communications system. For example, a terminal 1 may perform unicast communication with a terminal 2, or may perform groupcast communication with the terminal 2 and a terminal 3. This is not limited. In the embodiments of this application, unicast communication is only used as an example to describe the communication method provided in the embodiments of this application.

The PCF is mainly configured to configure a V2X communication parameter for the terminal. For example, the PCF may determine, for the terminal based on a network resource deployment status and subscription and authorization information of the terminal, a frequency band corresponding to a V2X service, and configure, for the terminal, a correspondence between an identifier of a V2X service and a frequency band of the V2X service. It should be noted that a name of the PCF is not limited, and the PCF may also be named as a policy control network element or the like.

For related functions of other network elements in FIG. 1, for example, the access network device, the AMF, and the UPF, refer to existing descriptions. Details are not described.

In the system shown in FIG. 1, in an example, different layer-2 address pairs may be determined for V2X services on different frequency bands, and the V2X service is sent based on a correspondence between a frequency band of a V2X service and a layer-2 address pair of the V2X service. In this way, the V2X service is sent on a frequency band of the V2X service. For example, for the implementation process, refer to descriptions in the embodiments corresponding to the methods shown in FIG. 4 to FIG. 6C. Alternatively, in another example, a QoS flow of a V2X service may be determined based on a frequency band of the V2X service and a QoS requirement of the V2X service.

V2X services that are on a same frequency band and that have a same QoS requirement are filtered into a same QoS flow, and V2X services that are on different frequency bands and/or that have different QOS requirements are filtered into different QOS flows. The V2X service is sent using the QoS flow of the V2X service. For example, for the implementation process, refer to descriptions in the embodiment corresponding to FIG. 7A to FIG. 7C.

It should be noted that FIG. 1 is only an example architectural diagram, and a quantity of network elements included in the communications system shown in FIG. 1 is not limited in the embodiments of this application. Although not shown, in addition to the network function entities shown in FIG. 1, the communications system shown in FIG. 1 may further include another function entity. For example, the communications system may further include a monitoring module, and the monitoring module is configured to monitor a working status of each device in the network. In addition, names of the devices in FIG. 1 and names of interfaces between the devices are not limited. In addition to the names shown in FIG. 1, each device may alternatively have another name. For example, each name may be replaced with a name of a network element that has a same or similar function. This is not limited.

Figure 2:
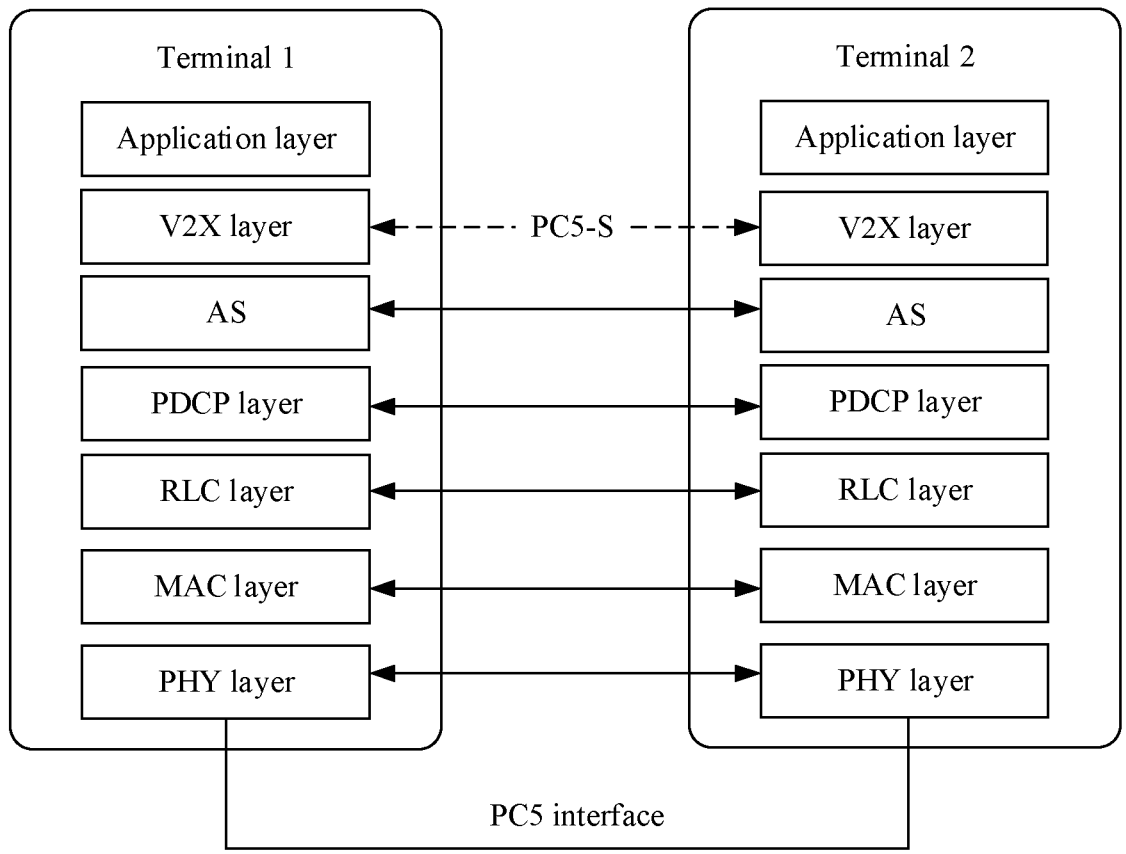
FIG. 2 is a schematic diagram of protocol layers of a terminal according to an embodiment of this application.

For example, to support direct communication between terminals, two terminals that perform direct communication may establish protocol layers shown in FIG. 2, and a V2X service is transmitted using the protocol layers. As shown in FIG. 2, two terminals (for example, a terminal 1 and a terminal 2) that perform direct communication each include an application layer, a V2X layer, an AS, a packet data convergence protocol (PDCP) layer, a radio link control (RLC) layer, a media access control (MAC) layer, and a physical layer (PHY layer).

The application layer is mainly used to provide a V2X service, for example, generate a V2X service.

The V2X layer is mainly used to determine a frequency band of a V2X service, is responsible for establishing a PC5 unicast link, and so on. The V2X layer may store a correspondence between an identifier of a V2X service and a frequency band of the V2X service. The V2X layer of the terminal may be independently deployed in the terminal, or may be deployed at another protocol layer of the terminal. For example, the V2X layer may be integrated into the AS of the terminal. If the V2X layer is integrated into the AS, an action performed by the V2X layer may be considered as being performed by the AS. This is not limited. In the embodiments of this application, an example in which the V2X layer of the terminal is independently deployed in the terminal is used for description. This is not limited. In addition, a name of the V2X layer is not limited. For example, the V2X layer may alternatively be named as a PC5-S layer or another protocol layer that has a function of the V2X layer in the embodiments of this application.

The AS is mainly used to filter a V2X service into a corresponding QoS flow. The AS may store (or record) a data packet filter set or a QoS flow (QF) related parameter (for example, a QoS flow identifier (QFI)).

For functions of the PDCP layer, the RLC layer, the MAC layer, and the PHY layer in FIG. 2, refer to functions of the PDCP layer, the RLC layer, the MAC layer, and the PHY layer in other approaches. Details are not described.

It should be noted that FIG. 2 is only an example diagram of protocol layers of the terminal. In addition to the protocol layers shown in FIG. 2, the terminal may further include another protocol layer, for example, a service data adaptation (SDAP) layer or a radio resource control (RRC) layer.

This is not limited. In addition, a name of each protocol layer in FIG. 2 is not limited. In addition to the name shown in FIG. 2, each protocol layer may alternatively have another name. For example, the name may be replaced with a name of a protocol layer that has a same or similar function. This is not limited.

Figure 3:
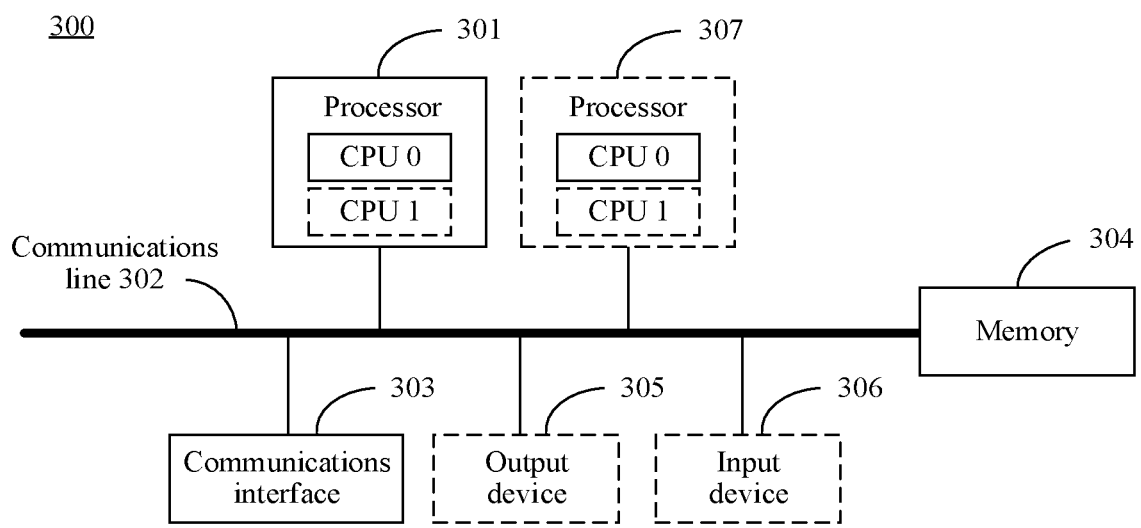
FIG. 3 is a schematic composition diagram of a communications apparatus according to an embodiment of this application.

During implementation, each device shown in FIG. 1, for example, the terminal in FIG. 1, may use a composition structure shown in FIG. 3, or include components shown in FIG. 3.

FIG. 3 is a schematic composition diagram of a communications apparatus 300 according to an embodiment of this application. The communications apparatus 300 may be a terminal, or a chip or a system-on-a-chip in a terminal. The communications apparatus 300 includes a processor 301, a communications line 302, and a communications interface 303.

Further, the communications apparatus 300 may further include a memory 304. The processor 301, the memory 304, and the communications interface 303 may be connected to each other through the communications line 302.

The processor 301 may be a central processing unit (CPU), a general-purpose processor, a network processor (NP), a digital signal processor (DSP), a microprocessor, a microcontroller, a programmable logic device (PLD), or any combination thereof. The processor 301 may alternatively be any other apparatus having a processing function, for example, a circuit, a component, or a software module. This is not limited.

The communications line 302 is used to transfer information between the components included in the communications apparatus 300.

The communications interface 303 is configured to communicate with another device or another communications network. The other communications network may be the Ethernet, a radio access network (RAN), a wireless local area network (WLAN), or the like. The communications interface 303 may be a module, a circuit, a transceiver, or any apparatus that can implement communication.

The memory 304 is configured to store an instruction. The instruction may be a computer program.

The memory 304 may be a read-only memory (ROM) or another type of static storage device that can store static information and/or instructions, may be a random access memory (RAM) or another type of dynamic storage device that can store information and/or instructions, or may be an electrically erasable programmable read-only memory EEPROM), a compact disc read-only memory (CD-ROM or another compact disc storage, an optical disc storage (including a compact disc, a laser disc, an optical disc, a digital versatile disc, a Blu-ray optical disc, and the like). This is not limited.

It should be noted that the memory 304 may be independent of the processor 301, or may be integrated with the processor 301. The memory 304 may be configured to store an instruction, program code, some data, or the like. The memory 304 may be located inside the communications apparatus 300, or may be located outside the communications apparatus 300. This is not limited.

The processor 301 is configured to execute the instruction stored in the memory 304, to implement the communication method provided in the following embodiments of this application. For example, if the communications apparatus 300 is a terminal, or a chip or a system-on-a-chip in a terminal, the processor 301 may execute the instruction stored in the memory 304, to implement a step performed by a transmit end in the following embodiments of this application.

In an example, the processor 301 may include one or more CPUs, for example, a CPU 0 and a CPU 1 in FIG. 3.

In an optional implementation, the communications apparatus 300 includes a plurality of processors. For example, in addition to the processor 301 in FIG. 3, the communications apparatus 300 may further include a processor 307.

In an optional implementation, the communications apparatus 300 further includes an output device 305 and an input device 306. For example, the input device 306 is a device such as a keyboard, a mouse, a microphone, or a joystick, and the output device 305 is a device such as a display or a speaker.

It should be noted that the communications apparatus 300 may be a desktop computer, a portable computer, a network server, a mobile phone, a tablet computer, a wireless terminal, an embedded device, a chip system, or a device with a structure similar to that in FIG. 3. In addition, the composition structure shown in FIG. 3 does not constitute a limitation on the communications apparatus. In addition to the components shown in FIG. 3, the communications apparatus may include more or fewer components than those shown in the figure, or combine some components, or have a different component arrangement.

In the embodiments of this application, the chip system may include a chip, or may include a chip and another discrete device.

In addition, actions, terms, and the like in the embodiments of this application may be mutually referenced. This is not limited. In the embodiments of this application, names of messages exchanged between devices, names of parameters in the messages, or the like are merely examples. During implementation, other names may alternatively be used. This is not limited.

The architecture shown in FIG. 1 is used below as an example to describe the communication method provided in the embodiments of this application.

Figure 4:
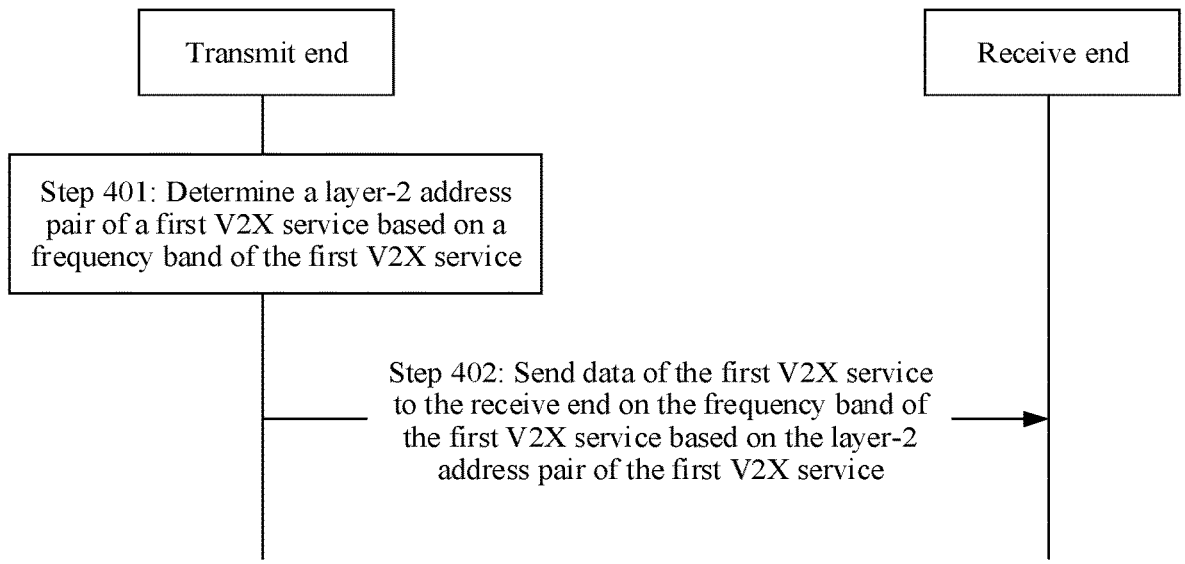
FIG. 4 is a flowchart of a communication method according to an embodiment of this application.

FIG. 4 shows a communication method according to an embodiment of this application. As shown in FIG. 4, the method may include the following steps.

Step 401: A transmit end determines a layer-2 address pair of a first V2X service based on a frequency band of the first V2X service.

The transmit end may be any terminal that sends data of the first V2X service to another terminal through a PC5 interface in FIG. 1. For example, the transmit end may be the terminal 1 in FIG. 1. It should be noted that the transmit end corresponds to a receive end, and the receive end may be any terminal that receives, through the PC5 interface, a V2X service sent by the transmit end. For example, if the transmit end is the terminal 1 in FIG. 1, the receive end may be the terminal 2 or the terminal 3 in FIG. 1.

The first V2X service may be any V2X service. For example, the first V2X service may be a vehicle to vehicle safety and awareness service or a non-safety application service. The first V2X service may be uniquely identified using an identifier (e.g., service identifier (ID)) of the first V2X service, and the identifier of the first V2X service may also be referred to as a service identifier of the first V2X service or the like. For example, the identifier of the first V2X service may be a provider service identifier (PSID), an intelligent transport system-application identifier (ITS-AID), or the like.

The data of the first V2X service may be sent to the receive end on the frequency band of the first V2X service.

The frequency band of the first V2X service may be obtained through pre-division performed by an operator based on a requirement, and different types of V2X services may correspond to different frequency bands. For example, there is a correspondence between an identifier of a V2X service and a frequency band of the V2X service. The transmit end may determine the frequency band of the first V2X service based on the identifier of the first V2X service and the correspondence between an identifier of a V2X service and a frequency band of the V2X service.

The correspondence between an identifier of a V2X service and a frequency band of the V2X service may be configured by a PCF for the transmit end. For example, after the transmit end successfully registers with a network, the PCF may configure, for the transmit end, the correspondence between an identifier of a V2X service and a frequency band of the V2X service. The correspondence between an identifier of a V2X service and a frequency band of the V2X service may be a correspondence in a list form, for example, a correspondence shown in the following Table 1, or may be a correspondence in an array form or another form. For example, the correspondence between an identifier of a V2X service and a frequency band of the V2X service may be {service ID 1, service ID 2, frequency band F1}. This is not limited. In this embodiment of this application, an example in which the correspondence between an identifier of a V2X service and a frequency band of the V2X service is a correspondence in a list form is only used for description.

For example, Table 1 shows the correspondence between an identifier of a V2X service and a frequency band of the V2X service. As shown in Table 1, a service ID 1 corresponds to a frequency band F1, a service ID 2 corresponds to the frequency band F1, and a service ID 3 corresponds to a frequency band F3. It is assumed that the identifier of the first V2X service is the service ID 1, and the transmit end may query Table 1 using the service ID 1 as an index, to determine that a frequency band corresponding to the service ID 1 is F1, and the frequency band of the first V2X service is F1. It is assumed that the identifier of the first V2X service is the service ID 3, and the transmit end may query Table 1 using the service ID 3 as an index, to determine that a frequency band corresponding to the service ID 3 is F3, and the frequency band of the first V2X service is F3.

TABLE 1

| V2X service identifier | Frequency band |
|---|---|
| Service ID 1 | F1 |
| Service ID 2 | F1 |
| Service ID 3 | F3 |

The frequency band of the first V2X service corresponds to the layer-2 address pair of the first V2X service. In this way, when the transmit end sends the data of the first V2X service on the frequency band of the first V2X service based on the layer-2 address pair of the first V2X service, it is ensured that the data of the first V2X service is sent on the frequency band of the first V2X service, and the data of the first V2X service is prevented from being sent on a frequency band other than the frequency band of the first V2X service.

The first V2X service may have one or more layer-2 address pairs, and the frequency band of the first V2X service may correspond to the one or more layer-2 address pairs of the first V2X service. It should be noted that, in the embodiments of this application, one frequency band may correspond to a plurality of V2X services, one frequency band may correspond to a plurality of layer-2 address pairs, and a plurality of V2X services on one frequency band may correspond to different layer-2 address pairs corresponding to the frequency band.

The layer-2 address pair of the first V2X service may include a source layer-2 address (source L2 address) of the first V2X service and a destination layer-2 address (destination L2 address) of the first V2X service, the source layer-2 address of the first V2X service may be used to identify the transmit end, and the destination layer-2 address of the first V2X service may be used to identify the receive end. The layer-2 address pair of the first V2X service may be used to transmit the data of the first V2X service. For example, when the data of the first V2X service is transmitted, the layer-2 address pair of the first V2X service and the data of the first V2X service may be encapsulated together and sent to the receive end, such that the receive end identifies, based on the layer-2 address pair of the first V2X service, the transmit end sending the first V2X service to the receive end, and receives the data of the first V2X service based on an identification result.

To prevent V2X services on different frequency bands from being mixed and transmitted to the receive end on a same frequency band, layer-2 address pairs of the V2X services on different frequency bands are different. For example, the frequency band of the first V2X service is a first frequency band. The layer-2 address pair of the first V2X service is different from a layer-2 address pair of a V2X service other than a V2X service corresponding to the first frequency band. The V2X service other than the V2X service corresponding to the first frequency band may be a V2X service that is not allocated to the first frequency band, and data of the V2X service cannot be sent to the receive end on the first frequency band. For example, it is assumed that a frequency band of a V2X service 1 is F1, a frequency band of a V2X service 2 is F2, and F1 is different from F2. In this case, a layer-2 address pair of the V2X service 1 is different from a layer-2 address pair of the V2X service 2. For example, a destination layer-2 address of the V2X service 1 is different from a destination layer-2 address of the V2X service 2; or a source layer-2 address of the V2X service 1 is different from a source layer-2 address of the V2X service 2, and a destination layer-2 address of the V2X service 1 is different from a destination layer-2 address of the V2X service 2.

For example, the transmit end may determine the layer-2 address pair of the first V2X service with reference to the following first scenario of the method shown in FIG. 4, or the transmit end may determine the layer-2 address pair of the first V2X service with reference to the following second scenario of the method shown in FIG. 4.

For example, step 401 may be performed by a V2X layer of the transmit end. For example, the transmit end is the terminal 1. For the V2X layer of the transmit end, refer to the descriptions in FIG. 2. Further, optionally, after the V2X layer of the transmit end determines the layer-2 address pair of the first V2X service, the V2X layer of the transmit end may send a correspondence between the layer-2 address pair of the first V2X service and the frequency band of the first V2X service to an AS of the transmit end.

It should be noted that step 401 is described only using an example of determining the layer-2 address pair of the first V2X service. It may be understood that for a process of determining a layer-2 address pair of one or more other V2X services, refer to the descriptions of step 401. If transmission of a plurality of V2X services is supported between the transmit end and the receive end, the transmit end may determine layer-2 address pairs of the plurality of V2X services with reference to the manner in step 401.

Step 402: The transmit end sends the data of the first V2X service to the receive end on the frequency band of the first V2X service based on the layer-2 address pair of the first V2X service.

For example, the transmit end may identify, based on the destination layer-2 address in the layer-2 address pair of the first V2X service, the receive end receiving the data of the first V2X service, and send the data of the first V2X service to the identified receive end on the frequency band of the first V2X service. Further, when the transmit end sends the data of the first V2X service to the receive end on the frequency band of the first V2X service, the transmit end may further send the layer-2 address pair of the first V2X service to the receive end, such that the receive end identifies, based on the layer-2 address pair of the first V2X service, the transmit end sending the received data of the first V2X service to the receive end.

The transmit end may send the data of the first V2X service and the layer-2 address pair of the first V2X service to the receive end on the frequency band of the first V2X service.

For example, step 402 and an example process of step 402 may be performed and completed by a protocol layer of the transmit end.

For example, the transmit end sends a first correspondence to the AS of the transmit end using the V2X layer of the transmit end, where the first correspondence is a correspondence between a layer-2 address pair of a V2X service and a frequency band of the V2X service; and the transmit end stores the first correspondence at the AS of the transmit end. The first correspondence includes the correspondence between the frequency band of the first V2X service and the layer-2 address pair that is of the first V2X service and that is determined in step 401.

Subsequently, an application layer of the transmit end triggers the first V2X service, and the application layer of the transmit end generates the data of the first V2X service, and sends the data of the first V2X service to the V2X layer of the transmit end.

The V2X layer of the transmit end receives the data of the first V2X service, and sends the data of the first V2X service and the layer-2 address pair of the first V2X service to the AS of the transmit end.

The AS of the transmit end receives the data of the first V2X service and the layer-2 address pair of the first V2X service, obtains the frequency band of the first V2X service based on the first correspondence and the layer-2 address pair of the first V2X service, and sends, on the frequency band of the first V2X service based on the destination layer-2 address in the layer-2 address pair of the first V2X service, the data of the first V2X service to the receive end identified by the destination layer-2 address of the first V2X service.

Further, optionally, the AS of the transmit end further sends the layer-2 address pair of the first V2X service to the receive end, and the layer-2 address pair of the first V2X service and the data of the first V2X service may be sent to the receive end together. For example, the AS of the transmit end may deliver the layer-2 address pair of the first V2X service and the data of the first V2X service to a PDCP layer, an RLC layer, a MAC layer, and a physical layer of the transmit end for processing, and then send the layer-2 address pair of the first V2X service and the data of the first V2X service to the receive end.

For example, Table 2 shows the correspondence between a frequency band of a V2X service and a layer-2 address pair of the V2X service. As shown in Table 2, F1 corresponds to (source L2 address 1, destination L2 address 1), F2 corresponds to (source L2 address 2, destination L2 address 2), and F3 corresponds to (source L2 address 3, destination L2 address 3). It is assumed that the AS of the transmit end receives data of a V2X service 1 and (source L2 address 1, destination L2 address 1), the AS of the transmit end may query Table 2 using (source L2 address 1, destination L2 address 1) as an index, to determine that a frequency band corresponding to (source L2 address 1, destination L2 address 1) is F1, and send the data of the V2X service 1 to the receive end on F1.

TABLE 2

| Frequency band of a V2X service | Layer-2 address pair |
|---|---|
| F1 | (source L2 address 1, destination L2 address 1) |
| F2 | (source L2 address 2, destination L2 address 2) |
| F3 | (source L2 address 3, destination L2 address 3) |

Based on the method shown in FIG. 4, a layer-2 address pair of a V2X service may be determined based on a frequency band of the V2X service, and the frequency band of the V2X service is associated with the layer-2 address pair of the V2X service, to ensure that data of the V2X service is sent on the frequency band of the V2X service based on the layer-2 address pair of the V2X service. This avoids a problem that a V2X service fails to be received or is incorrectly received because V2X services on different frequency bands are put together and sent to the receive end.

It should be noted that FIG. 4 is described only using an example of determining the layer-2 address pair of the first V2X service and sending the data of the first V2X service. For a process of determining a layer-2 address pair of one or more other V2X services and a process of sending data of the one or more other V2X services, refer to FIG. 4. For example, the method shown in FIG. 4 may further include the following steps.

The transmit end determines a layer-2 address pair of a second V2X service based on a frequency band of the second V2X service, and sends data of the second V2X service to the receive end on the frequency band of the second V2X service based on the layer-2 address pair of the second V2X service.

For a detailed process in which the transmit end determines the layer-2 address pair of the second V2X service and sends the data of the second V2X service, refer to FIG. 4. Details are not described.

If a plurality of V2X services are allocated to a plurality of different frequency bands, layer-2 address pairs corresponding to V2X services on different frequency bands are different. For example, if frequency bands of two or more V2X services are different, layer-2 address pairs of the two or more V2X services are also different. That the layer-2 address pairs of the V2X services are different may mean that destination layer-2 addresses of the V2X services are different, or destination layer-2 addresses of the V2X services are different and source layer-2 addresses of the V2X services are different.

A relationship between layer-2 address pairs of V2X services on a same frequency band is not limited in this embodiment of this application. The layer-2 address pairs of the V2X services on the same frequency band may be the same or may be different. For example, if frequency bands of two or more V2X services are the same, layer-2 address pairs of the two or more V2X services may be a same layer-2 address pair, or may be different layer-2 address pairs. This is not limited.

For example, the transmit end determines the layer-2 address pair of the first V2X service and determines the layer-2 address pair of the second V2X service. If the frequency band of the first V2X service is different from the frequency band of the second V2X service, the layer-2 address pair of the first V2X service is different from the layer-2 address pair of the second V2X service. If the frequency band of the first V2X service is the same as the frequency band of the second V2X service, the layer-2 address pair of the first V2X service may be the same as or different from the layer-2 address pair of the second V2X service. This is not limited.

In the first scenario of the method shown in FIG. 4, that a transmit end determines a layer-2 address pair of a first V2X service based on a frequency band of the first V2X service may include the following.

If a PC5 unicast link corresponding to the frequency band of the first V2X service exists between the transmit end and the receive end, the transmit end uses a layer-2 address pair of the PC5 unicast link as the layer-2 address pair of the first V2X service. Alternatively, if no PC5 unicast link corresponding to the frequency band of the first V2X service exists between the transmit end and the receive end, the transmit end establishes a PC5 unicast link for the first V2X service, and obtains the layer-2 address pair of the first V2X service.

Further, for example, the frequency band of the first V2X service is the first frequency band. After establishing the PC5 unicast link for the first V2X service, the transmit end may further store an identifier of the PC5 unicast link and the first frequency band in a correspondence manner, such that the transmit end can subsequently determine, based on the correspondence, whether the PC5 unicast link corresponding to the frequency band of the first V2X service exists. In addition, the transmit end may further store the identifier of the PC5 unicast link and the layer-2 address pair of the PC5 unicast link in a correspondence manner. In this way, after determining that the PC5 unicast link corresponding to the frequency band of the first V2X service exists, the transmit end obtains the layer-2 address pair of the first V2X service based on a correspondence between the identifier of the PC5 unicast link and the layer-2 address pair of the PC5 unicast link.

The correspondence between the identifier of the PC5 unicast link and the first frequency band and the correspondence between the identifier of the PC5 unicast link and the layer-2 address pair of the PC5 unicast link may be separately stored, or may be combined and stored. For example, the identifier of the PC5 unicast link, the first frequency band, and the layer-2 address pair of the PC5 unicast link are stored in a correspondence manner. This is not limited.

A name of the PC5 unicast link is not limited. The PC5 unicast link may also be named as a PC5-S link, or the like. The PC5 unicast link may refer to a signaling-plane link between the transmit end and the receive end, and the PC5 unicast link may be used to transmit signaling, a message, or the like between the transmit end and the receive end.

The identifier of the PC5 unicast link may be a PC5 signaling-plane identifier (e.g., a PC5 signal identifier (PSID)), and may be used to identify the PC5 unicast link.

The layer-2 address pair of the PC5 unicast link may be obtained when the PC5 unicast link is established. For example, in the first scenario of the method shown in FIG. 4, when the PC5 unicast link is established for the first V2X service, the layer-2 address pair of the PC5 unicast link may be the obtained layer-2 address pair of the first V2X service. In other words, the layer-2 address pair of the PC5 unicast link is the same as a layer-2 address pair of a V2X service on a frequency band corresponding to the PC5 unicast link.

For example, a correspondence between an identifier of a PC5 unicast link and a frequency band is a second correspondence. The transmit end may determine, based on the frequency band of the first V2X service and the second correspondence, whether the PC5 unicast link corresponding to the frequency band of the first V2X service exists between the transmit end and the receive end. For example, the transmit end may query the second correspondence using the frequency band of the first V2X service as an index. If the second correspondence includes the identifier of the PC5 unicast link corresponding to the frequency band of the first V2X service, the transmit end determines that the PC5 unicast link corresponding to the frequency band of the first V2X service exists. Alternatively, if the second correspondence does not include the identifier of the PC5 unicast link corresponding to the frequency band of the first V2X service, the transmit end determines that no PC5 unicast link corresponding to the frequency band of the first V2X service exists.

The second correspondence may further include a correspondence among a V2X service ID, an identifier of a PC5 unicast link, and a layer-2 address pair of a PC5 unicast link.

For example, the V2X service ID is a PSID. Table 3 shows a correspondence among a V2X service ID, a PC5 unicast link ID, a frequency band, and a layer-2 address pair. As shown in Table 3, a PSID 1 corresponds to a PC5 unicast link ID 1, a frequency band F1, and a layer-2 address pair 1; a PSID 2 and a PSID 4 correspond to a PC5 unicast link ID 2, a frequency band F2, and a layer-2 address pair 2; a PSID 3 corresponds to a PC5 unicast link ID 3, a frequency band F2, and a layer-2 address pair 3; and a PSID 5 and a PSID 6 correspond to a PC5 unicast link ID 4, a frequency band F3, and a layer-2 address pair 4. It is assumed that the frequency band of the first V2X service is F1. The transmit end may query Table 3 using F1 as an index, find that the PSID 1 corresponding to F1 exists in Table 3, and determine that the PC5 unicast link corresponding to the frequency band of the first V2X service exists. Further, the transmit end queries Table 3 using the PSID 1 as an index, finds that a layer-2 address pair corresponding to the PSID 1 is the layer-2 address pair 1, and determine the layer-2 address pair 1 as the layer-2 address pair of the first V2X service.

TABLE 3

| V2X service ID | PC5 unicast link ID | Frequency band | Layer-2 address pair |
|---|---|---|---|
| PSID 1 | PC5 unicast link ID 1 | F1 | Layer-2 address pair 1 |
| PSID 2 and PSID 4 | PC5 unicast link ID 2 | F2 | Layer-2 address pair 2 |
| PSID 3 | PC5 unicast link ID 3 | F2 | Layer-2 address pair 3 |
| PSID 5 and PSID 6 | PC5 unicast link ID 4 | F3 | Layer-2 address pair 4 |

For example, that the transmit end establishes a PC5 unicast link for the first V2X service, and obtains the layer-2 address pair of the first V2X service may include: The transmit end sends a first request and the source layer-2 address of the first V2X service to the receive end, where the first request is used to request the destination layer-2 address of the first V2X service; and the receive end receives the first request and the source layer-2 address of the first V2X service, allocates the destination layer-2 address of the first V2X service based on the first request, and sends a response to the first request and the destination layer-2 address of the first V2X service to the transmit end. Alternatively, the transmit end sends a first request and the source layer-2 address of the first V2X service to the receive end, where the first request is used to request the destination layer-2 address of the first V2X service, and where the first request includes the source layer-2 address of the first V2X service; and the receive end receives the first request and the source layer-2 address of the first V2X service, allocates the destination layer-2 address of the first V2X service based on the first request, and sends a response to the first request and the destination layer-2 address of the first V2X service to the transmit end, where the response to the first request includes the destination layer-2 address of the first V2X service.

The transmit end receives the response to the first request from the receive end, and further uses the source layer-2 address of the first V2X service and the received destination layer-2 address of the first V2X service as the layer-2 address pair of the first V2X service.

The first request may include the identifier of the first V2X service. A name of the first request is not limited, and the first request may be named as a direct communication request or another name. This is not limited.

As described above, the source layer-2 address of the first V2X service may be included in the first request, or the source layer-2 address of the first V2X service is not included in the first request. The transmit end sends the first request and the source layer-2 address of the first V2X service to the receive end using the AS of the transmit end.

Optionally, the first request may be included in a payload of a MAC protocol data unit (PDU), and the source layer-2 address of the first V2X service may be included in a MAC header of the MAC PDU. Alternatively, the source layer-2 address of the first V2X service is included in the first request. The transmit end sends the first request and the source layer-2 address of the first V2X service to the receive end using the AS of the transmit end. Optionally, the first request is included in a payload of a MAC PDU, and the source layer-2 address of the first V2X service is included in a MAC header of the MAC PDU.

Further, when sending the first request and the source layer-2 address of the first V2X service to the receive end, the transmit end may further send a common layer-2 address (common L2 address) to the receive end. The common layer-2 address may be used by the receive end to identify the frequency band of the first V2X service. There is a correspondence between a common layer-2 address and a frequency band, and different common layer-2 addresses may correspond to different frequency bands.

The common layer-2 address may be included in the first request, or the common layer-2 address is not included in the first request. The transmit end sends the first request and the source layer-2 address of the first V2X service to the receive end using the AS of the transmit end. Optionally, the first request is included in a payload of a MAC PDU, and the source layer-2 address of the first V2X service is included in a MAC header of the MAC PDU. Alternatively, the source layer-2 address of the first V2X service is included in the first request, and the transmit end sends the first request and the source layer-2 address of the first V2X service to the receive end using the AS of the transmit end. Optionally, the first request is included in a payload of a MAC PDU, and the source layer-2 address of the first V2X service is included in a MAC header of the MAC PDU.

In an example 1 of the first scenario of the method shown in FIG. 4, when the transmit end sends the first request and the source layer-2 address of the first V2X service to the receive end, and the first request includes the identifier of the first V2X service, that the receive end allocates the destination layer-2 address of the first V2X service based on the first request may include: The receive end determines the frequency band of the first V2X service based on the identifier of the first V2X service and the correspondence between an identifier of a V2X service and a frequency band of the V2X service; and the receive end allocates the destination layer-2 address of the first V2X service based on the frequency band of the first V2X service.

In the example 1 of the first scenario of the method shown in FIG. 4, the PCF may preconfigure, for the receive end, the correspondence between an identifier of a V2X service and a frequency band of the V2X service. That the receive end allocates the destination layer-2 address of the first V2X service based on the frequency band of the first V2X service may include: The receive end randomly allocates a destination layer-2 address to the first V2X service based on the frequency band of the first V2X service. In addition, it needs to be ensured that destination layer-2 addresses allocated to V2X services on different frequency bands are different.

In an example 2 of the first scenario of the method shown in FIG. 4, when the transmit end sends the first request and the source layer-2 address of the first V2X service to the receive end, and the first request includes the common layer-2 address, that the receive end allocates the destination layer-2 address of the first V2X service based on the first request includes: The receive end determines the frequency band of the first V2X service based on the common layer-2 address; and the receive end allocates the destination layer-2 address of the first V2X service based on the frequency band of the first V2X service.

In the example 2 of the first scenario of the method shown in FIG. 4, that the receive end determines the frequency band of the first V2X service based on the common layer-2 address may include: The receive end determines the frequency band of the first V2X service based on the received common layer-2 address and the correspondence between a common layer-2 address and a frequency band.

In the example 2 of the first scenario of the method shown in FIG. 4, for a manner in which the receive end allocates the destination layer-2 address of the first V2X service based on the frequency band of the first V2X service, refer to the descriptions in the example 1 of the first scenario of the method shown in FIG. 4. Details are not described.

In an example 3 of the first scenario of the method shown in FIG. 4, when the transmit end sends the first request, the source layer-2 address of the first V2X service, and the common layer-2 address to the receive end, that the receive end allocates the destination layer-2 address of the first V2X service based on the first request includes: The receive end allocates the destination layer-2 address of the first V2X service based on the first request and the common layer-2 address.

In the example 3 of the first scenario of the method shown in FIG. 4, the first request may be used as a trigger condition for the receive end to allocate the destination layer-2 address of the first V2X service. Once receiving the first request, the receive end allocates the destination layer-2 address of the first V2X service based on the common layer-2 address.

In the example 3 of the first scenario of the method shown in FIG. 4, for a manner in which the receive end allocates the destination layer-2 address of the first V2X service based on the common layer-2 address, refer to the descriptions in the example 2 of the first scenario of the method shown in FIG. 4. Details are not described.

It should be noted that the first scenario of the method shown in FIG. 4 is described only using an example of determining the layer-2 address pair of the first V2X service. The transmit end may determine layer-2 address pairs of a plurality of V2X services other than the first V2X service with reference to the descriptions in the first scenario of the method shown in FIG. 4. This is not limited.

Based on the first scenario of the method shown in FIG. 4, if a PC5 unicast link corresponding to a frequency band of a V2X service exists, a layer-2 address pair of the PC5 unicast link may be used as a layer-2 address pair of the V2X service; or if no PC5 unicast link corresponding to a frequency band of a V2X service exists, a PC5 unicast link corresponding to the frequency band of the V2X service is established, and a layer-2 address pair of the V2X service is obtained by establishing the PC5 unicast link. In this way, the layer-2 address pair of the PC5 unicast link may be used as the layer-2 address pair of the V2X service. A plurality of V2X services corresponding to a same frequency band are associated with a same PC5 unicast link, and a layer-2 address pair of the PC5 unicast link is used as a layer-2 address pair of these V2X services.

Figure 5A:
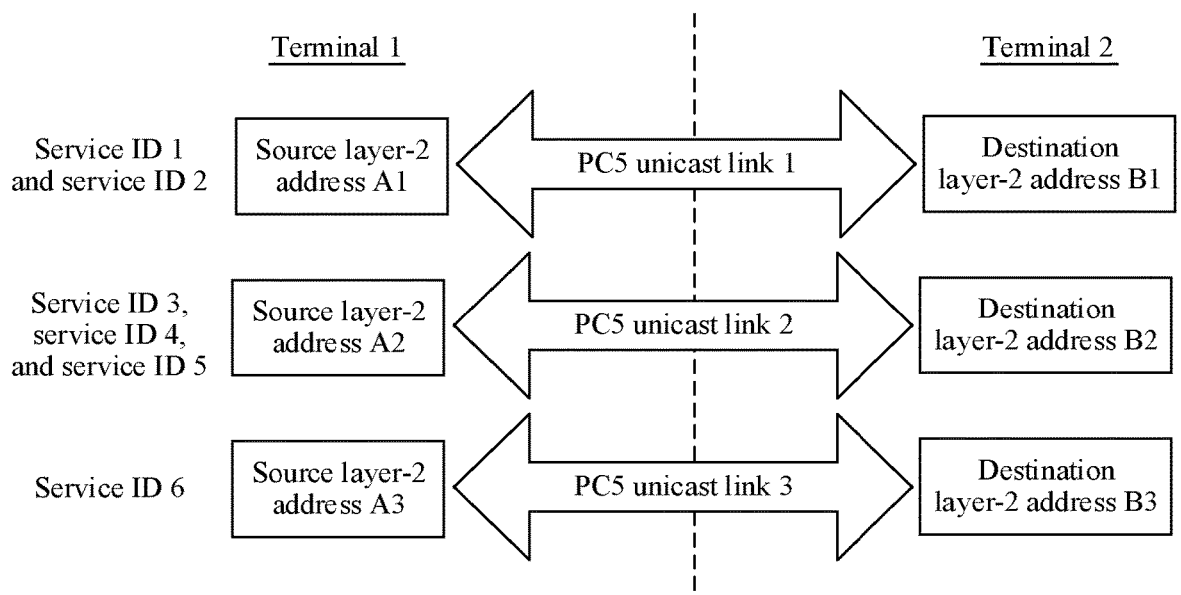
FIG. 5A is a schematic diagram of determining a layer-2 address pair of a V2X service according to an embodiment of this application.

For example, as shown in FIG. 5A, a service ID 1 and a service ID 2 correspond to a frequency band F1, a service ID 3, a service ID 4, and a service ID 5 correspond to a frequency band F2, and a service ID 6 corresponds to a frequency band F3. After a layer-2 address pair of a V2X service is determined in the manner described in the first scenario of the method shown in FIG. 4, the service ID 1 and the service ID 2 correspond to a PC5 unicast link 1 {layer-2 address pair: source layer-2 address A1, destination layer-2 address B1}, the service ID 3, the service ID 4, and the service ID 5 correspond to a PC5 unicast link 2 {layer-2 address pair: source layer-2 address A2, destination layer-2 address B2}, and the service ID 6 corresponds to a PC5 unicast link 3 {layer-2 address pair: source layer-2 address A3, destination layer-2 address B3}.

In the second scenario of the method shown in FIG. 4, that a transmit end determines a layer-2 address pair of a first V2X service based on a frequency band of the first V2X service may include the following.

If a PC5 unicast link exists between the transmit end and the receive end, the transmit end negotiates the layer-2 address pair of the first V2X service with the receive end over the PC5 unicast link. Alternatively, if no PC5 unicast link exists between the transmit end and the receive end, the transmit end establishes a new PC5 unicast link for the first V2X service, and obtains the layer-2 address pair of the first V2X service.

Further, for example, the frequency band of the first V2X service is the first frequency band. After determining the layer-2 address pair of the first V2X service, the transmit end may store, in a correspondence manner, the layer-2 address pair of the first V2X service and the frequency band of the first V2X service at the AS of the transmit end.

For example, that the transmit end negotiates the layer-2 address pair of the first V2X service with the receive end over the PC5 unicast link may include: The transmit end sends a third request and a layer-2 address pair of the PC5 unicast link to the receive end, where the third request is used to request the destination layer-2 address of the first V2X service, and the third request includes the source layer-2 address of the first V2X service; the receive end receives the third request and the layer-2 address pair of the PC5 unicast link, allocates the destination layer-2 address of the first V2X service based on the third request and the layer-2 address pair of the PC5 unicast link, and sends a response to the third request to the transmit end, where the response to the third request includes the destination layer-2 address of the first V2X service; and the transmit end receives the response to the third request from the receive end.

The third request may include the identifier of the first V2X service. A name of the third request is not limited, and the third request may be named as a parameter negotiation request or another name. This is not limited.

That the receive end allocates the destination layer-2 address of the first V2X service based on the third request and the layer-2 address pair of the PC5 unicast link may include: The receive end first identifies, based on the layer-2 address pair of the PC5 unicast link, that the third request is a request sent over the PC5 unicast link established between the receive end and the transmit end; then, determines the frequency band of the first V2X service based on the identifier that is of the first V2X service and that is included in the third request and the correspondence between an identifier of a V2X service and a frequency band of the V2X service; and allocates the destination layer-2 address of the first V2X service based on the frequency band of the first V2X service.

For example, that if no PC5 unicast link exists between the transmit end and the receive end, the transmit end establishes a new PC5 unicast link for the first V2X service, and obtains the layer-2 address pair of the first V2X service may include the following.

The transmit end sends a second request and a source layer-2 address of the PC5 unicast link to the receive end, where the second request is used to request the destination layer-2 address of the first V2X service, and the second request includes the source layer-2 address of the first V2X service; the receive end receives the second request, the source layer-2 address of the PC5 unicast link, and the source layer-2 address of the first V2X service, and allocates the destination layer-2 address of the first V2X service and a destination layer-2 address of the PC5 unicast link based on the second request; and the receive end sends a response to the second request and the destination layer-2 address of the PC5 unicast link to the transmit end, where the response to the second request includes the destination layer-2 address of the first V2X service; and the transmit end receives the response to the second request from the receive end.

The second request may include the identifier of the first V2X service. A name of the second request is not limited, and the second request may be named as a direct communication request or another name. This is not limited. The second request may further include the source layer-2 address of the PC5 unicast link. To be more specific, that the transmit end sends the second request and the source layer-2 address of the PC5 unicast link to the receive end has the following two cases.

Case 1: The transmit end sends the second request and the source layer-2 address of the PC5 unicast link to the receive end, where the second request includes the source layer-2 address of the first V2X service.

The transmit end sends the second request and the source layer-2 address of the PC5 unicast link to the receive end using the AS of the transmit end. Optionally, the second request is included in a payload of a MAC PDU, and the source layer-2 address of the PC5 unicast link is included in a MAC header of the MAC PDU.

In the case 1, the response to the second request includes the destination layer-2 address of the first V2X service, and does not include the destination layer-2 address of the PC5 unicast link.

Case 2: The transmit end sends the second request and the source layer-2 address of the PC5 unicast link to the receive end, where the second request includes the source layer-2 address of the first V2X service and the source layer-2 address of the PC5 unicast link.

The transmit end sends the second request and the source layer-2 address of the PC5 unicast link to the receive end using the AS of the transmit end. Optionally, the second request is included in a payload of a MAC PDU, and the source layer-2 address of the PC5 unicast link is included in a MAC header of the MAC PDU.

In the case 2, the response to the second request includes the destination layer-2 address of the first V2X service and the destination layer-2 address of the PC5 unicast link.

Further, when sending the second request and the source layer-2 address of the PC5 unicast link to the receive end, the transmit end may further send a common layer-2 address to the receive end. The common layer-2 address may be used by the receive end to identify the frequency band of the first V2X service. There is a correspondence between a common layer-2 address and a frequency band, and different common layer-2 addresses may correspond to different frequency bands.

The common layer-2 address may be included in the second request, or the common layer-2 address is not included in the second request. The transmit end sends the second request and the source layer-2 address of the first V2X service to the receive end using the AS of the transmit end. Optionally, the second request is included in a payload of a MAC PDU, and the source layer-2 address of the first V2X service is included in a MAC header of the MAC PDU. Alternatively, the source layer-2 address of the first V2X service is included in the second request, and the transmit end sends the second request and the source layer-2 address of the first V2X service to the receive end using the AS of the transmit end. Optionally, the second request is included in a payload of a MAC PDU, and the source layer-2 address of the first V2X service is included in a MAC header of the MAC PDU.

In an example 1 of the second scenario of the method shown in FIG. 4, when the transmit end sends the second request and the source layer-2 address of the PC5 unicast link to the receive end, and the second request includes the identifier of the first V2X service, that the receive end allocates the destination layer-2 address of the first V2X service and the destination layer-2 address of the PC5 unicast link based on the second request may include: The receive end determines the frequency band of the first V2X service based on the identifier of the first V2X service and the correspondence between an identifier of a V2X service and a frequency band of the V2X service; and the receive end allocates the destination layer-2 address of the first V2X service and the destination layer-2 address of the PC5 unicast link based on the frequency band of the first V2X service.

In the example 1 of the second scenario of the method shown in FIG. 4, the PCF preconfigures, for the receive end, the correspondence between an identifier of a V2X service and a frequency band of the V2X service. That the receive end allocates the destination layer-2 address of the first V2X service and the destination layer-2 address of the PC5 unicast link based on the frequency band of the first V2X service includes: The receive end randomly allocates, based on the frequency band of the first V2X service, a destination layer-2 address to the first V2X service and a destination layer-2 address to the PC5 unicast link. In addition, it needs to be ensured that destination layer-2 addresses allocated to V2X services on different frequency bands are different, and destination layer-2 addresses allocated to different PC5 unicast links are different.

In an example 2 of the second scenario of the method shown in FIG. 4, when the transmit end sends the second request and the source layer-2 address of the PC5 unicast link to the receive end, and the second request includes the common layer-2 address, that the receive end allocates the destination layer-2 address of the first V2X service and the destination layer-2 address of the PC5 unicast link based on the second request includes: The receive end determines the frequency band of the first V2X service based on the common layer-2 address; and the receive end allocates the destination layer-2 address of the first V2X service and the destination layer-2 address of the PC5 unicast link based on the frequency band of the first V2X service.

In the example 2 of the second scenario of the method shown in FIG. 4, that the receive end determines the frequency band of the first V2X service based on the common layer-2 address may include: The receive end determines the frequency band of the first V2X service based on the received common layer-2 address and the correspondence between a common layer-2 address and a frequency band.

In the example 2 of the second scenario of the method shown in FIG. 4, for a manner in which the receive end allocates the destination layer-2 address of the first V2X service and the destination layer-2 address of the PC5 unicast link based on the frequency band of the first V2X service, refer to the descriptions in the example 1 of the second scenario of the method shown in FIG. 4. Details are not described.

In an example 3 of the second scenario of the method shown in FIG. 4, when the transmit end sends the second request and the common layer-2 address to the receive end, that the receive end allocates the destination layer-2 address of the first V2X service and the destination layer-2 address of the PC5 unicast link based on the second request includes: The receive end allocates the destination layer-2 address of the first V2X service and the destination layer-2 address of the PC5 unicast link based on the second request and the common layer-2 address.

In the example 3 of the second scenario of the method shown in FIG. 4, the second request may be used as a trigger condition for the receive end to allocate the destination layer-2 address of the first V2X service and the destination layer-2 address of the PC5 unicast link. After receiving the second request, the receive end allocates the destination layer-2 address of the first V2X service and the destination layer-2 address of the PC5 unicast link based on the common layer-2 address.

In the example 3 of the second scenario of the method shown in FIG. 4, for a manner in which the receive end allocates the destination layer-2 address of the first V2X service based on the common layer-2 address, refer to the descriptions in the example 2 of the second scenario of the method shown in FIG. 4. Details are not described.

It should be noted that the second scenario of the method shown in FIG. 4 is described only using an example of determining the layer-2 address pair of the first V2X service. The transmit end may determine layer-2 address pairs of a plurality of V2X services other than the first V2X service with reference to the descriptions in the second scenario of the method shown in FIG. 4. This is not limited.

Based on the second scenario of the method shown in FIG. 4, a layer-2 address pair may be negotiated for each V2X service over a PC5 unicast link between the transmit end and the receive end, and it is ensured that layer-2 address pairs corresponding to V2X services on different frequency bands are different from each other.

Figure 5B:
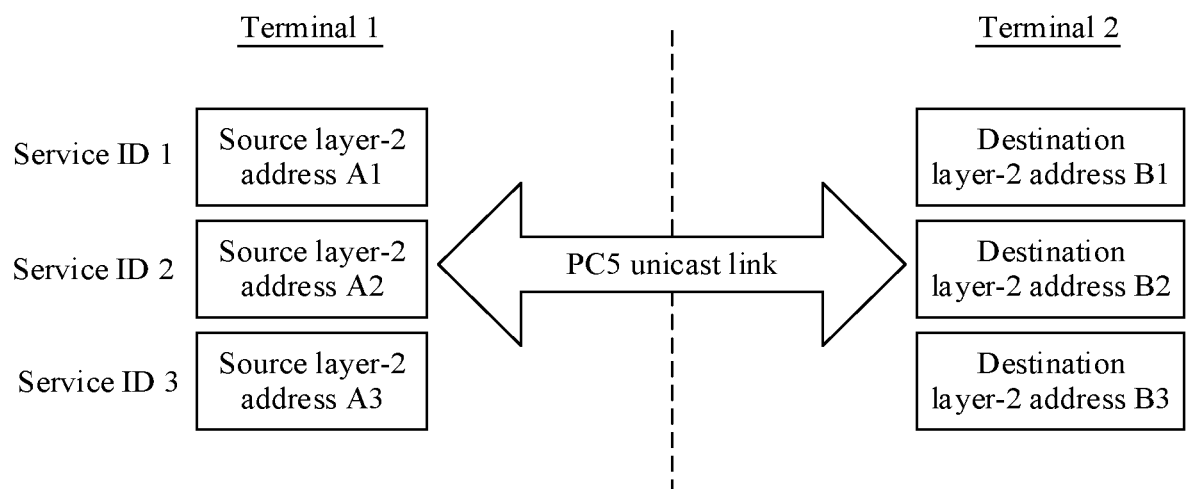
FIG. 5B is another schematic diagram of determining a layer-2 address pair of a V2X service according to an embodiment of this application.

For example, as shown in FIG. 5B, a service ID 1 corresponds to a frequency band F1, a service ID 2 corresponds to the frequency band F1, and a service ID 3 corresponds to a frequency band F2. After a layer-2 address pair of a V2X service is determined in the manner described in the second scenario of the method shown in FIG. 4, the service ID 1, the service ID 2, and the service ID 3 all correspond to a PC5 unicast link, but a layer-2 address pair of the service ID 1 is {source layer-2 address A1, destination layer-2 address B1}, a layer-2 address pair of the service ID 2 is {source layer-2 address A2, destination layer-2 address B2}, and a layer-2 address pair of the service ID 3 is {source layer-2 address A3, destination layer-2 address B3}.

In a third scenario of the method shown in FIG. 4, before the transmit end determines the layer-2 address pair of the first V2X service based on the frequency band of the first V2X service, the transmit end needs to determine whether the frequency band of the first V2X service is an available frequency band between the transmit end and the receive end. If the frequency band of the first V2X service is an available frequency band between the transmit end and the receive end, the transmit end performs step 401, to be more specific, determines the layer-2 address pair of the first V2X service based on the frequency band of the first V2X service; otherwise, the method shown in FIG. 4 is not performed, and the procedure ends.

The available frequency band may be a frequency band that can be used to transmit data of a V2X service.

For example, the transmit end may determine, using the AS of the transmit end, whether the frequency band of the first V2X service is an available frequency band between the transmit end and the receive end. For example, the AS of the transmit end may obtain communication information (for example, a network congestion status and a frequency band occupation rate) between the transmit end and the receive end, and determines, based on the communication information, whether the frequency band of the first V2X service is an available frequency band between the transmit end and the receive end.

Based on the third scenario of the method shown in FIG. 4, it can be ensured that data of a V2X service is transmitted on an available frequency band, such that normal transmission of the V2X service is ensured.

It should be noted that, in the method shown in FIG. 4, an example of a unicast pair formed by the transmit end and the receive end is used to describe, based on a PC5 unicast link of the unicast pair, a process of determining a layer-2 address pair of a V2X service and sending data of the V2X service. During actual application, one transmit end may form a plurality of unicast pairs with two or more receive ends. For example, the transmit end is a terminal 1. The terminal 1 and a terminal 2 may form a unicast pair 1 (terminal 1, terminal 2). The terminal 1 and a terminal 3 may further form a unicast pair 2 (terminal 1, terminal 3). A PC5 unicast link may be established for any unicast pair using the method shown in FIG. 4, and a layer-2 address pair of a V2X service supported by the unicast pair is obtained based on the established PC5 unicast link.

Each unicast pair may be identified by a station identifier (station ID) pair. The station identifier pair may include a source station ID and a destination station ID. The station identifier pair may also be described as a device identifier pair, a node identifier pair, a module identifier pair, or the like. This is not limited. The source station identifier is used to uniquely identify the transmit end, and the destination station identifier is used to identify the receive end.

The station identifier pair corresponding to the unicast pair may be obtained through a PC5 unicast link establishment process. For example, the transmit end may send a direct communication request to the receive end, where the direct communication request includes the source station identifier. The receive end receives the direct communication request, and returns a response to the direct communication request to the transmit end, where the response to the direct communication request includes the destination station identifier.

If there are a plurality of unicast pairs, different unicast pairs may support V2X services of a same type and on a same frequency band, and corresponding layer-2 address pairs may also be the same. For example, a same PSID may exist in different PC5 unicast links corresponding to a same frequency band, and different station identifier pairs correspond to different PC5 unicast links. In this case, the transmit end cannot determine, based on only the correspondence between an ID of a PC5 unicast link and a layer-2 address pair of the PC5 unicast link, a specific layer-2 address pair that is of a V2X service identified by a PSID.

To resolve the foregoing problem, and distinguish a layer-2 address pair of a V2X service is a layer-2 address pair of which unicast pair, if there are a plurality of unicast pairs, a unicast pair (or a station identifier pair) corresponding to the V2X service needs to be considered. For example, a station identifier pair, a V2X service identifier (service ID), a PC5 unicast link ID, a frequency band of a V2X service, and a layer-2 address pair of a V2X service are associated, and the layer-2 address pair of the V2X service is determined based on a correspondence among a station identifier pair, a V2X service identifier (service ID), a PC5 unicast link ID, a frequency band of a V2X service, and a layer-2 address pair of the V2X service.

For example, the V2X service ID is a PSID, a unicast pair 1 is identified by (source station ID 1, destination station ID 1), and a unicast pair 2 is identified by (source station ID 2, destination station ID 2). Table 4 shows the correspondence among a station identifier pair, a V2X service identifier (service ID), a PC5 unicast link ID, a frequency band of a V2X service, and a layer-2 address pair of the V2X service. As shown in Table 4, (source station ID 1, destination station ID 1) corresponds to a PSID 1, a PSID 2, a PC5 unicast link ID 1, F1, and a layer-2 address pair 1; and (source station ID 2, destination station ID 2) corresponds to the PSID 2, a PSID 4, a PC5 unicast link ID 2, F1, and a layer-2 address pair 2. In the unicast pair 1, a layer-2 address pair of a V2X service identified by the PSID 2 is the layer-2 address pair 1. In the unicast pair 2, a layer-2 address pair of the V2X service identified by the PSID 2 is the layer-2 address pair 2. It is assumed that the frequency band of the first V2X service is F1, and the identifier of the first V2X service is the PSID 2. The transmit end may query Table 4 using F1, the PSID 2, and (source station ID 1, destination station ID 1) as indexes, and find that a PC5 unicast link corresponding to F1, the PSID 2, and (source station ID 1, destination station ID 1) exists in Table 4. The transmit end further queries Table 4 using F1, the PSID 2, and (source station ID 1, destination station ID 1) as indexes, finds that a layer-2 address pair corresponding to the PSID 2 is the layer-2 address pair 1, and determines the layer-2 address pair 1 as the layer-2 address pair of the first V2X service.

TABLE 4

| Station ID pair | V2X service ID | PC5 unicast link ID | Frequency band | Layer-2 address pair |
|---|---|---|---|---|
| (Source station ID 1, destination station ID 1) | PSID 1 and PSID 2 | PC5 unicast link ID 1 | F1 | Layer-2 address pair 1 |
| (Source station ID 2, destination station ID 2) | PSID 2 and PSID 4 | PC5 unicast link ID 2 | F1 | Layer-2 address pair 2 |

The method shown in FIG. 4 is described below in detail with reference to the system shown in FIG. 1 and using an example in which a terminal 1 transmits data of a V2X service 1 and data of a V2X service 2 to a terminal 2.

Figure 6A:
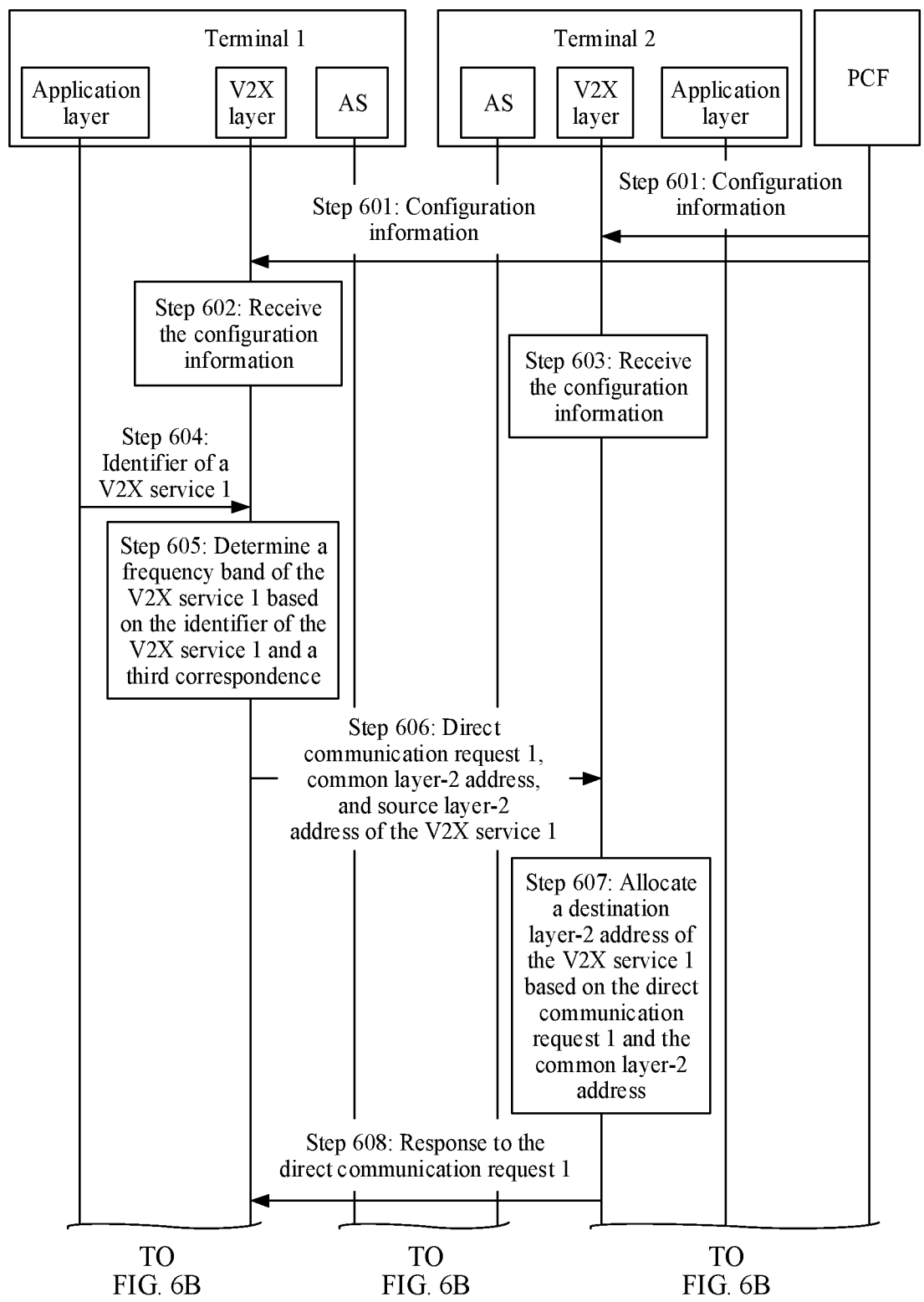
FIG. 6A to FIG. 6C are a flowchart of a communication method according to an embodiment of this application.
Figure 6B:
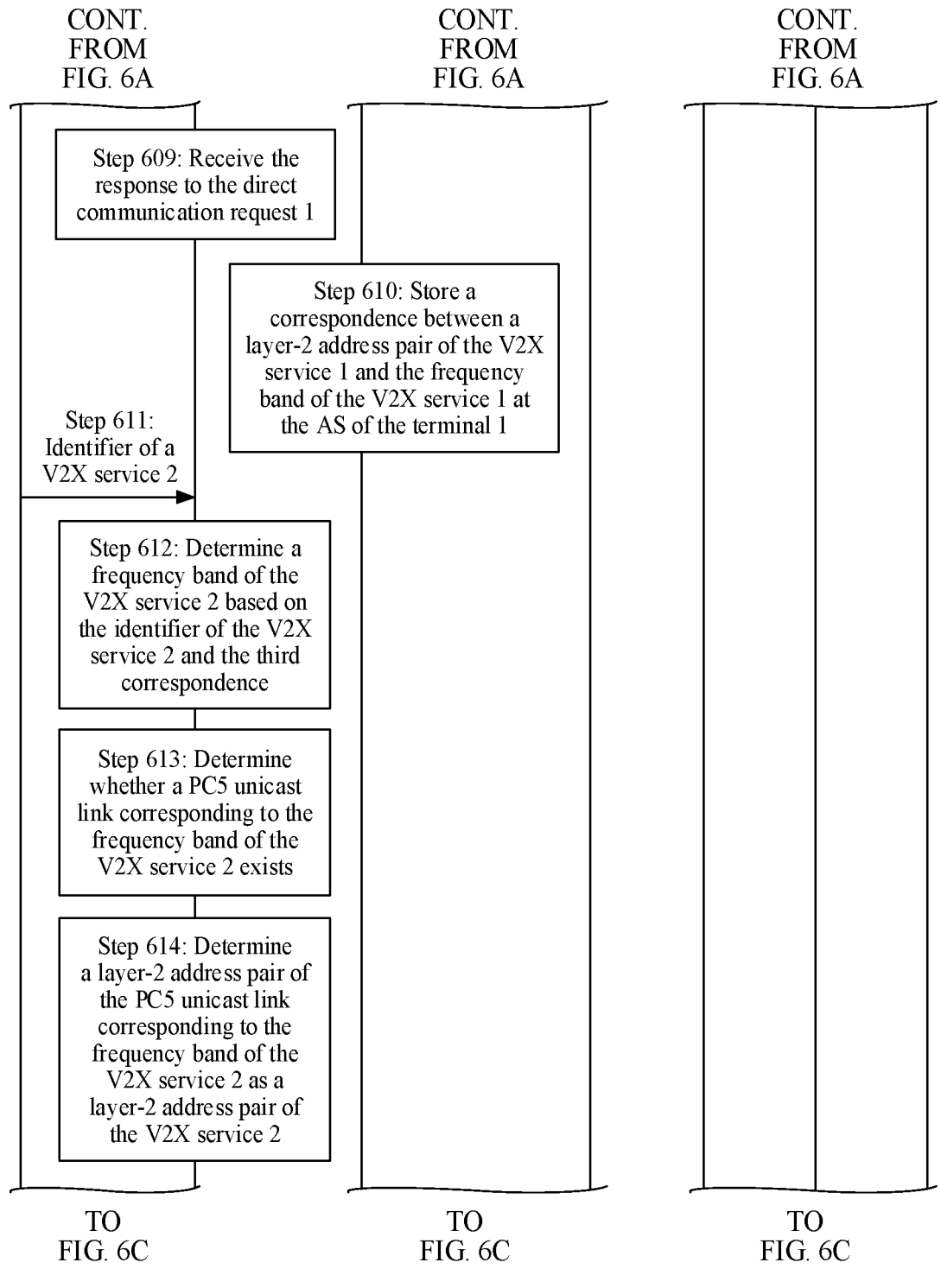
Figure 6C:
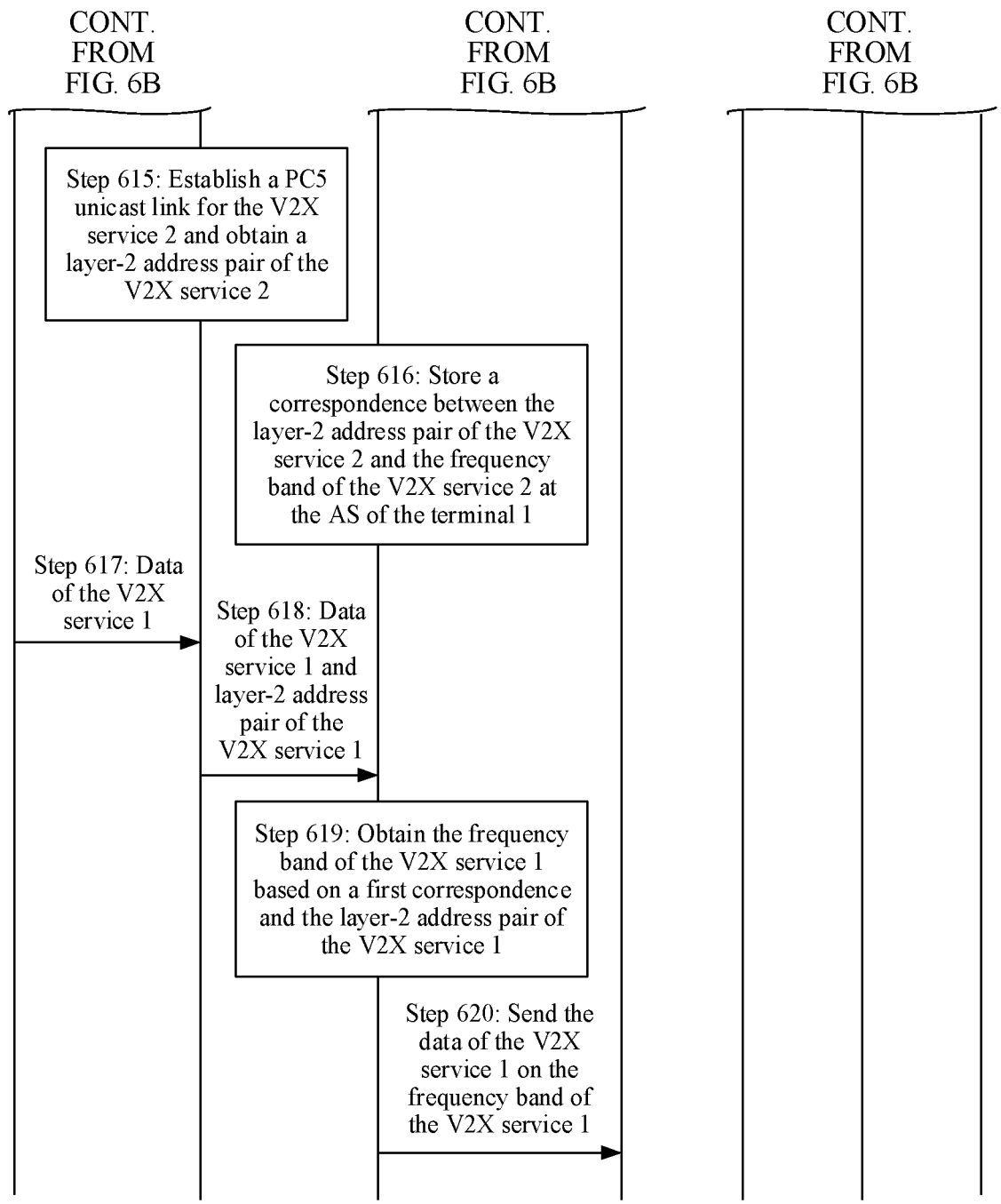

FIG. 6A to FIG. 6C are a flowchart of another communication method according to an embodiment of this application. As shown in FIG. 6A to FIG. 6C, the method includes the following steps.

Step 601: A PCF sends configuration information to a terminal 1 and a terminal 2.

The PCF may be the PCF in FIG. 1.

The configuration information may include a third correspondence, and the third correspondence is a correspondence between an identifier of a V2X service and a frequency band of the V2X service. Optionally, further, the configuration information may further include a common layer-2 address and a correspondence between a common layer-2 address and a frequency band.

Alternatively, the common layer-2 address corresponds to an identifier of a V2X service. Because an identifier of one V2X service corresponses to only one frequency band, it means that there is also a correspondence between a common layer-2 address and a frequency band. In other words, there is a correspondence among an identifier of a V2X service, a common layer-2 address, and a frequency band.

For example, the identifier of the V2X service is in a one-to-one correspondence with the common layer-2 address. (Identifier of a V2X service, common layer-2 address) is in a many-to-one correspondence with the frequency band. In other words, a plurality of groups of (identifier of a V2X service, common layer-2 address) may correspond to one frequency band.

For example, if a PSID 1 corresponds to a common layer-2 address 1, a PSID 2 corresponds to a common layer-2 address 2, and both the PSID 1 and the PSID 2 correspond to a frequency band 1, when UE 1 establishes a PC5 unicast link for the PSID 1, the UE 1 may send the common layer-2 address 1 corresponding to the PSID 1 to a peer end. After successfully establishing the PC5 unicast link, the UE 1 associates the PC5 unicast link with the frequency band 1 (in other words, associates a layer-2 address pair of the PC5 unicast link with the frequency band 1). When the UE 1 triggers a service identified by the PSID 2, because the PSID 2 also corresponds to the frequency band 1, the PC5 unicast link corresponding to the frequency band 1 is directly used.

Step 602: The terminal 1 receives the configuration information sent by the PCF.

Further, the terminal 1 may store content in the configuration information at a V2X layer of the terminal 1, for example, store the third correspondence at the V2X layer of the terminal 1. If the configuration information includes the common layer-2 address and the correspondence between a common layer-2 address and a frequency band, the terminal 1 may further store the common layer-2 address and the correspondence between a common layer-2 address and a frequency band at the V2X layer.

Step 603: The terminal 2 receives the configuration information sent by the PCF.

Further, the terminal 2 may store the content in the configuration information at a V2X layer of the terminal 2, for example, store the third correspondence at the V2X layer of the terminal 2. If the configuration information includes the common layer-2 address and the correspondence between a common layer-2 address and a frequency band, the terminal 2 may further store the common layer-2 address and the correspondence between a common layer-2 address and a frequency band at the V2X layer.

Step 604: An application layer of the terminal 1 triggers a V2X service 1, and sends an identifier of the V2X service 1 to the V2X layer of the terminal 1.

Step 605: The V2X layer of the terminal 1 receives the identifier of the V2X service 1, and determines a frequency band of the V2X service 1 based on the identifier of the V2X service 1 and the third correspondence.

Step 606: The V2X layer of the terminal 1 determines that no PC5 unicast link corresponding to the frequency band of the V2X service 1 exists, and the V2X layer of the terminal 1 obtains a common layer-2 address corresponding to the frequency band of the V2X service 1, and sends a direct communication request 1, the common layer-2 address, and a source layer-2 address of the V2X service 1 to the V2X layer of the terminal 2.

The direct communication request 1 may be used to request to allocate a destination layer-2 address of the V2X service 1.

The V2X layer of the terminal 1 may obtain, based on the frequency band of the V2X service 1 and the correspondence between a common layer-2 address and a frequency band, the common layer-2 address corresponding to the frequency band of the V2X service 1.

The source layer-2 address of the V2X service 1 may be allocated by the terminal 1, and source layer-2 addresses of V2X services on different frequency bands may be the same or may be different. In the embodiment shown in FIG. 6A to FIG. 6C, the source layer-2 address of the V2X service 1 may be a source layer-2 address of a PC5 unicast link.

Step 607: The V2X layer of the terminal 2 receives the direct communication request 1, the common layer-2 address, and the source layer-2 address of the V2X service 1, and allocates the destination layer-2 address of the V2X service 1 based on the direct communication request 1 and the common layer-2 address.

For example, that the V2X layer of the terminal 2 allocates the destination layer-2 address of the V2X service 1 based on the direct communication request 1 and the common layer-2 address may include: The direct communication request 1 is used as a trigger condition for the V2X layer of the terminal 2 to allocate the destination layer-2 address of the V2X service 1, and once receiving the direct communication request 1, the V2X layer of the terminal 2 determines the frequency band of the V2X service 1 based on the common layer-2 address and/or the direct communication request 1, and allocates the destination layer-2 address of the V2X service 1 based on the frequency band of the V2X service 1. Optionally, the direct communication request 1 may include V2X service identifier information.

Step 608: The V2X layer of the terminal 2 sends a response to the direct communication request 1 to the V2X layer of the terminal 1.

The response to the direct communication request 1 includes the destination layer-2 address of the V2X service 1.

In this embodiment, the destination layer-2 address of the V2X service 1 may be a destination layer-2 address of the PC5 unicast link.

It should be noted that, in the embodiments of this application, a source layer-2 address of a V2X service and a destination layer-2 address of the V2X service are relative concepts, and are both named from a perspective of a transmit end. Optionally, for a receive end, the source layer-2 address of the V2X service mentioned in the embodiments of this application is a destination layer-2 address of the V2X service, and the destination layer-2 address of the V2X service mentioned in the embodiments of this application is a source layer-2 address of the V2X service.

Similarly, a source layer-2 address of a PC5 unicast link and a destination layer-2 address of the PC5 unicast link are relative concepts, and are both named from a perspective of the transmit end. Optionally, for the receive end, the source layer-2 address of the PC5 unicast link mentioned in the embodiments of this application is a destination layer-2 address of the PC5 unicast link, and the destination layer-2 address of the PC5 unicast link mentioned in the embodiments of this application is a source layer-2 address of the PC5 unicast link.

Step 609: The V2X layer of the terminal 1 receives the response to the direct communication request 1.

Step 606 to step 609 are a process of establishing the PC5 unicast link for the V2X service 1. In other words, step 606 to step 609 are a process of establishing the PC5 unicast link corresponding to the frequency band of the V2X service 1.

In the embodiment shown in FIG. 6A to FIG. 6C, a plurality of PC5 unicast links may be established between the terminal 1 and the terminal 2. A PC5 unicast link corresponds to a frequency band. Different PC5 unicast links may correspond to different frequency bands, or may correspond to a same frequency band.

After receiving the response to the direct communication request 1, the V2X layer of the terminal 1 may store a correspondence between an ID of the PC5 unicast link and the frequency band of the V2X service 1 in a second correspondence. Further, a correspondence between a layer-2 address pair of the PC5 unicast link (for example, the source layer-2 address of the PC5 unicast link and the destination layer-2 address of the PC5 unicast link) and the ID of the PC5 unicast link may be stored in the second correspondence.

As described above, the second correspondence may include a correspondence between a PC5 unicast link ID and a frequency band of a V2X service.

Step 610: The terminal 1 stores, at an AS of the terminal, a correspondence between a layer-2 address pair of the V2X service 1 and the frequency band of the V2X service 1 in the AS of the terminal 1, for example, may add the correspondence between the layer-2 address pair of the V2X service 1 and the frequency band of the V2X service 1 to a first correspondence.

As described above, the first correspondence may include a correspondence between a layer-2 address pair of a V2X service and a frequency band of a V2X service.

Step 611: The application layer of the terminal 1 triggers a V2X service 2, and sends an identifier of the V2X service 2 to the V2X layer of the terminal 1.

Step 612: The V2X layer of the terminal 1 receives the identifier of the V2X service 2, and determines a frequency band of the V2X service 2 based on the identifier of the V2X service 2 and the third correspondence.

Step 613: The V2X layer of the terminal 1 determines whether a PC5 unicast link corresponding to the frequency band of the V2X service 2 exists; and if the PC5 unicast link exists, performs step 614; or if no PC5 unicast link exists, performs step 615.

Step 614: The V2X layer of the terminal 1 determines a layer-2 address pair of the PC5 unicast link corresponding to the frequency band of the V2X service 2 as a layer-2 address pair of the V2X service 2.

For example, if the frequency band of the V2X service 2 is the same as the frequency band of the V2X service 1, the layer-2 address pair of the PC5 unicast link established for the V2X service 1 may be determined as the layer-2 address pair of the V2X service 2.

Step 615: The V2X layer of the terminal 1 establishes a PC5 unicast link for the V2X service 2, and obtains a layer-2 address pair of the V2X service 2.

For a process in which the V2X layer of the terminal 1 establishes the PC5 unicast link for the V2X service 2, refer to the process of establishing the PC5 unicast link for the V2X service 1 in step 606 to step 609. Details are not described.

Step 616: The V2X layer of the terminal 1 stores a correspondence between the layer-2 address pair of the V2X service 2 and the frequency band of the V2X service 2 at the AS of the terminal 1, for example, may add the correspondence between the layer-2 address pair of the V2X service 2 and the frequency band of the V2X service 2 to the first correspondence.

Step 617: The application layer of the terminal 1 generates data of the V2X service 1, and sends the data of the V2X service 1 to the V2X layer of the terminal 1.

Step 618: The V2X layer of the terminal 1 receives the data of the V2X service 1, and sends the data of the V2X service 1 and the layer-2 address pair of the V2X service 1 to the AS of the terminal 1.

Step 619: The AS of the terminal 1 receives the data of the V2X service 1 and the layer-2 address pair of the V2X service 1, and obtains the frequency band of the V2X service 1 based on the first correspondence and the layer-2 address pair of the V2X service 1.

Step 620: The AS of the terminal 1 sends, on the frequency band of the V2X service 1 based on the destination layer-2 address in the layer-2 address pair of the V2X service 1, the data of the V2X service 1 to the terminal 2 identified by the destination layer-2 address of the V2X service 1.

Further, optionally, the AS of the terminal 1 further sends the layer-2 address pair of the V2X service 1 to the terminal 2. The layer-2 address pair of the V2X service 1 and the data of the V2X service 1 may be encapsulated together, for example, encapsulated in a second data packet and sent to the terminal 2. Although not shown in FIG. 6A to FIG. 6C, specifically, the AS of the terminal 1 may deliver the second data packet to a PDCP layer, an RLC layer, a MAC layer, and a physical layer of the terminal 1 for processing, and send the processed data packet to the terminal 2.

It should be noted that step 617 to step 620 are described only using an example of sending the data of the V2X service 1. It may be understood that, the data of the V2X service 2 may be further sent with reference to step 617 to step 620. Details are not described.

Based on the method shown in FIG. 6A to FIG. 6C, a same PC5-S link may be established for a plurality of V2X services on a same frequency band, and a same layer-2 address pair may be allocated to the V2X services on the same frequency band. Subsequently, the V2X services on the same frequency band may be packed together and sent to the receive end. This avoids a problem that a V2X service fails to be received or is incorrectly received because V2X services on different frequency bands are put together and sent to the receive end. Certainly, a plurality of different PC5 unicast links may alternatively be established for a plurality of V2X services on a same frequency band, and different layer-2 address pairs are allocated to the plurality of V2X services. However, the plurality of different PC5 unicast links correspond to the same frequency band.

FIG. 6A to FIG. 6C are described using an example in which a same PC5 unicast link is established for V2X services on a same frequency band, and a layer-2 address pair of the PC5 unicast link is determined as layer-2 address pairs of the plurality of V2X services. In another feasible solution, alternatively, a different layer-2 address pair may be allocated to each V2X service over the PC5 unicast link established between the transmit end and the receive end. For example, for this solution, refer to FIG. 7A to FIG. 7C.

Figure 7A:
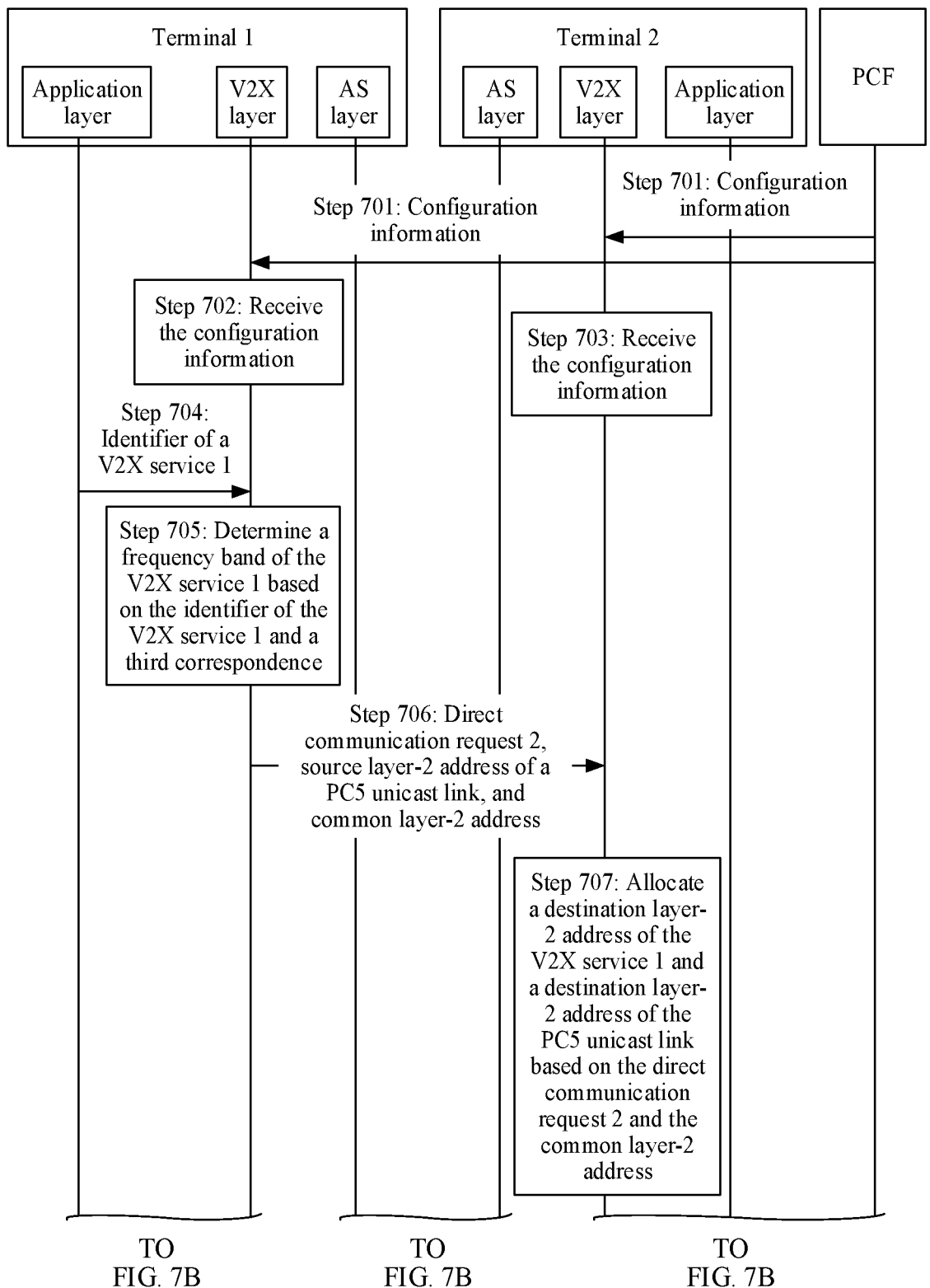
FIG. 7A to FIG. 7C are a flowchart of another communication method according to an embodiment of this application.
Figure 7B:
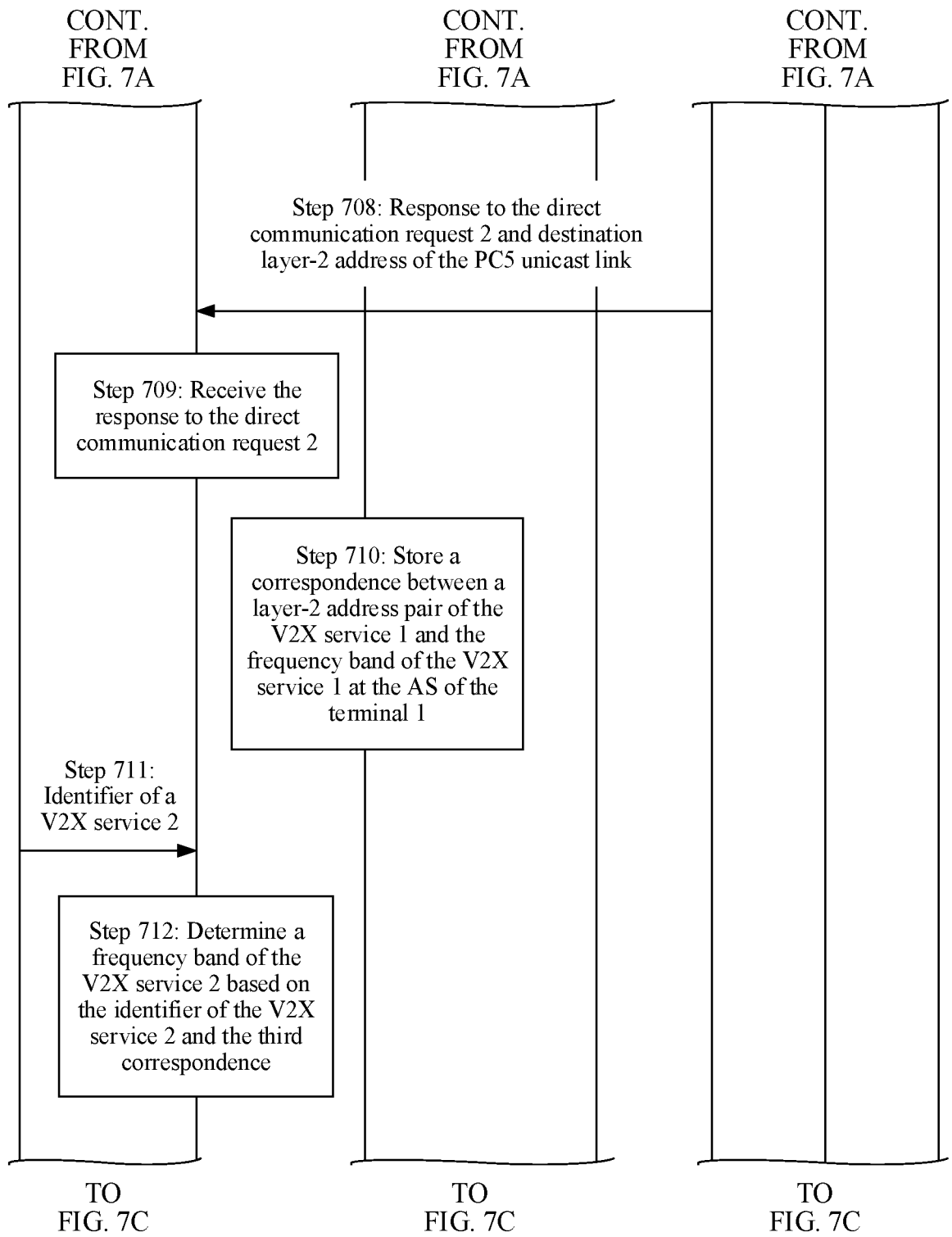
Figure 7C:
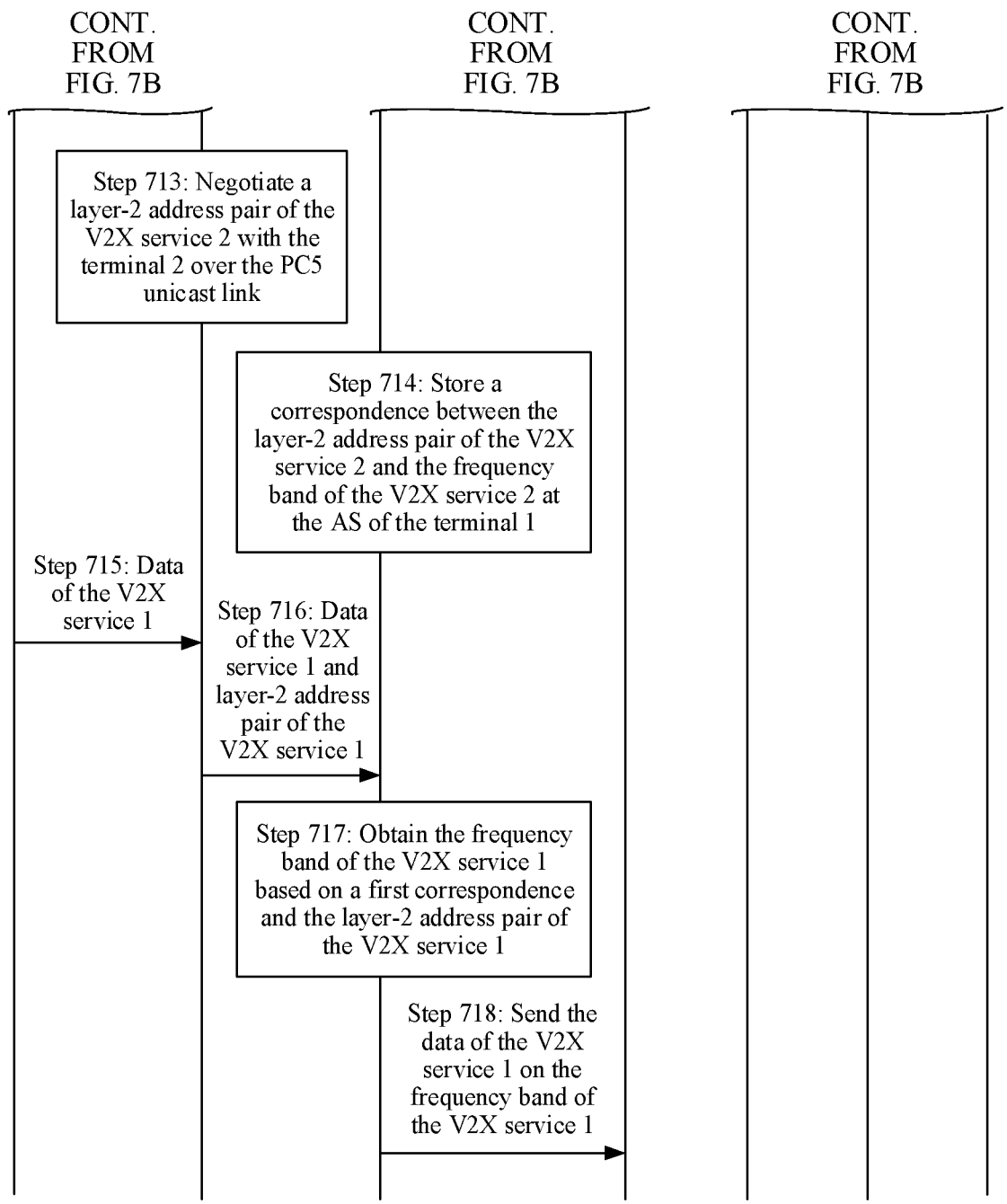

FIG. 7A to FIG. 7C are a flowchart of another communication method according to an embodiment of this application. As shown in FIG. 7A to FIG. 7C, the method includes the following steps.

Step 701: A PCF sends configuration information to a terminal 1 and a terminal 2.

For step 701, refer to step 601. Details are not described.

Step 702: The terminal 1 receives the configuration information sent by the PCF.

For step 702, refer to step 602. Details are not described.

Step 703: The terminal 2 receives the configuration information sent by the PCF.

For step 703, refer to step 603. Details are not described.

Step 704: An application layer of the terminal 1 triggers a V2X service 1, and sends an identifier of the V2X service 1 to a V2X layer of the terminal 1.

Step 705: The V2X layer of the terminal 1 receives the identifier of the V2X service 1, and determines a frequency band of the V2X service 1 based on the identifier of the V2X service 1 and a third correspondence.

Step 706: The V2X layer of the terminal 1 determines that no PC5 unicast link exists between the terminal 1 and the terminal 2, and the V2X layer of the terminal 1 obtains a common layer-2 address corresponding to the frequency band of the V2X service 1, and sends a direct communication request 2, a source layer-2 address of a PC5 unicast link, and the common layer-2 address to a V2X layer of the terminal 2.

The direct communication request 2 may be used to request to allocate a destination layer-2 address of the V2X service 1 and a destination layer-2 address of the PC5 unicast link. The direct communication request 2 may include a source layer-2 address of the V2X service 1. Further, the direct communication request 2 may further include the source layer-2 address of the PC5 unicast link.

The V2X layer of the terminal 1 may obtain, based on the frequency band of the V2X service 1 and a correspondence between a common layer-2 address and a frequency band, the common layer-2 address corresponding to the frequency band of the V2X service 1.

The source layer-2 address of the PC5 unicast link and the source layer-2 address of the V2X service 1 may be allocated by the terminal 1, and source layer-2 addresses of V2X services on different frequency bands may be the same or may be different.

Step 707: The V2X layer of the terminal 2 receives the direct communication request 2, the common layer-2 address, and the source layer-2 address of the PC5 unicast link, and allocates the destination layer-2 address of the V2X service 1 and the destination layer-2 address of the PC5 unicast link based on the direct communication request 2 and the common layer-2 address.

For example, that the V2X layer of the terminal 2 determines the destination layer-2 address of the V2X service 1 based on the direct communication request 2 and the common layer-2 address may include: The direct communication request 2 is used as a trigger condition for the V2X layer of the terminal 2 to allocate the destination layer-2 address of the V2X service 1 and the destination layer-2 address of the PC5 unicast link, and once receiving the direct communication request 2, the V2X layer of the terminal 2 determines the frequency band of the V2X service 1 based on the common layer-2 address, and allocates the destination layer-2 address of the V2X service 1 and the destination layer-2 address of the PC5 unicast link based on the frequency band of the V2X service 1.

Step 708: The V2X layer of the terminal 2 sends a response to the direct communication request 2 and the destination layer-2 address of the PC5 unicast link to the V2X layer of the terminal 1.

The response to the direct communication request 2 may include the destination layer-2 address of the V2X service 1. Further, the response to the direct communication request 2 may further include the destination layer-2 address of the PC5 unicast link.

Step 709: The V2X layer of the terminal 1 receives the response to the direct communication request 2.

Step 707 to step 709 are a process of establishing the PC5 unicast link between the terminal 1 and the terminal 2.

In the embodiment shown in FIG. 7A to FIG. 7C, only one PC5 unicast link needs to be established between the terminal 1 and the terminal 2.

After receiving the response to the direct communication request, the V2X layer of the terminal 1 may store, in a correspondence manner, an ID of the PC5 unicast link and a layer-2 address pair of the PC5 unicast link.

Step 710: The terminal 1 stores, at an AS of the terminal, a correspondence between a layer-2 address pair of the V2X service 1 and the frequency band of the V2X service 1 in the AS of the terminal 1, for example, may add the correspondence between the layer-2 address pair of the V2X service 1 and the frequency band of the V2X service 1 to a first correspondence.

As described above, the first correspondence may include a correspondence between a layer-2 address pair of a V2X service and a frequency band of the V2X service.

Step 711: The application layer of the terminal 1 triggers a V2X service 2, and sends an identifier of the V2X service 2 to the V2X layer of the terminal 1.

Step 712: The V2X layer of the terminal 1 receives the identifier of the V2X service 2, and determines a frequency band of the V2X service 2 based on the identifier of the V2X service 2 and the third correspondence.

Step 713: The V2X layer of the terminal 1 determines that the PC5 unicast link exists between the terminal 1 and the terminal 2, and negotiates a layer-2 address pair of the V2X service 2 with the terminal 2 over the PC5 unicast link.

That the V2X layer of the terminal 1 negotiates a layer-2 address pair of the V2X service 2 with the terminal 2 over the PC5 unicast link may include: The V2X layer of the terminal 1 sends a third request and the layer-2 address pair of the PC5 unicast link to the V2X layer of the terminal 2, where the third request is used to request a destination layer-2 address of the V2X service 2, and the third request includes a source layer-2 address of the V2X service 2. A name of the third request is not limited, and the third request may be named as a parameter negotiation request or another name. This is not limited.

The terminal 2 receives the third request and the layer-2 address pair of the PC5 unicast link, allocates the destination layer-2 address of the V2X service 2 based on the third request and the layer-2 address pair of the PC5 unicast link, and sends a response to the third request to the terminal 1. The response to the third request includes the destination layer-2 address of the V2X service 2.

The terminal 1 receives the response to the third request from the terminal 2.

Step 714: The V2X layer of the terminal 1 stores a correspondence between the layer-2 address pair of the V2X service 2 and the frequency band of the V2X service 2 at the AS of the terminal 1, for example, may add the correspondence between the layer-2 address pair of the V2X service 2 and the frequency band of the V2X service 2 to the first correspondence.

Step 715: The application layer of the terminal 1 generates data of the V2X service 1, and sends the data of the V2X service 1 to the V2X layer of the terminal 1.

Step 716: The V2X layer of the terminal 1 receives the data of the V2X service 1, and sends the data of the V2X service 1 and the layer-2 address pair of the V2X service 1 to the AS of the terminal 1.

Step 717: The AS of the terminal 1 receives the data of the V2X service 1 and the layer-2 address pair of the V2X service 1, and obtains the frequency band of the V2X service 1 based on the first correspondence and the layer-2 address pair of the V2X service 1.

Step 718: The AS of the terminal 1 sends, on the frequency band of the V2X service 1 based on the destination layer-2 address in the layer-2 address pair of the V2X service 1, the data of the V2X service 1 to the terminal 2 identified by the destination layer-2 address of the V2X service 1.

Further, optionally, the AS of the terminal 1 further sends the layer-2 address pair of the V2X service 1 to the terminal 2. The layer-2 address pair of the V2X service 1 and the data of the V2X service 1 may be encapsulated together, for example, encapsulated in a second data packet and sent to the terminal 2. Although not shown in FIG. 7A to FIG. 7C, specifically, the AS of the terminal 1 may deliver the second data packet to a PDCP layer, an RLC layer, a MAC layer, and a physical layer of the terminal 1 for processing, and send the processed data packet to the terminal 2.

It should be noted that step 715 to step 718 are described only using an example of sending the data of the V2X service 1. It may be understood that, the data of the V2X service 2 may be further sent with reference to step 715 to step 718. Details are not described.

Based on the method shown in FIG. 7A to FIG. 7C, a different layer-2 address pair may be allocated to a V2X service on each frequency band over the PC5 unicast link established between the terminals, and the layer-2 address pair is associated with a frequency band corresponding to the V2X service. Subsequently, when data of a V2X service is sent, V2X services on different frequency bands may be distinguished and sent on different frequency bands. This avoids a problem that a V2X service fails to be received or is incorrectly received because the V2X services on different frequency bands are put together and sent to the receive end.

In the methods shown in FIG. 4 to FIG. 7C, descriptions are provided only using an example in which a layer-2 address pair is configured for a V2X service based on a frequency band of the V2X service and through PC5 unicast communication establishment, and data of the V2X service is sent on the frequency band corresponding to the V2X service using the configured layer-2 address pair. In another solution, a same QoS flow may be further established for V2X services that are on a same frequency band and that have a same QoS requirement. The V2X services that are on the same frequency band and that have the same QoS requirement are transmitted using the same QoS flow, to prevent data of V2X services on different frequency bands from being mixed and sent together. For example, for the method, refer to FIG. 8.

Figure 8:
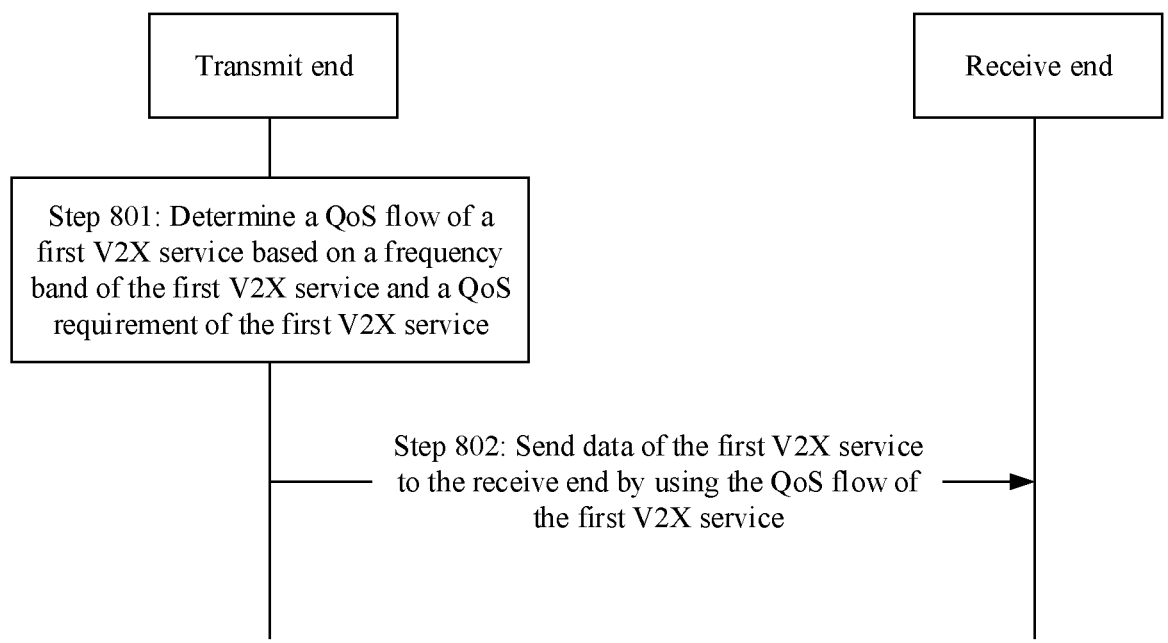
FIG. 8 is a flowchart of another communication method according to an embodiment of this application.

FIG. 8 is a flowchart of another communication method according to an embodiment of this application. As shown in FIG. 8, the method may include the following steps.

Step 801: A transmit end determines a QoS flow of a first V2X service based on a frequency band of the first V2X service and a QoS requirement of the first V2X service.

The transmit end may be any terminal that sends data of the first V2X service to another terminal through a PC5 interface in FIG. 1. For example, the transmit end may be the terminal 1 in FIG. 1. It should be noted that the transmit end corresponds to a receive end, and the receive end may be any terminal that receives, through the PC5 interface, a V2X service sent by the transmit end. For example, if the transmit end is the terminal 1 in FIG. 1, the receive end may be the terminal 2 or the terminal 3 in FIG. 1.

For related descriptions of the frequency band of the first V2X service and a method for determining the frequency band of the first V2X service, refer to the descriptions in step 401. Details are not described again. For example, the transmit end may determine the frequency band of the first V2X service based on a third correspondence and an identifier of the first V2X service, where the third correspondence is a correspondence between an identifier of a V2X service and a frequency band of the V2X service, and the third correspondence may be configured by a PCF for the transmit end.

The QoS requirement of the first V2X service may include a delay requirement, a rate requirement, and the like of the first V2X service.

To prevent data of V2X services on different frequency bands from being mixed and sent together, descriptions are provided using an example in which the frequency band of the first V2X service is a first frequency band and the QoS requirement of the first V2X service is a first QoS requirement. The QoS flow of the first V2X service is different from a QoS flow of a V2X service other than a V2X service corresponding to the first frequency band and the first QoS requirement.

For example, that a transmit end determines a QoS flow of a first V2X service based on a frequency band of the first V2X service and a QoS requirement of the first V2X service may include: If a QoS flow corresponding to the frequency band of the first V2X service and the QoS requirement of the first V2X service exists between the transmit end and the receive end, the transmit end determines the QoS flow corresponding to the frequency band of the first V2X service and the QoS requirement of the first V2X service as the QoS flow of the first V2X service.

Alternatively, if no QoS flow corresponding to the frequency band of the first V2X service and the QoS requirement of the first V2X service exists between the transmit end and the receive end, the transmit end establishes the QoS flow of the first V2X service for the first V2X service.

For example, the frequency band of the first V2X service is the first frequency band, and the QoS requirement of the first V2X service is the first QoS requirement. A process in which the transmit end establishes the QoS flow of the first V2X service for the first V2X service may include: The transmit end sends a fourth request to the receive end, where the fourth request may be used to request a related parameter of a first QoS flow, and the first QoS flow may be used to transmit data of a V2X service whose frequency band is the first frequency band and whose QoS requirement is the first QoS requirement.

The receive end receives the fourth request, and obtains the related parameter of the first QoS flow.

The transmit end receives a response to the fourth request from the receive end. In a possible manner, the related parameter of the first QOS flow in the fourth request includes parameters such as an identifier (for example, a PQFI)) of the first QoS flow and a PC5 QoS identifier (PQI). If the receive end accepts establishment of the first QoS flow, the receive end stores the parameters such as the identifier of the first QoS flow and the PQI, and returns the response to the fourth request. The response to the fourth request is used to indicate that the receive end accepts the establishment of the first QoS flow. In other words, the response to the fourth request is used to indicate that the first QoS flow is successfully established.

In another possible design, the related parameter of the first QoS flow in the fourth request includes parameters such as a plurality of self-driving levels, and each self-driving level corresponds to one QoS requirement. The receive end accepts establishment of the first QoS flow, selects a relatively high self-driving level from the plurality of self-driving levels, and returns the response to the fourth request. The response to the fourth request includes the relatively high self-driving level selected by the receive end. The response to the fourth request is used to indicate that the receive end accepts the establishment of the first QoS flow. In other words, the response to the fourth request is used to indicate that the first QoS flow is successfully established.

A name of the fourth request is not limited, and the fourth request may be named as a parameter negotiation request or another name. This is not limited.

The related parameter that is of the first QoS flow and that is obtained by the receive end may include the identifier of the first QoS flow, the PQI, and the like.

Further, for example, the frequency band of the first V2X service is the first frequency band, and the QOS requirement of the first V2X service is the first QoS requirement. The transmit end may store, in a correspondence manner, the identifier of the QoS flow of the first V2X service, the first frequency band, and the first QoS requirement at a V2X layer of the transmit end.

Further, the transmit end may further send, using the V2X layer of the transmit end, a fourth correspondence to an AS of the transmit end. The fourth correspondence is a correspondence between an identifier of a QoS flow of a V2X service and a frequency band of the V2X service. For example, the fourth correspondence may include a correspondence between the identifier of the QoS flow of the first V2X service and the frequency band of the first V2X service. The transmit end stores the fourth correspondence at the AS.

Step 802: The transmit end sends data of the first V2X service to the receive end using the QoS flow of the first V2X service.

For example, that the transmit end sends data of the first V2X service to the receive end using the QoS flow of the first V2X service may include: An application layer of the transmit end generates the data of the first V2X service, and sends a first data packet to the V2X layer of the transmit end, where the first data packet includes the data of the first V2X service, and may further include the identifier of the first V2X service; when the V2X layer of the transmit end receives the first data packet, and the first data packet carries the data of the first V2X service, the transmit end filters, at the V2X layer, the data of the first V2X service into the QOS flow of the first V2X service; the V2X layer of the transmit end sends the data of the first V2X service, the identifier of the QoS flow of the first V2X service, and a layer-2 address pair of the first V2X service to the AS of the transmit end; the AS of the transmit end receives the data of the first V2X service, the identifier of the QoS flow of the first V2X service, and the layer-2 address pair of the first V2X service, and the AS of the transmit end obtains the frequency band of the first V2X service based on the fourth correspondence and the identifier of the QoS flow of the first V2X service; and the AS of the transmit end sends the data of the first V2X service to the receive end on the frequency band of the first V2X service based on a destination layer-2 address in the layer-2 address pair of the first V2X service, where the QOS flow of the first V2X service includes the data of the first V2X service.

That the transmit end filters, at the V2X layer of the transmit end, the data of the first V2X service into the QoS flow of the first V2X service may include: The V2X layer of the transmit end determines the frequency band of the first V2X service based on the third correspondence and the identifier of the first V2X service; then determines the QoS flow corresponding to the first V2X service, based on the frequency band of the first V2X service, the QOS requirement of the first V2X service, and a correspondence among an identifier of a QoS flow, a frequency band of a V2X service, and a QoS requirement of the V2X service; and filters the data of the first V2X service into the QoS flow of the first V2X service.

It should be noted that FIG. 8 is described only using an example of sending the data of the first V2X service. It may be understood that, data of a plurality of V2X services may be sent to the receive end with reference to the method shown in FIG. 8.

For example, in an example in which the transmit end sends data of a second V2X service to the receive end, the method further includes: The transmit end determines a QoS flow of the second V2X service based on a frequency band of the second V2X service and a QoS requirement of the second V2X service.

If the frequency band of the first V2X service is different from the frequency band of the second V2X service and/or the QoS requirement of the first V2X service is different from the QoS requirement of the second V2X service, the QOS flow of the first V2X service is different from the QoS flow of the second V2X service. If the frequency band of the first V2X service is the same as the frequency band of the second V2X service, and the QOS requirement of the first V2X service is the same as the QoS requirement of the second V2X service, the QoS flow of the first V2X service is the same as the QoS flow of the second V2X service.

Based on the method shown in FIG. 8, a same QoS flow may be established for V2X services that are on a same frequency band and that have a same QoS requirement, and subsequently, data of the V2X services that are on the same frequency band and that have the same QoS requirement may be filtered into the same QoS flow and sent to the receive end. This avoids a problem that a V2X service fails to be received or is incorrectly received because data of V2X services that are on different frequency bands and that have different QoS requirements is put together and sent to the receive end.

For example, a V2X service 1 corresponds to (frequency band F1, QOS requirement 1), a V2X service 2 corresponds to (frequency band F1, QOS requirement 1), a V2X service 3 corresponds to (frequency band F2, QOS requirement 2), and a V2X service 4 corresponds to (frequency band F2, QOS requirement 2). In an initial phase, when the V2X layer of the transmit end triggers the V2X service 1, and finds that no QoS flow corresponding to F1 and the QoS requirement 1 exists, the V2X layer of the transmit end requests to establish a QoS flow 1 corresponding to F1 and the QoS requirement 1, that is, establishes the QOS flow 1 of the V2X service 1. After the establishment is completed, a correspondence among the QoS flow 1, F1, and the QoS requirement 1 is stored. Subsequently, when the V2X layer of the transmit end triggers the V2X service 2, and finds that the QoS flow 1 corresponding to F1 and the QoS requirement 1 exists, the QoS flow 1 is used as a QoS flow of the V2X service 2. Similarly, a QoS flow 2 corresponding to F2 and the QoS requirement 2 is established, and the QoS flow 2 is used as a QoS flow of the V2X service 3 and a QoS flow of the V2X service 4. After a QoS flow of a V2X service is established, the V2X layer notifies the AS of a correspondence between an identifier of the QoS flow of the V2X service and a frequency band of the V2X service.

Further, when the V2X layer of the transmit end needs to send data of the V2X service 1, data of the V2X service 2, data of the V2X service 3, and data of the V2X service 4 to the receive end, the V2X layer filters (or maps) the data of the V2X service 1 and the data of the V2X service 2 to the QoS flow 1, and then delivers the data in the QoS flow 1 and an identifier of the QoS flow 1 to the AS. The AS determines, based on the identifier of the QoS flow 1 and the correspondence between an identifier of a QoS flow and a frequency band of a V2X service, to send the data in the QoS flow 1 to the peer end on the frequency band F1.

The V2X layer filters the data of the V2X service 3 and the data of the V2X service 4 to the QoS flow 2, and then delivers the data in the QoS flow 2 and an identifier of the QoS flow 2 to the AS. The AS determines, based on the identifier of the QoS flow 2 and the correspondence between an identifier of a QoS flow and a frequency band of a V2X service, to send the data in the QoS flow 2 to the peer end on the frequency band F2.

The method shown in FIG. 8 is described below in detail with reference to the system shown in FIG. 1 and using an example in which a terminal 1 transmits data of a V2X service 1 and data of a V2X service 2 to a terminal 2.

Figure 9A:
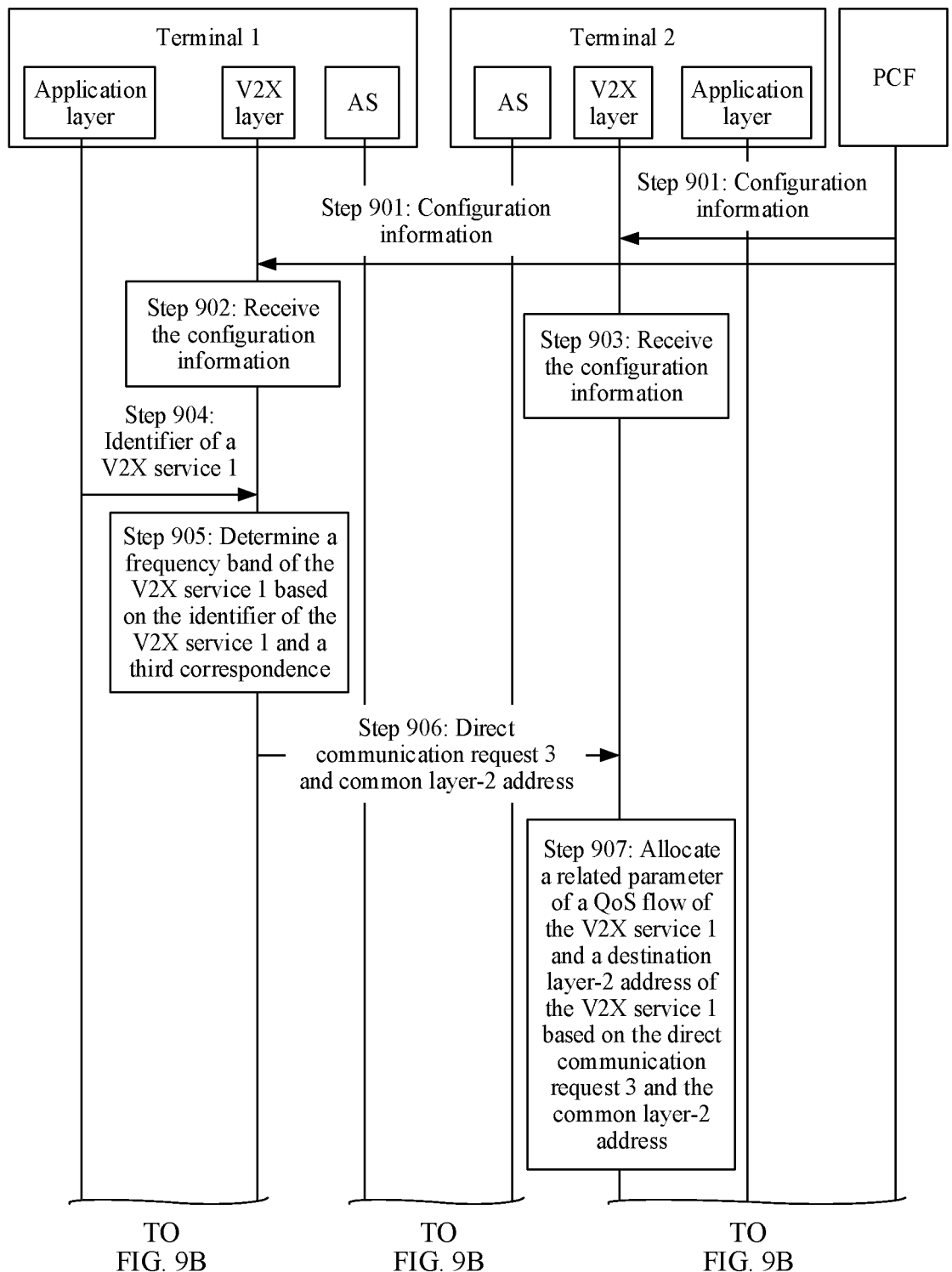
FIG. 9A to FIG. 9C are a flowchart of still another communication method according to an embodiment of this application.
Figure 9B:
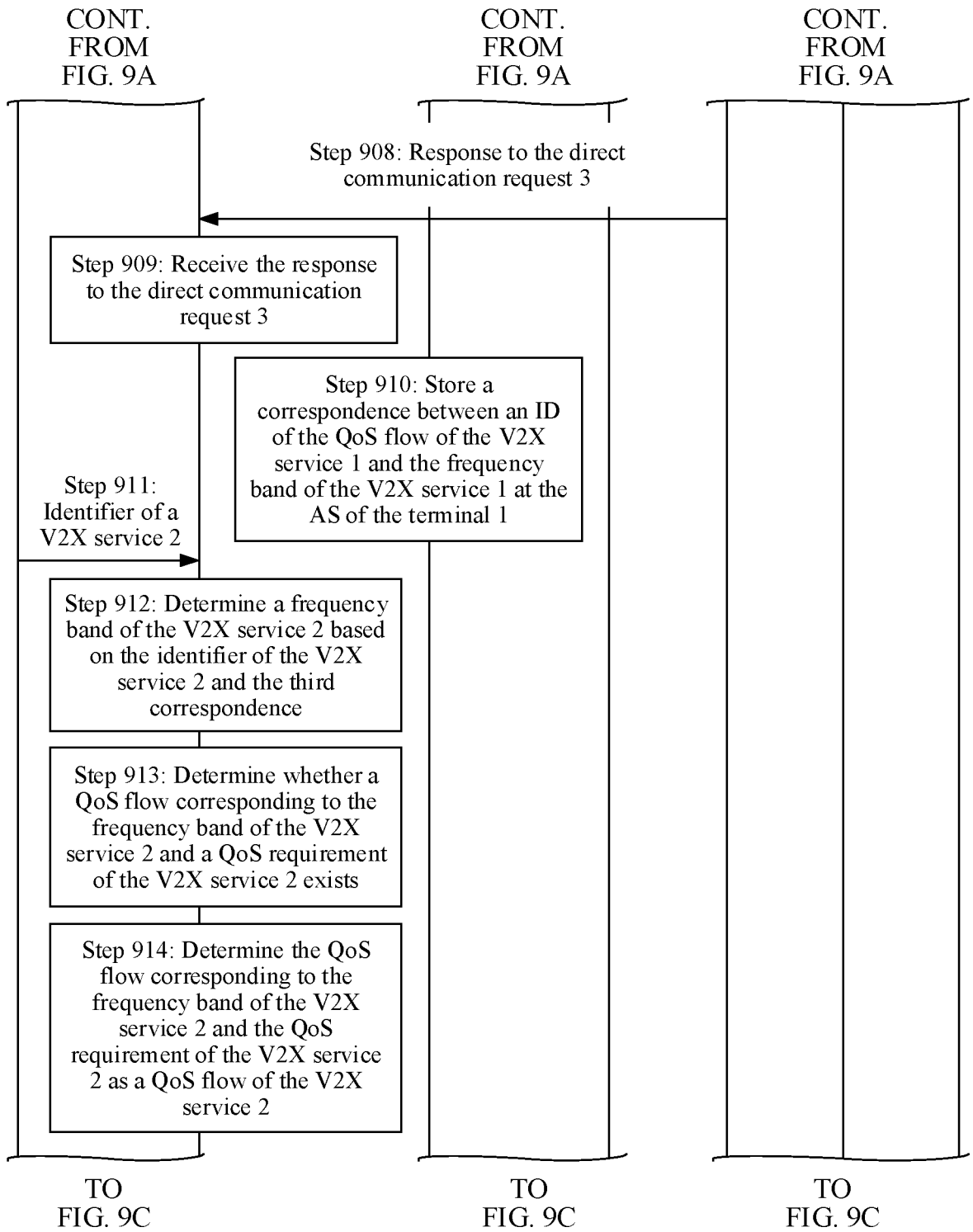
Figure 9C:
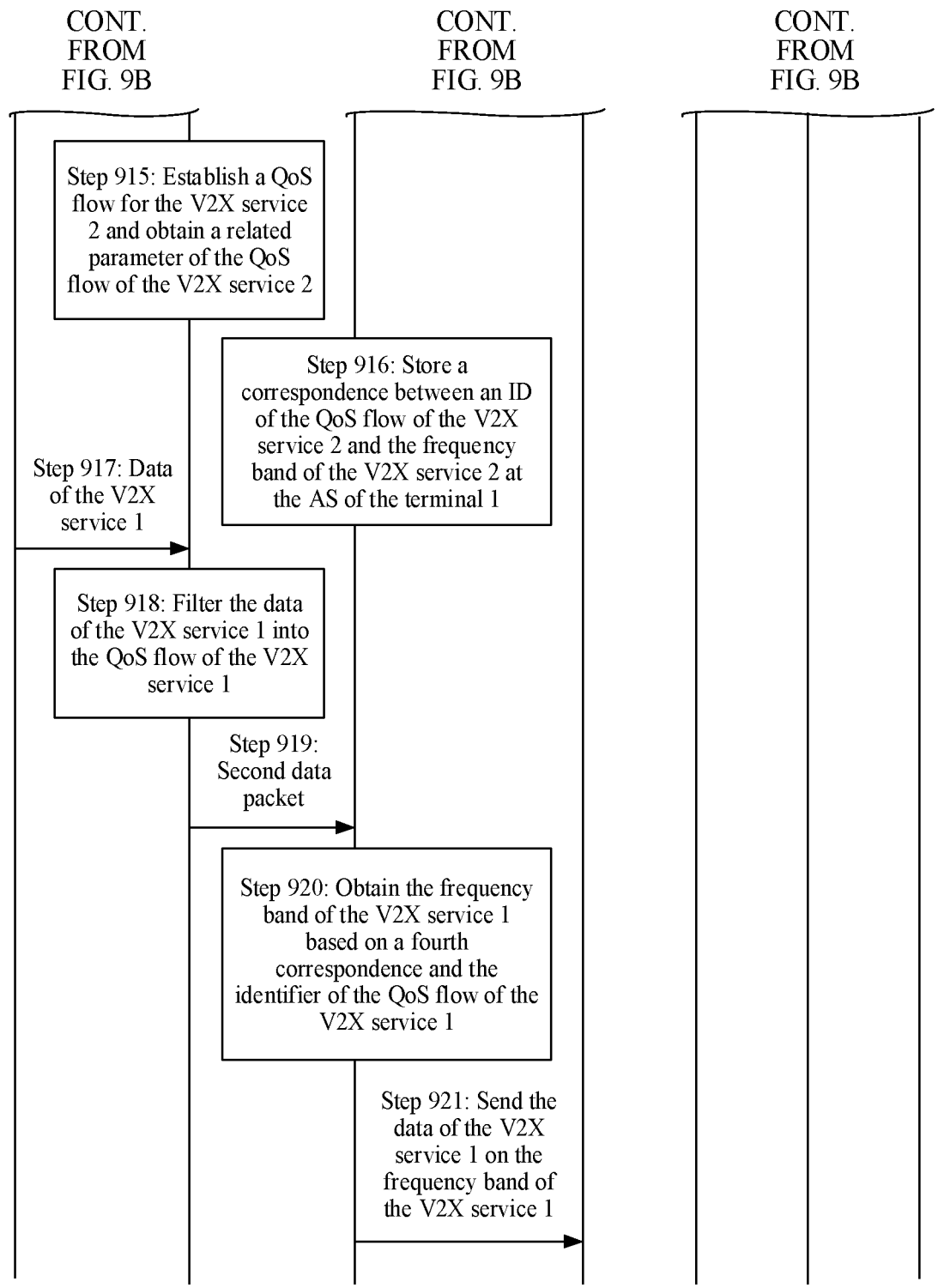

FIG. 9A to FIG. 9C are a flowchart of another communication method according to an embodiment of this application. As shown in FIG. 9A to FIG. 9C, the method includes the following steps.

Step 901: A PCF sends configuration information to a terminal 1 and a terminal 2.

For step 901, refer to step 601. Details are not described.

Step 902: The terminal 1 receives the configuration information sent by the PCF.

For step 902, refer to step 602. Details are not described.

Step 903: The terminal 2 receives the configuration information sent by the PCF.

For step 903, refer to step 603. Details are not described.

Step 904: An application layer of the terminal 1 triggers a V2X service 1, and sends an identifier of the V2X service 1 to a V2X layer of the terminal 1.

Step 905: The V2X layer of the terminal 1 receives the identifier of the V2X service 1, and determines a frequency band of the V2X service 1 based on the identifier of the V2X service 1 and a third correspondence.

Step 906: The V2X layer of the terminal 1 determines that no QoS flow corresponding to the frequency band of the V2X service 1 and a QoS requirement of the V2X service 1 exists, and the V2X layer of the terminal 1 obtains a common layer-2 address corresponding to the frequency band of the V2X service 1, and sends a direct communication request 3, the common layer-2 address, and a source layer-2 address of the V2X service 1 to a V2X layer of the terminal 2.

The direct communication request 3 may be used to request a related parameter of a QoS flow corresponding to the frequency band of the V2X service 1 and the QoS requirement of the V2X service 1, and may be further used to request a destination layer-2 address of the V2X service 1. The direct communication request 3 may include the identifier of the V2X service 1.

Further, the V2X layer of the terminal 1 may further send, to the V2X layer of the terminal 2, a related parameter that is of the QoS flow and that needs to be negotiated, such that the V2X layer of the terminal 2 allocates, based on the related parameter that is of the QoS flow, that needs to be negotiated, and that is sent by the V2X layer of the terminal 1, the related parameter and the like for the QoS flow corresponding to the frequency band of the V2X service 1 and the QOS requirement of the V2X service 1.

The V2X layer of the terminal 1 may obtain, based on the frequency band of the V2X service 1 and a correspondence between a common layer-2 address and a frequency band, the common layer-2 address corresponding to the frequency band of the V2X service 1.

Step 907: The V2X layer of the terminal 2 receives the direct communication request 3, the common layer-2 address, and the source layer-2 address of the V2X service 1, and allocates the related parameter of the QoS flow of the V2X service 1 and the destination layer-2 address of the V2X service 1 based on the direct communication request 3 and the common layer-2 address.

The related parameter that is of the QOS flow of the V2X service 1 and that is allocated by the V2X layer of the terminal 2 may include an identifier (QOS flow identifier, QFID) of the QoS flow of the V2X service 1.

For example, that the V2X layer of the terminal 2 allocates the related parameter of the QoS flow of the V2X service 1 based on the direct communication request 3 and the common layer-2 address may include: The direct communication request 3 is used as a trigger condition for the V2X layer of the terminal 2 to allocate the related parameter of the QoS flow of the V2X service 1, and once receiving the direct communication request 3, the V2X layer of the terminal 2 determines the frequency band of the V2X service 1 based on the common layer-2 address, and allocates the related parameter of the QoS flow of the V2X service 1 based on the frequency band of the V2X service 1 and the QOS requirement of the V2X service 1.

Step 908: The V2X layer of the terminal 2 sends a response to the direct communication request 3 to the V2X layer of the terminal 1.

The response to the direct communication request 3 includes the related parameter of the QoS flow of the V2X service 1 and the destination layer-2 address of the V2X service 1.

Step 909: The V2X layer of the terminal 1 receives the response to the direct communication request 3.

Step 906 to step 909 are a process of establishing the QoS flow for the V2X service 1. In other words, step 906 to step 909 are a process of establishing the QoS flow corresponding to the frequency band of the V2X service 1 and the QoS requirement of the V2X service 1.

In the embodiment shown in FIG. 9A to FIG. 9C, a plurality of QoS flows may be established. The QoS flows correspond to frequency bands and QoS requirements, and each QoS flow corresponds to a different frequency band and a different QoS requirement.

After receiving the response to the direct communication request 3, the V2X layer of the terminal 1 may store a correspondence among the ID of the QoS flow of the V2X service 1, the frequency band of the V2X service 1, and the QOS requirement of the V2X service 1.

Step 910: The terminal 1 stores, at an AS of the terminal, a correspondence between the ID of the QoS flow of the V2X service 1 and the frequency band of the V2X service 1 in the AS of the terminal 1, for example, may add the correspondence between the ID of the QoS flow of the V2X service 1 and the frequency band of the V2X service 1 to a fourth correspondence.

As described above, the fourth correspondence may include a correspondence between a frequency band of a V2X service and an ID of a QoS flow of the V2X service.

Step 911: The application layer of the terminal 1 triggers a V2X service 2, and sends an identifier of the V2X service 2 to the V2X layer of the terminal 1.

Step 912: The V2X layer of the terminal 1 receives the identifier of the V2X service 2, and determines a frequency band of the V2X service 2 based on the identifier of the V2X service 2 and the third correspondence.

Step 913: The V2X layer of the terminal 1 determines whether a QoS flow corresponding to the frequency band of the V2X service 2 and a QoS requirement of the V2X service 2 exists; and if the QoS flow exists, performs step 914; or if no QoS flow exists, performs step 915.

Step 914: The V2X layer of the terminal 1 determines the QoS flow corresponding to the frequency band of the V2X service 2 and the QOS requirement of the V2X service 2 as a QoS flow of the V2X service 2.

For example, if the frequency band of the V2X service 2 is the same as the frequency band of the V2X service 1, and the QOS requirement of the V2X service 2 is the same as the QoS requirement of the V2X service 1, the QoS flow established for the V2X service 1 may be determined as the QoS flow of the V2X service 2, in other words, the QoS flow of the V2X service 2 and the QoS flow of the V2X service 1 are a same QoS flow.

Step 915: The V2X layer of the terminal 1 establishes a QoS flow for the V2X service 2, and obtains a related parameter of the QoS flow of the V2X service 2.

For a process in which the V2X layer of the terminal 1 establishes the QoS flow for the V2X service 2, refer to the process of establishing the QoS flow for the V2X service 1 in step 906 to step 909. Details are not described.

Step 916: The V2X layer of the terminal 1 stores a correspondence between an ID of the QoS flow of the V2X service 2 and the frequency band of the V2X service 2 in the AS of the terminal 1, for example, may add the correspondence between the ID of the QoS flow of the V2X service 2 and the frequency band of the V2X service 2 to the fourth correspondence.

Step 917: The application layer of the terminal 1 generates data of the V2X service 1, and sends a first data packet to the V2X layer of the terminal 1, where the first data packet includes the data of the V2X service 1.

Step 918: The V2X layer of the terminal 1 receives the first data packet, and the terminal 1 filters, at the V2X layer, the data of the V2X service 1 into the QoS flow of the V2X service 1.

Step 919: The V2X layer of the terminal 1 sends a second data packet to the AS of the terminal 1, where the second data packet includes the data of the V2X service 1, the identifier of the QoS flow of the V2X service 1, and a layer-2 address pair of the V2X service 1.

Step 920: The AS of the terminal 1 receives the second data packet, and the AS of the terminal 1 obtains the frequency band of the V2X service 1 based on the fourth correspondence and the identifier of the QoS flow of the V2X service 1.

Step 921: The AS of the terminal 1 sends the data of the V2X service 1 to the terminal 2 on the frequency band of the V2X service 1 based on a destination layer-2 address in the layer-2 address pair of the V2X service 1.

The QoS flow of the V2X service 1 includes the data of the V2X service 1.

It should be noted that step 917 to step 921 are described only using an example of sending the data of the V2X service 1. It may be understood that, the data of the V2X service 2 may be further sent with reference to step 917 to step 921. Details are not described.

Based on the method shown in FIG. 9A to FIG. 9C, a same QoS flow may be established for V2X services that are on a same frequency band and that have a same QoS requirement, and subsequently, the V2X services that are on the same frequency band and that have the same QoS requirement may be filtered into the same QoS flow and sent to the receive end. This avoids a problem that a V2X service fails to be received or is incorrectly received because V2X services that are on different frequency bands and that have different QoS requirements are put together and sent to the receive end.

It should be noted that, in the embodiments shown in FIG. 4 to FIG. 9C, unicast communication between terminals is only used as an example to describe an example of determining layer-2 address pairs of V2X services on different frequency bands and sending data of the V2X services. During actual application, broadcast communication or groupcast communication may be further performed between the terminals. In broadcast communication and groupcast communication scenarios, QoS flows may be created for data of V2X services on different frequency bands with reference to the methods shown in FIG. 8 to FIG. 9C, and data of a V2X service is filtered into a corresponding QoS flow for sending. This prevents data of V2X services on different frequency bands from being mixed together and sent to the receive end, and ensures transmission reliability of the data of the V2X service. Processing processes in the broadcast communication and groupcast communication scenarios are described below using an example of transmitting a first V2X service.

1. Broadcast Communication

After an application layer of a transmit end triggers a first V2X service, the application layer of the transmit end sends data of the first V2X service, an identifier of the first V2X service, and a QoS requirement of the first V2X service to a V2X layer of the transmit end.

The V2X layer of the transmit end receives the data of the first V2X service, the identifier of the first V2X service, and the QoS requirement of the first V2X service. If determining that no QoS flow corresponding to the frequency band of the first V2X service and the QoS requirement of the first V2X service exists, the V2X layer of the transmit end creates a QoS flow for the data of the first V2X service, for example, obtains a PQI and a QoS flow identifier; or if determining that a QoS flow corresponding to the frequency band of the first V2X service and the QoS requirement of the first V2X service exists, the V2X layer of the transmit end sends the data of the first V2X service using the QoS flow.

For sending processes of a plurality of other V2X services in the broadcast communication, refer to the sending process of the first V2X service in the broadcast communication. Details are not described.

It should be noted that, the creating the QoS flow for the data of the first V2X service may also be described as: creating the QoS flow for the first V2X service, determining the QoS flow of the first V2X service, establishing the QoS flow of the first V2X service for the first V2X service, or the like. This is not limited.

In the broadcast communication, each V2X service corresponds to one layer-2 broadcast address, and a correspondence between an identifier of a V2X service and a layer-2 broadcast address of the V2X service is configured by a PCF for the transmit end. In addition, the PCF also sends a correspondence between an identifier of a V2X service and a frequency band of the V2X service to the transmit end. In this case, the transmit end may obtain a correspondence between a layer-2 broadcast address of a V2X service and a frequency band of the V2X service based on the correspondence between an identifier of a V2X service and a layer-2 broadcast address of the V2X service and the correspondence between an identifier of a V2X service and a frequency band of the V2X service; and delivers the correspondence between a layer-2 broadcast address of a V2X service and a frequency band of the V2X service to an AS of the transmit end. Correspondingly, the AS of the transmit end stores the correspondence between a layer-2 broadcast address of a V2X service and a frequency band of the V2X service.

Subsequently, when the transmit end sends, using the AS of the transmit end, the data of the first V2X service using the QoS flow, the transmit end may send, based on a layer-2 broadcast address of the first V2X service and the correspondence between a layer-2 broadcast address of a V2X service and a frequency band of the V2X service, the data of the first V2X service on the frequency band of the first V2X service using the QoS flow.

2. Groupcast Communication

After an application layer of a transmit end triggers a first V2X service, the application layer of the transmit end sends data of the first V2X service, an identifier of the first V2X service, a groupcast (Group) identifier of the first V2X service, and a QOS requirement of the first V2X service to a V2X layer of the transmit end.

The V2X layer of the transmit end receives the data of the first V2X service, the identifier of the first V2X service, the groupcast (Group) identifier of the first V2X service, and the QoS requirement of the first V2X service. If determining that no QoS flow corresponding to the frequency band of the first V2X service, the group identifier of the first V2X service, and the QOS requirement of the first V2X service exists, the V2X layer of the transmit end creates a QoS flow for the data of the first V2X service, for example, obtains a VQI and a QoS flow identifier; or if determining that a QoS flow corresponding to the frequency band of the first V2X service, the group identifier of the first V2X service, and the QoS requirement of the first V2X service exists, the V2X layer of the transmit end sends the data of the first V2X service using the QoS flow.

For sending processes of a plurality of other V2X services in the groupcast communication, refer to the sending process of the first V2X service in the groupcast communication. Details are not described.

In the groupcast communication, in a possible design, each group corresponds to one layer-2 groupcast address, and the layer-2 groupcast address of the group may be allocated by the application layer of the transmit end, allocated by the V2X layer of the transmit end, or configured by a PCF for the transmit end. In addition, the V2X layer of the transmit end may send a correspondence between a layer-2 groupcast address of a group and a frequency band of a V2X service to an AS. Correspondingly, the AS stores the correspondence between a layer-2 groupcast address of a group and a frequency band of a V2X service. V2X services in one group are on one frequency band.

In another possible design, each group corresponds to one or more layer-2 groupcast addresses, each layer-2 groupcast address is in a one-to-one correspondence with a frequency band of a V2X service, and the layer-2 groupcast address of the group may be allocated by the application layer of the transmit end, allocated by the V2X layer of the transmit end, or configured by a PCF for the transmit end. In addition, the V2X layer of the transmit end may send a correspondence between each layer-2 groupcast address of a group and a frequency band of a V2X service to the AS. Correspondingly, the AS stores the correspondence. V2X services in one group are on one frequency band.

Subsequently, when the transmit end sends, using the AS of the transmit end, the data of the first V2X service using the QoS flow, the transmit end may send, based on a layer-2 groupcast address of the group of the first V2X service and the correspondence, the data of the first V2X service on the frequency band of the first V2X service using the QoS flow.

The foregoing mainly describes the solutions provided in the embodiments of this application from a perspective of interaction between the network elements. It may be understood that, to implement the foregoing functions, each network element such as the transmit end or the receive end includes corresponding hardware structures and/or corresponding software modules for performing the functions. A person skilled in the art should easily be aware that, in combination with algorithm steps in the examples described in the embodiments disclosed in this specification, this application may be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, function modules in the transmit end and the receive end may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 10:
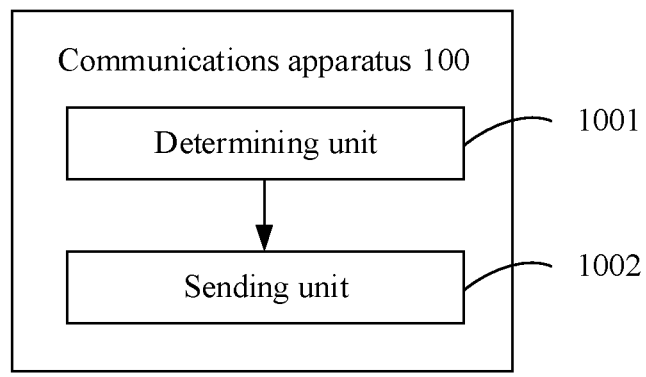
FIG. 10 is a schematic composition diagram of a communications apparatus 100 according to an embodiment of this application.

FIG. 10 is a schematic composition diagram of a communications apparatus 100 according to an embodiment of this application. The communications apparatus 100 may be a terminal, or a chip or a system-on-a-chip in a terminal. As shown in FIG. 10, the communications apparatus 100 may include a determining unit 1001 and a sending unit 1002.

In a possible design, the determining unit 1001 is configured to determine, based on a frequency band of a first V2X service, a layer-2 address pair that is of the first V2X service and that includes a source layer-2 address of the first V2X service and a destination layer-2 address of the first V2X service, where the layer-2 address pair of the first V2X service corresponds to the frequency band of the first V2X service. For example, the determining unit 1001 may be configured to support the communications apparatus 100 in performing step 401.

The sending unit 1002 is configured to send data of the first V2X service to a receive end on the frequency band of the first V2X service based on the layer-2 address pair of the first V2X service. For example, the sending unit 1002 may be configured to support the communications apparatus 100 in performing step 402.

For example, in the possible design, all related content of the steps in the method embodiments shown in FIG. 4 to FIG. 7C may be cited in function descriptions of corresponding function modules. Details are not described herein again. In the possible design, the communications apparatus 100 is configured to perform functions of the transmit end in the communication methods shown in FIG. 4 to FIG. 7C, and therefore, can achieve an effect the same as that of the foregoing communication methods.

In another possible design, the determining unit 1001 is configured to determine a QoS flow of a first V2X service based on a frequency band of the first V2X service and a QoS requirement of the first V2X service. For example, the determining unit 1001 may be configured to support the communications apparatus 100 in performing step 801.

The sending unit 1002 is configured to send data of the first V2X service to a receive end using the QoS flow of the first V2X service. For example, the sending unit 1002 may be configured to support the communications apparatus 100 in performing step 802.

For example, in the other possible design, all related content of the steps in the method embodiments shown in FIG. 8 to FIG. 9C may be cited in function descriptions of corresponding function modules. Details are not described herein again. In another possible design, the communications apparatus 100 is configured to perform functions of the transmit end in the communication methods shown in FIG. 8 to FIG. 9C, and therefore, can achieve an effect the same as that of the foregoing communication methods.

It should be noted that, in another possible implementation, the communications apparatus 100 shown in FIG. 10 may include a processing module and a communications module. A function of the determining unit 1001 may be integrated into the processing module, and a function of the sending unit 1002 may be integrated into the communications module. The processing module is configured to control and manage an action of the communications apparatus 100. For example, the processing module is configured to support the communications apparatus 100 in performing step 401, step 801, and another process of the technology described in this specification. The communications module is configured to support the communications apparatus 100 in performing step 402, step 802, and the like, and communicating with another network entity. Further, the communications apparatus 100 shown in FIG. 10 may further include a storage module configured to store program code and data of the communications apparatus 100.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus 100 shown in FIG. 10 may be the communications apparatus shown in FIG. 3.

Figure 11:
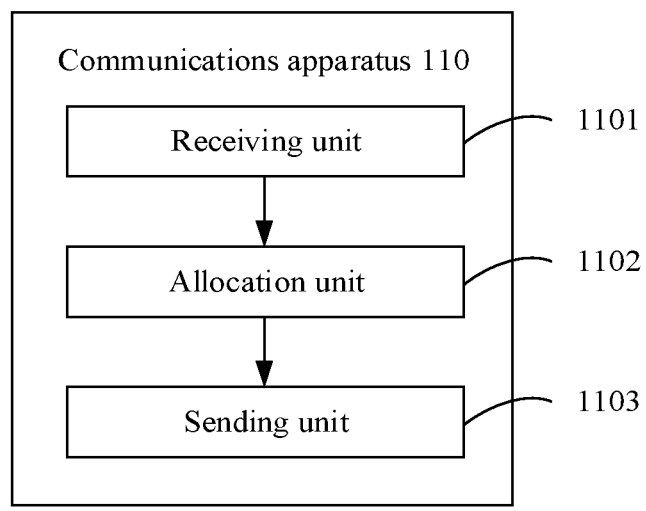
FIG. 11 is a schematic composition diagram of a communications apparatus 110 according to an embodiment of this application.

FIG. 11 is a schematic composition diagram of a communications apparatus 110 according to an embodiment of this application. The communications apparatus 110 may be a receive end, or a chip or a system-on-a-chip in a receive end. As shown in FIG. 11, the communications apparatus 110 may include a receiving unit 1101, an allocation unit 1102, and a sending unit 1103.

The receiving unit 1101 is configured to receive, from a transmit end, a source layer-2 address of a first V2X service and a first request used to request a destination layer-2 address of the first V2X service; the allocation unit 1102 is configured to allocate a destination layer-2 identifier of the first V2X service based on the first request; and the sending unit 1103 is configured to send the destination layer-2 address of the first V2X service to the transmit end.

For example, all related content of the steps in the method embodiments shown in FIG. 4 to FIG. 9C may be cited in function descriptions of corresponding function modules. Details are not described herein again. In another possible design, the communications apparatus 110 is configured to perform functions of the receive end in the communication methods shown in FIG. 4 to FIG. 9C, and therefore, can achieve an effect the same as that of the foregoing communication methods.

In another possible implementation, the communications apparatus 110 shown in FIG. 11 may include a processing module and a communications module. Functions of the receiving unit 1101 and the sending unit 1103 may be integrated in the communications module. The processing module is configured to control and manage an action of the communications apparatus 110, and a function of the allocation unit 1102 is integrated in the processing module. For example, the processing module is configured to support the communications apparatus 110 in performing a process performed by the receive end in this specification. The communications module is configured to support the communications apparatus 110 in communicating with another network entity. Further, the communications apparatus 110 shown in FIG. 11 may further include a storage module configured to store program code and data of the communications apparatus 110.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is a processor, the communications module is a communications interface, and the storage module is a memory, the communications apparatus 110 shown in FIG. 11 may be the communications apparatus shown in FIG. 3.

Figure 12:
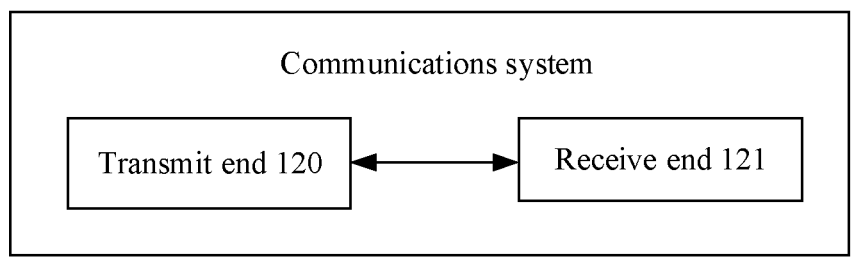
FIG. 12 is a schematic composition diagram of a communications system according to an embodiment of this application.

FIG. 12 is a schematic composition diagram of a communications system according to an embodiment of this application. As shown in FIG. 12, the communications system may include a transmit end 120 and a receive end 121. The transmit end 120 and the receive end 121 may perform direct communication with each other, for example, perform communication through a PC5 interface.

A function of the transmit end 120 is the same as a function of the communications apparatus 100.

In an example, the transmit end 120 is configured to: determine, based on a frequency band of a first V2X service, a layer-2 address pair that is of the first V2X service and that includes a source layer-2 address of the first V2X service and a destination layer-2 address of the first V2X service; and send data of the first V2X service to the receive end on the frequency band of the first V2X service based on the layer-2 address pair of the first V2X service, where the layer-2 address pair of the first V2X service corresponds to the frequency band of the first V2X service.

In this example, the receive end 121 may be configured to: receive, from the transmit end, a source layer-2 address of the first V2X service and a first request used to request a destination layer-2 address of the first V2X service; allocate a destination layer-2 identifier of the first V2X service based on the first request; and send the destination layer-2 address of the first V2X service to the transmit end.

In another example, the transmit end 120 is configured to: determine a QoS flow of a first V2X service based on a frequency band of the first V2X service and a QOS requirement of the first V2X service; and send data of the first V2X service to the receive end using the QoS flow of the first V2X service.

Based on the system shown in FIG. 12, the transmit end 120 may determine a layer-2 address pair of a V2X service based on a frequency band of the V2X service, to ensure that data of the V2X service is subsequently sent on the frequency band of the V2X service based on the layer-2 address pair of the V2X service. This avoids a problem that a V2X service fails to be received or is incorrectly received because V2X services on different frequency bands are put together and sent to the receive end. Alternatively, the transmit end 120 may establish a same QoS flow for V2X services that are on a same frequency band and that have a same QoS requirement, and subsequently, data of the V2X services that are on the same frequency band and that have the same QoS requirement may be filtered into the same QoS flow and sent to the receive end. This avoids a problem that a V2X service fails to be received or is incorrectly received because data of V2X services that are on different frequency bands and that have different QoS requirements is put together and sent to the receive end.

The foregoing descriptions about implementations allow a person skilled in the art to clearly understand that, for the purpose of convenient and brief description, division into the foregoing function modules is only used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division. During actual implementation, another division manner may be used. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate components may or may not be physically separate, and components displayed as units may be one or more physical units, to be more specific, may be located in one place, or may be distributed on a plurality of different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The storage medium includes any medium that can store program code, for example, a Universal Serial Bus (USB) flash drive, a removable hard disk, a ROM, a RAM, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
  receiving, by a first terminal device and from a policy control network element, a mapping of an identifier of a first vehicle-to-everything (V2X) service with a first frequency;
  determining, by the first terminal device, the first frequency based on the identifier of the first V2X service and the mapping;
  determining, by the first terminal device, a first quality of service (QOS) flow of the V2X service based on the first frequency and a first QoS requirement of the first V2X service; and
  sending, by the first terminal device, data of the first V2X service to a second terminal device using the first QoS flow of the first V2X service.

2. The method of claim 1, wherein the first QoS requirement comprises a delay requirement of the first V2X service and a rate requirement of the first V2X service.

3. The method of claim 1, further comprising determining, by the first terminal device, a second QoS flow of a second V2X service based on a second frequency of the second V2X service and a second QoS requirement of the second V2X service, wherein the first frequency is different from the second frequency, and wherein the first QoS flow of the first V2X service is different from the second QoS flow of the second V2X service.

4. The method of claim 1, wherein sending the data comprises sending, by the first terminal device, a fourth correspondence to an access stratum of the first terminal device using a V2X layer of the first terminal device, and wherein the fourth correspondence is between a first identifier of the first QoS flow and the first frequency of the first V2X service.

5. The method of claim 4, further comprising:
    filtering, by the V2X layer of the first terminal device, the data of the first V2X service into the first QoS flow of the first V2X service;
    delivering the data and the first identifier of the first QoS flow to the access stratum of the first terminal device; and
    determining, by the access stratum of the first terminal device based on the first identifier and the fourth correspondence, to send the data in the first QoS flow to the second terminal device on the first frequency of the first V2X service.

6. The method of claim 1, wherein determining the first QoS flow further comprises determining, by the first terminal device when a QoS flow corresponding to the first frequency and the first QoS requirement exists between the first terminal device and the second terminal device, the QoS flow as the first QoS flow of the first V2X service.

7. The method of claim 1, wherein the identifier of the first V2X service is a provider service identifier (PSID) or an intelligent transport system-application identifier (ITS-AID).

8. An apparatus, comprising:
    a memory configured to store instructions; and
    one or more processors coupled to the memory and configured to execute the instructions to:
        receive, from a policy control network element, a mapping of an identifier of a first vehicle-to-everything (V2X) service with a first frequency;
        determine the first frequency based on the identifier of the first V2X service and the mapping;
        determine a first quality of service (QOS) flow of the first V2X service based on the first frequency and a first QoS requirement of the first V2X service; and
        send data of the first V2X service to a second terminal device using the first QoS flow of the first V2X service.

9. The apparatus of claim 8, wherein the one or more processors are further configured to determine a second QoS flow of a second V2X service based on a second frequency of the second V2X service and a second QoS requirement of the second V2X service, wherein the first frequency is different from the second frequency, and wherein the first QoS flow of the first V2X service is different from the second QoS flow of the second V2X service.

10. The apparatus of claim 8, wherein the one or more processors are further configured to determine, when a QoS flow corresponding to the first frequency and the first QoS requirement exists between the apparatus and the second terminal device, the QoS flow as the first QoS flow of the first V2X service.

11. The apparatus of claim 8, wherein the one or more processors are further configured to send a fourth correspondence to an access stratum of the apparatus a using a V2X layer of the apparatus, and wherein the fourth correspondence is between a first identifier of the first QoS flow and the first frequency of the first V2X service.

12. The apparatus of claim 11, wherein the one or more processors are further configured to:
    filter, using the V2X layer of the apparatus, the data of the first V2X service into the first QoS flow;
    deliver the data of the first QoS flow and the first identifier of the first QoS flow to the access stratum of the apparatus; and
    determine, using the access stratum of the apparatus based on the first identifier and the fourth correspondence, to send the data in the first QoS flow to the second terminal device on the first frequency of the first V2X service.

13. A computer program product comprising instructions that are stored on a non-transitory computer-readable medium and that, when executed by one or more processors of an apparatus, cause the apparatus to:
    receive, from a policy control network element, a mapping of an identifier of a first vehicle-to-everything (V2X) service with a first frequency;
    determine the first frequency based on the identifier of the first V2X service and the mapping;
    determine a first quality of service (QOS) flow of the first V2X service based on the first frequency and a first QoS requirement of the first V2X service; and
    send data of the first V2X service to a second terminal device using the first QoS flow of the first V2X service.

14. The computer program product of claim 13, wherein the instructions, when executed by the one or more processors, further cause the apparatus to determine a second QoS flow of a second V2X service based on a second frequency of the second V2X service and a second QoS requirement of the second V2X service, wherein the first frequency is different from the second frequency, and wherein the first QoS flow of the first V2X service is different from the second QoS flow of the second V2X service.

15. The computer program product of claim 13, wherein the instructions, when executed by the one or more processors, further cause the apparatus to:
    determine, when a QoS flow corresponding to the first frequency and the first QoS requirement exists between the apparatus and the second terminal device, the QoS flow as the first QoS flow of the first V2X service; or
    establish, when no QoS flow corresponding to the first frequency and the first QoS requirement exists between the apparatus and the second terminal device, the first QoS flow of the first V2X service.

16. The method of claim 1, wherein V2X services with different frequencies are classified to different QoS flows.

17. The method of claim 1, wherein determining the first QoS flow further comprises establishing, by the first terminal device when no QoS flow corresponding to the first frequency and the first QoS requirement exists between the first terminal device and the second terminal device, the first QoS flow of the first V2X service.

18. The apparatus of claim 8, wherein V2X services with different frequencies are classified to different QoS flows.

19. The apparatus of claim 8, wherein the one or more processors are further configured to establish, when no QoS flow corresponding to the first frequency and the first QoS requirement exists between the apparatus and the second terminal device, the first QoS flow of the first V2X service.

20. The computer program product of claim 13, wherein V2X services with different frequencies are classified to different QoS flows.

* * * * *